(12) United States Patent
Pedretti et al.

(10) Patent No.: US 10,683,851 B2
(45) Date of Patent: Jun. 16, 2020

(54) ENERGY STORAGE SYSTEM AND METHOD

(71) Applicant: Energy Vault, Inc., Pasadena, CA (US)

(72) Inventors: Andrea Pedretti, Bellinzona (CH); William Gross, Pasadena, CA (US)

(73) Assignee: Energy Vault, Inc., Pasadena, CA (US)

( * ) Notice: Subject to any disclaimer, the term of this patent is extended or adjusted under 35 U.S.C. 154(b) by 0 days.

(21) Appl. No.: 16/514,568

(22) Filed: Jul. 17, 2019

(65) Prior Publication Data

US 2020/0024108 A1    Jan. 23, 2020

Related U.S. Application Data

(60) Provisional application No. 62/700,694, filed on Jul. 19, 2018, provisional application No. 62/800,905, (Continued)

(51) Int. Cl.
*F03G 3/00* (2006.01)
*E04C 1/39* (2006.01)
(Continued)

(52) U.S. Cl.
CPC ............... *F03G 3/00* (2013.01); *B66C 1/66* (2013.01); *B66C 13/00* (2013.01); *B66C 13/06* (2013.01);
(Continued)

(58) Field of Classification Search
CPC ........... B66C 1/66; B66C 13/06; B66C 13/00; B66C 25/00; E04C 1/39; H02K 7/025;
(Continued)

(56) References Cited

U.S. PATENT DOCUMENTS 1,822,432 A    9/1931  Bradley
2,924,484 A    2/1960  Tolsma
(Continued)

FOREIGN PATENT DOCUMENTS

CN         103867408 A      6/2014
DE    10 2010 014342 A1    10/2011
(Continued)

OTHER PUBLICATIONS

"A Weighting game," International Water Power & Dam Construction, Apr. 13, 2010, 8 pages.
(Continued)

*Primary Examiner* — Stephen A Vu
(74) *Attorney, Agent, or Firm* — Knobbe, Martens, Olson & Bear LLP

(57) ABSTRACT

A an energy storage system includes a crane and a plurality of blocks, where the crane is operable to move blocks from a lower elevation to a higher elevation (via stacking of the blocks) to store electrical energy as potential energy of the blocks, and then operable to move blocks from a higher elevation to a lower elevation (via unstacking of the blocks) to generate electricity based on the kinetic energy of the block when lowered (e.g., by gravity). The energy storage system can, for example, store electricity generated from solar power as potential energy in the stacked blocks during daytime hours when solar power is available, and can convert the potential energy in the stacked blocks into electricity during nighttime hours when solar energy is not available, and deliver the converted electricity to the power grid.

17 Claims, 39 Drawing Sheets

Related U.S. Application Data filed on Feb. 4, 2019, provisional application No. 62/800,919, filed on Feb. 4, 2019, provisional application No. 62/800,929, filed on Feb. 4, 2019.

(51) Int. Cl.

| | | |
|---|---|---|
| *B66C 25/00* | (2006.01) | |
| *H02J 15/00* | (2006.01) | |
| *B66C 1/66* | (2006.01) | |
| *B66C 13/00* | (2006.01) | |
| *B66C 13/06* | (2006.01) | |
| *H02K 7/02* | (2006.01) | |
| *H02K 7/18* | (2006.01) | |
| *F03G 3/06* | (2006.01) | |

(52) U.S. Cl.
CPC ............... *B66C 25/00* (2013.01); *E04C 1/39* (2013.01); *H02J 15/00* (2013.01); *H02K 7/025* (2013.01); *H02K 7/1853* (2013.01); *F03G 3/06* (2013.01)

(58) Field of Classification Search
CPC . H02K 7/1853; F03G 3/00; F03G 3/06; H02J 15/00
See application file for complete search history.

(56) References Cited

U.S. PATENT DOCUMENTS

| | | | |
|---|---|---|---|
| 3,405,278 A | 10/1968 | Ley | |
| 4,284,899 A | 8/1981 | Bendiks | |
| 4,381,839 A * | 5/1983 | Engler | B66C 19/02 212/314 |
| 4,918,282 A | 4/1990 | Cheek | |
| 5,340,218 A | 8/1994 | Cuthbertson | |
| 5,888,043 A * | 3/1999 | Jatcko | B66C 1/66 414/459 |
| 6,866,815 B2 | 3/2005 | Gohres et al. | |
| 7,191,710 B2 | 3/2007 | Powell | |
| 7,712,326 B2 | 5/2010 | Jagusztyn et al. | |
| 7,743,609 B1 | 6/2010 | Brostmeyer | |
| 7,775,571 B2 * | 8/2010 | Waisanen | B66C 1/422 294/67.31 |
| 7,886,537 B2 | 2/2011 | Jagusztyn et al. | |
| 7,973,420 B2 | 7/2011 | Scott | |
| 8,465,071 B2 * | 6/2013 | Risi | B66C 1/42 294/110.2 |
| 8,674,527 B2 | 3/2014 | Fyke et al. | |
| 2007/0000246 A1 | 1/2007 | Prastitis | |
| 2009/0193808 A1 | 8/2009 | Fiske | |
| 2009/0200814 A1 * | 8/2009 | Hellgren | B66C 1/101 294/68.3 |
| 2009/0231123 A1 | 9/2009 | Rowell et al. | |
| 2010/0283263 A1 | 11/2010 | Schilling | |
| 2010/0301616 A1 | 12/2010 | Al-Khamis | |
| 2011/0027107 A1 | 2/2011 | Bekken | |
| 2011/0050158 A1 | 3/2011 | MacDonald et al. | |
| 2011/0112731 A1 | 5/2011 | Harada | |
| 2011/0123257 A1 * | 5/2011 | Mills | B66C 1/104 403/53 |
| 2012/0306223 A1 * | 12/2012 | Karlsson | B66C 1/102 294/81.62 |

FOREIGN PATENT DOCUMENTS

| | | | |
|---|---|---|---|
| DE | 10 2011 119116 A1 | 5/2013 | |
| FR | 2 812 865 A1 | 2/2002 | |
| GB | 2351066 A * | 12/2000 | ............ B66C 1/663 |
| JP | 06-193553 | 7/1994 | |
| JP | 2001-163574 A | 6/2001 | |
| KR | 10-0570880 B1 | 4/2006 | |
| KR | 10-2009-0110891 A | 10/2009 | |
| WO | WO 2018/184868 A2 | 10/2018 | |

OTHER PUBLICATIONS

Search Report/Written Opinion dated Feb. 19, 2012, International Application No. PCT/US2011/037252, 9 pages.
Wood, Bruce; "Hanging Tomato Plants"; Mar. 4, 2009; retrieved May 9, 2013 using Internet Archive to view rubberingot.com.
Invitation to Pay Additional Fees received in International Patent Application No. PCT/US2019/041249, dated Oct. 16, 2019.
International Search Report and Written Opinion dated Feb. 6, 2020, received in International Patent Application No. PCT/US2019/041249.

* cited by examiner

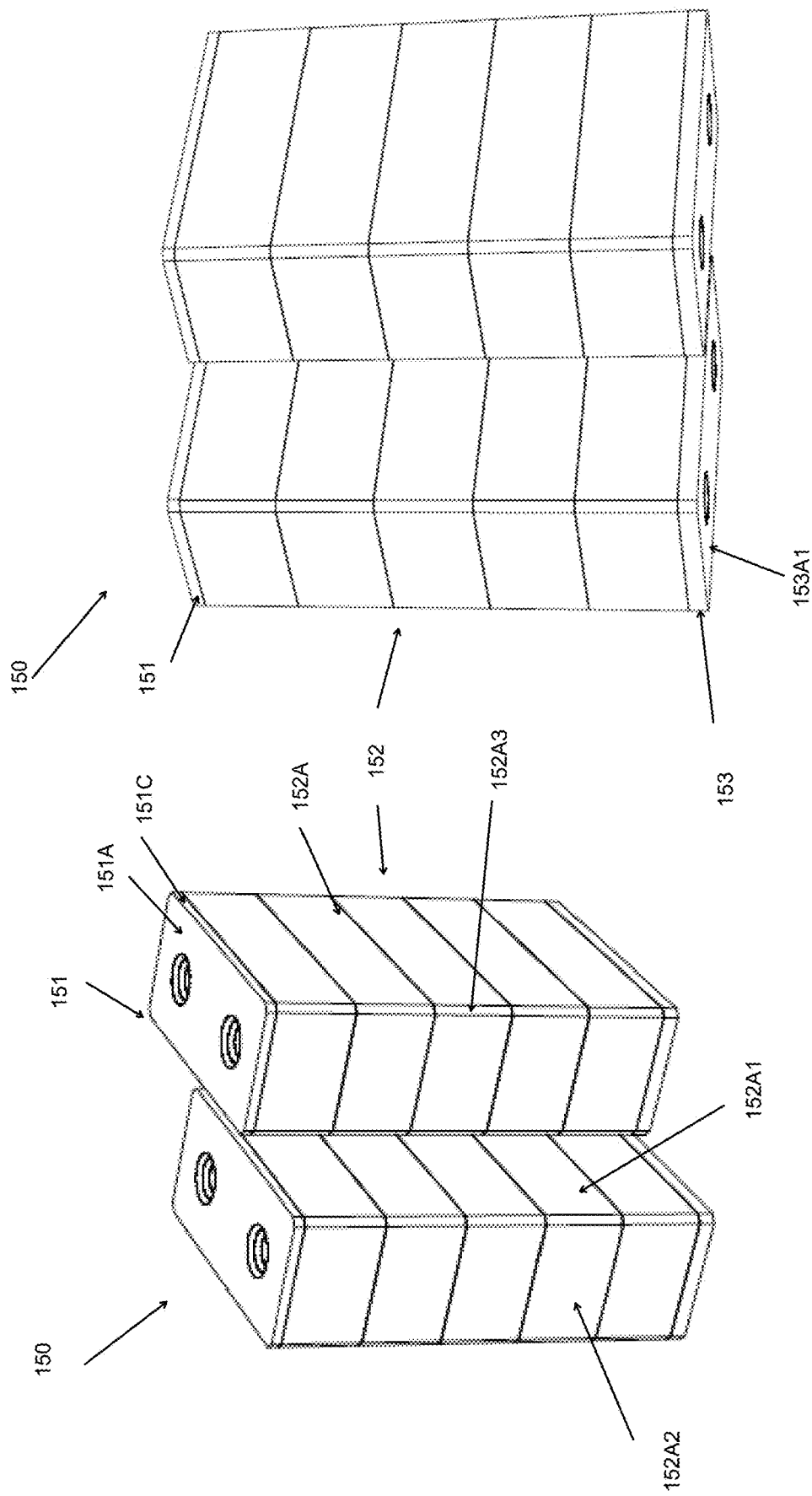

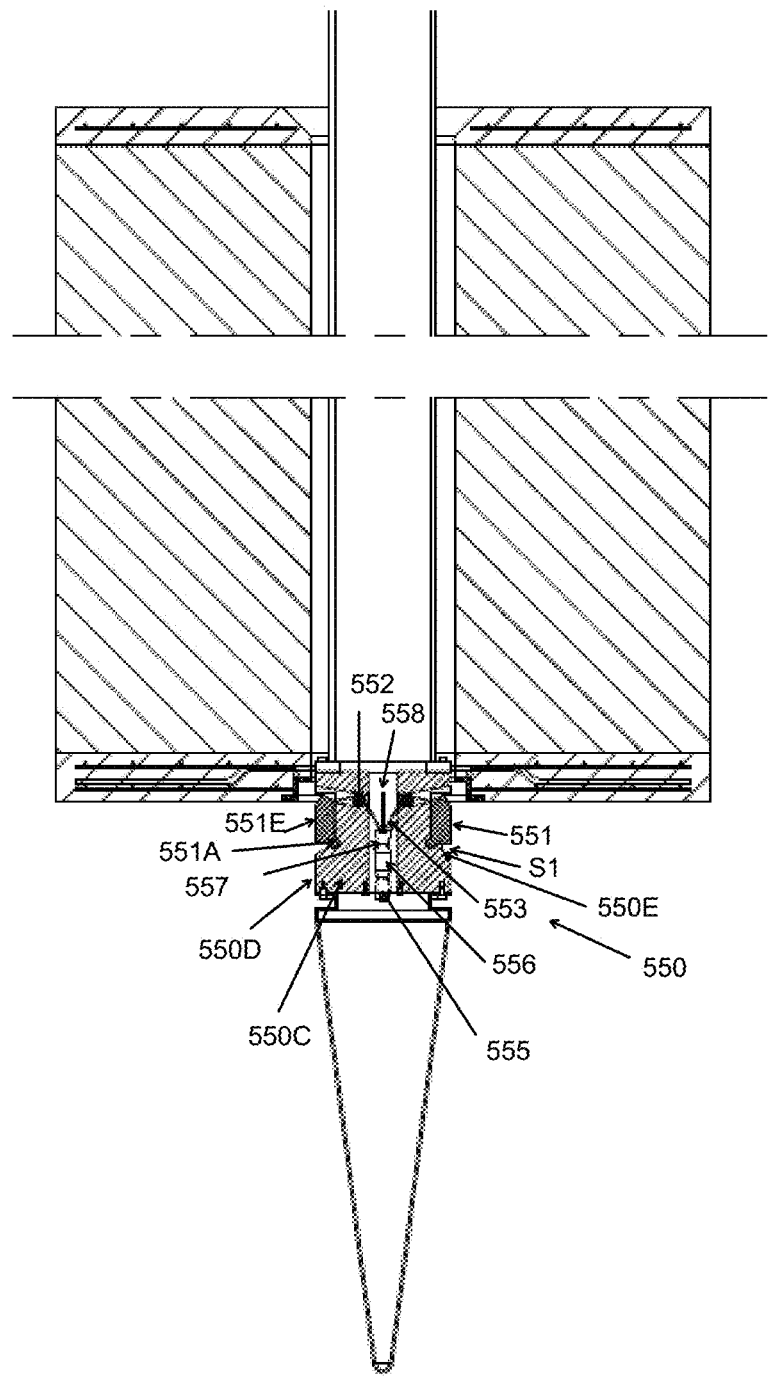
FIRGURE 14D

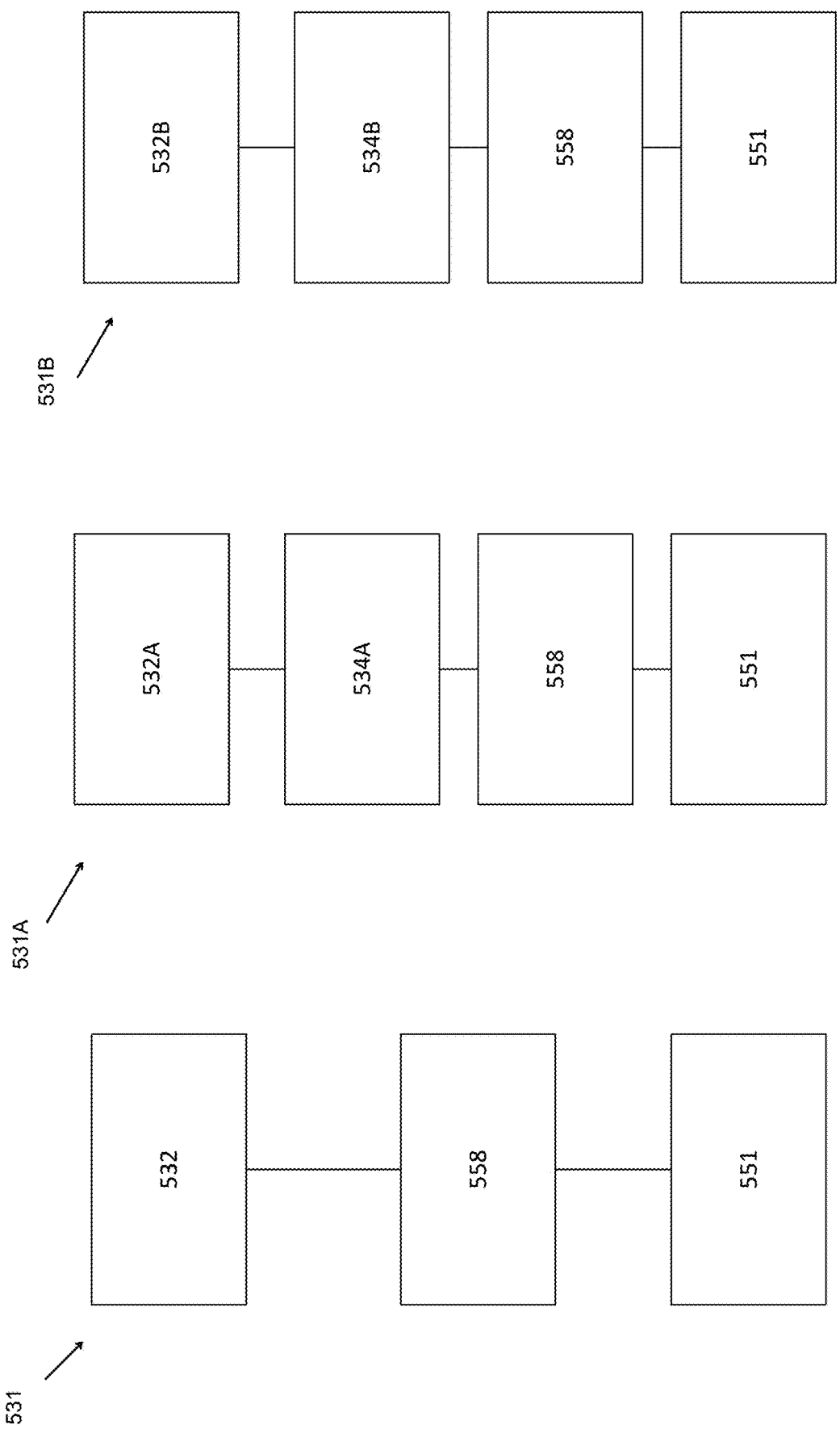

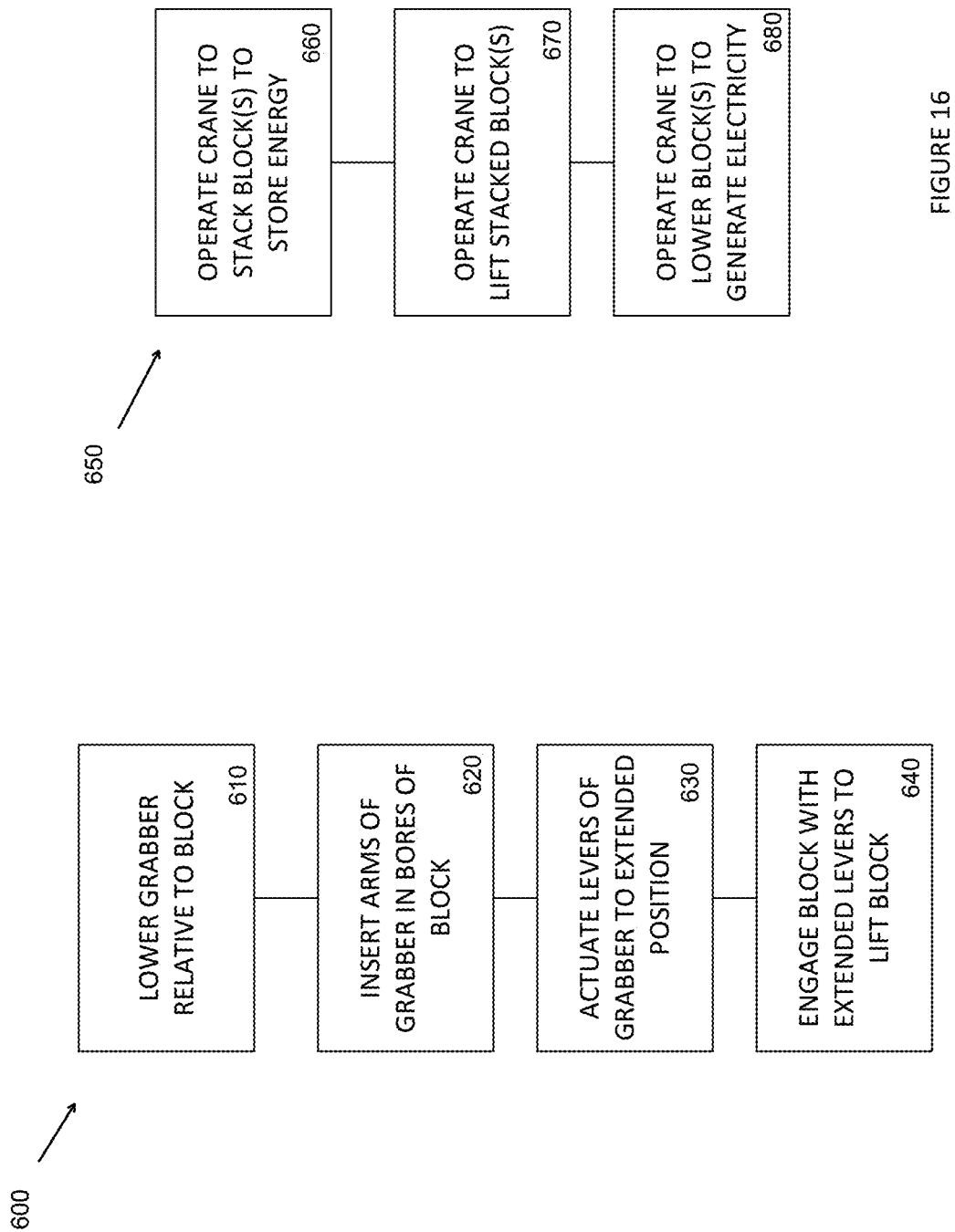

ENERGY STORAGE SYSTEM AND METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 and should be considered a part of this specification.

BACKGROUND

Field

The invention is directed to an energy storage system, and more particularly to an energy storage system that stores and releases energy via the stacking of blocks.

Description of the Related Art

Power generation from renewable energy sources (e.g., solar power, wind power, hydroelectric power, biomass, etc.) continues to grow. However, many of these renewable energy sources (e.g., solar power, wind power) are intermittent an unpredictable, limiting the amount of electricity that can be delivered to the grid from intermittent renewable energy sources.

SUMMARY

Accordingly, there is a need for improved system to capture electricity generated by renewable energy sources for predictable delivery to the electric grid.

In accordance with one aspect of the disclosure, an energy storage system is provided. An example energy storage system includes a crane and a plurality of blocks, where the crane is operable to move one or more blocks from a lower elevation to a higher elevation to store energy (e.g., via the potential energy of the block in the higher elevation) and operable to move one or more blocks from a higher elevation to a lower elevation to generate electricity (e.g., via the kinetic energy of the block when moved to the lower elevation).

In accordance with another aspect of the disclosure, a gravity driven power storage and generation system is provided. An example gravity driven power storage and generation system includes a crane with one or more jibs (e.g., multiple jibs) operable to store energy by moving one or more blocks from a lower elevation to a higher elevation and operable to generate electricity by moving one or more blocks from a higher elevation to a lower elevation under the force of gravity.

In accordance with another aspect of the disclosure, the energy storage system can in one example store solar power to produce off-hours electricity. The energy storage system can stack a plurality of blocks to store solar energy as potential energy in the stacked blocks during daylight hours when solar electricity is abundant. The energy storage system can then operate to unstack the blocks during nighttime to drive a generator to produce electricity for deliver to the power grid.

In accordance with another aspect of the disclosure a method for storing and generating electricity is provided. The method comprises operating a crane to stack a plurality of blocks by moving the one or more blocks from a lower elevation to a higher elevation to store energy in the blocks, each of the blocks storing an amount of energy corresponding to a potential energy amount of the block. The method also comprises operating the crane to unstack one or more of the blocks by moving the one or more blocks from a higher elevation to a lower elevation under a force of gravity, thereby generating an amount of electricity corresponding to a kinetic energy amount of said one or more blocks when moved from the higher elevation to the lower elevation.

In accordance with another aspect of the disclosure, an energy storage system is provided. The system comprises a plurality of blocks and a crane comprising a frame, an electric motor-generator, one or more trolleys movably coupled to the frame, and a cable movably coupled to the one or more trolleys and operatively coupled to the electric motor-generator. The cable is configured to operatively couple to one or more of the plurality of blocks. The crane is operable to stack one or more of the plurality of blocks on top of each other by moving said blocks from a lower elevation to a higher elevation to store and amount of electrical energy in said blocks corresponding to a potential energy amount of said blocks. The crane is further operable to unstack one or more of the plurality of blocks by moving said blocks from a higher elevation to a lower elevation under a force of gravity to generate an amount of electricity corresponding to a kinetic energy amount of said one or more blocks when moved from the higher elevation to the lower elevation.

In accordance with another aspect of the disclosure, a block for use in an energy storage and generation system is provided. The block comprises a body comprising concrete having a rectangular shape with a length greater than a width, the width being greater than a depth of the body, a planar facet interconnecting adjacent sides of the body, and one or more recesses on a bottom surface of the body. The block also comprises a metal plate attached to the one or more recesses to inhibit wear on the block during movement of the block.

In accordance with another aspect of the disclosure, a grabber for use in lifting and lowering blocks in an energy storage and generation system is provided. The grabber comprises a body including a cross-member coupleable to a cable operable by a crane, a pair of arms extending distally from the cross-member body, and one or more levers located in a distal portion of each of the pair of arms. The one or more levers are actuatable between a retracted position that allows the grabber to be lowered past a bottom end of a block and an extended position that allows the one or more levers to engage the bottom end of the block to thereby couple to the block.

In accordance with another aspect of the disclosure, a method of operating a grabber to lift and lower blocks in an energy storage and generation system is provided. The method comprises lowering the grabber relative to a block, inserting a pair of arms of the grabber through a pair of bores in the block until a distal end of the pair of arms protrude from the pair of bores, actuating one or more levers movably coupled to the pair of arms from a retracted position to an extended position, and engaging a recessed distal surface of the pair of bores with the one or more levers in the extended position to allow lifting of the block with the grabber.

BRIEF DESCRIPTION OF THE DRAWINGS

FIG. 11A is a perspective schematic top view of a pair of blocks proximate each other.

FIG. 11B is a perspective schematic bottom view of the pair of blocks in FIG. 11A.

FIG. 14D is a partial cross-sectional view of the grabber extending through the block with lever(s) in a retracted position.

FIG. 14I is a schematic block diagram of an operating system for the grabber.

FIG. 14J is a schematic block diagram of another operating system for the grabber.

FIG. 14K is a schematic block diagram of another operating system for the grabber.

FIG. 15 is a schematic block diagram of a method of operating the grabber.

FIG. 16 is a schematic block diagram of a method of operating an energy storage system.

DETAILED DESCRIPTION

Crane Design

Figure 1:
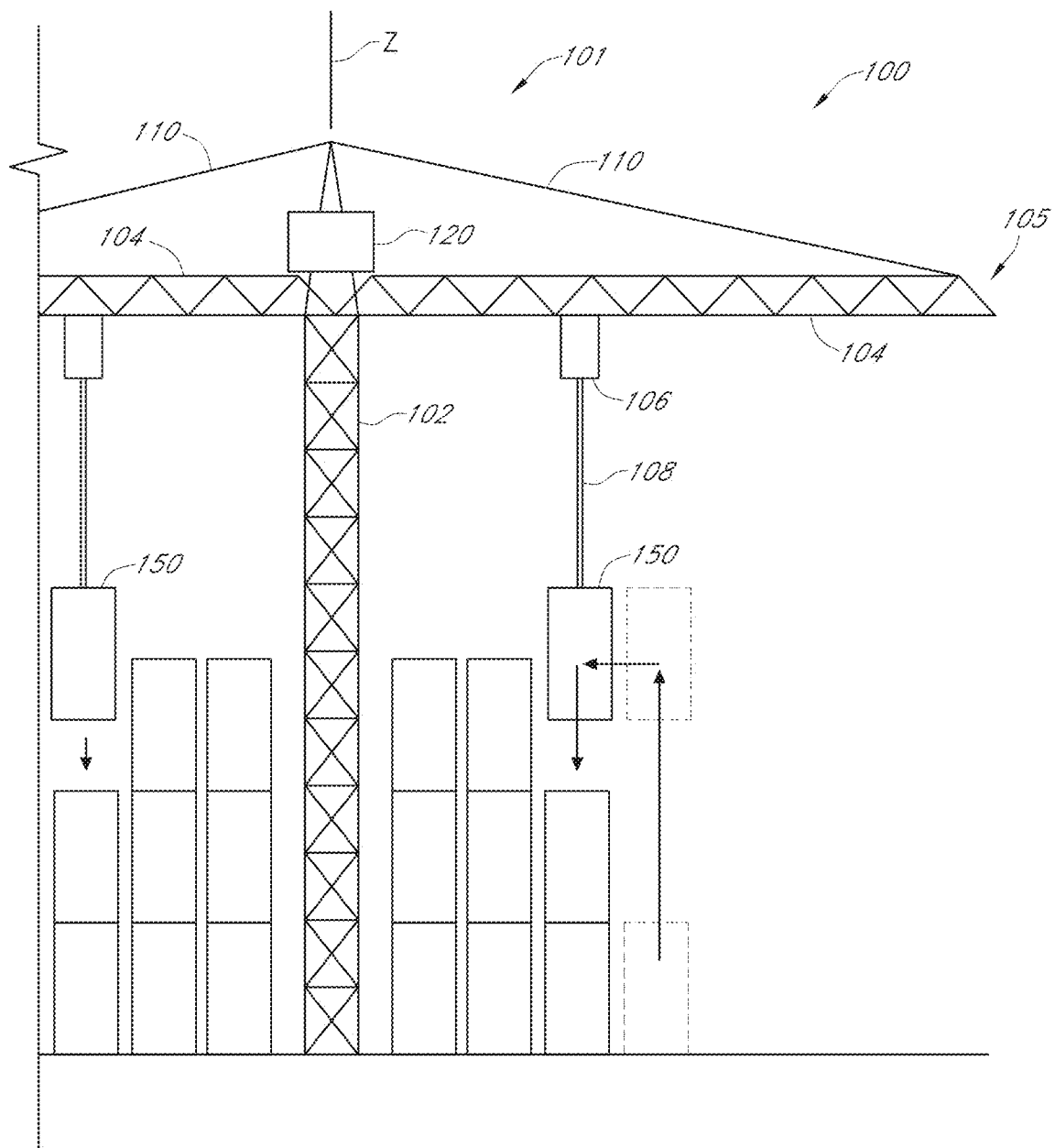
FIGS. 1-3 are schematic views of an example energy storage system.
Figure 2:
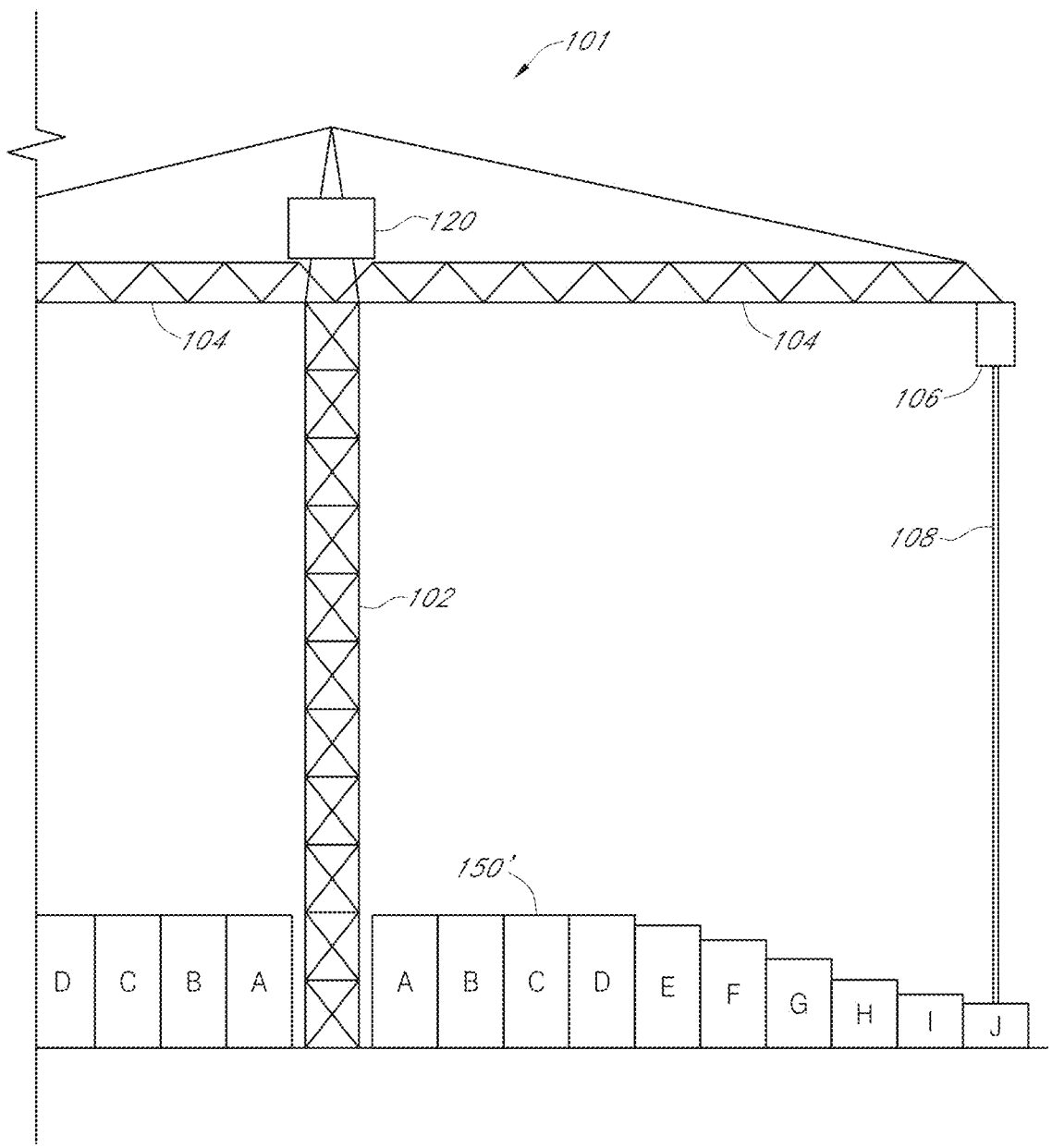
Figure 3:
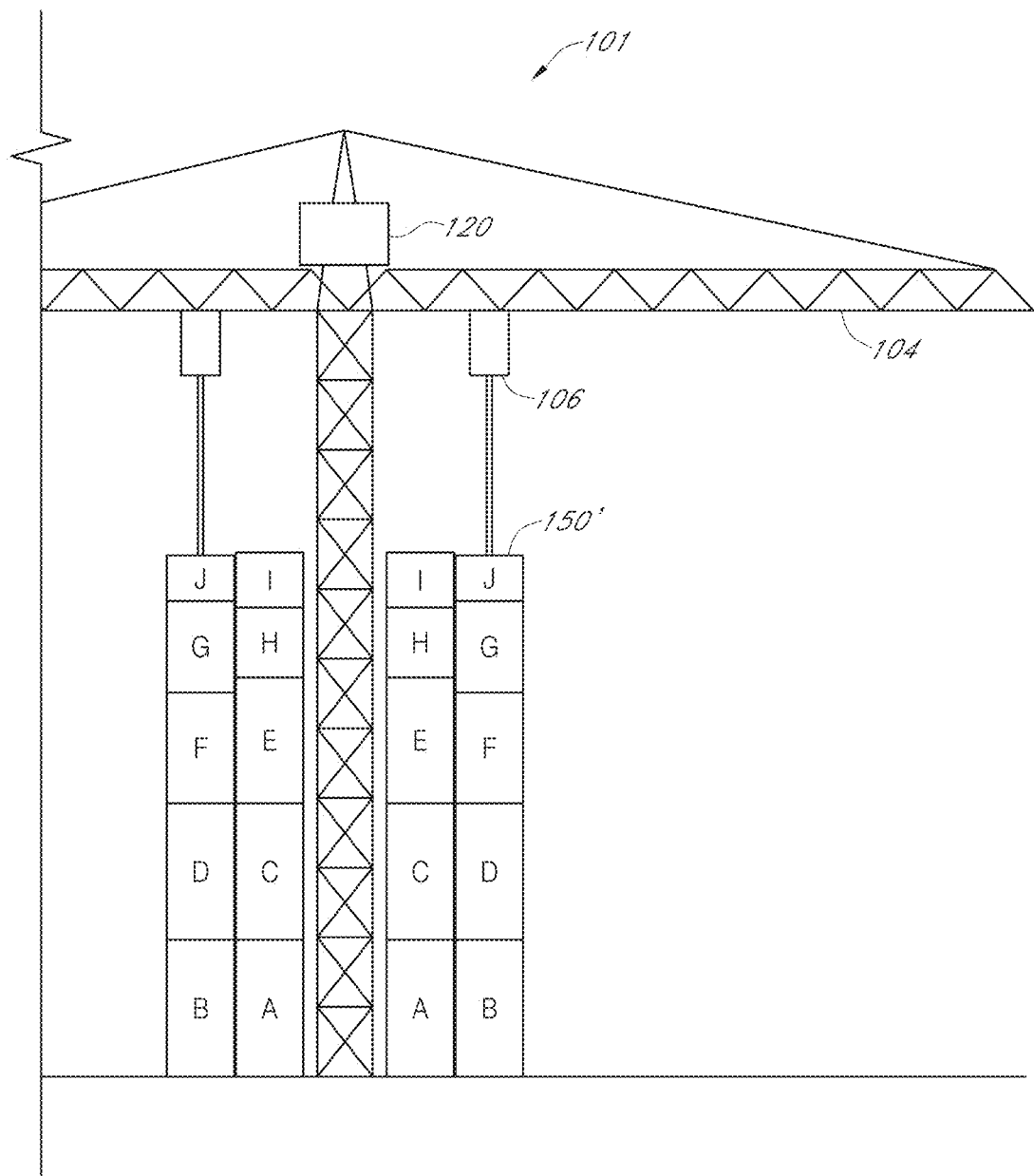

FIGS. 1-3 illustrate an example energy storage system 100 (the "system") operable to convert electrical energy or electricity into potential energy for storage, and to convert potential energy into electrical energy or electricity, for example, for delivery to an electrical grid.

The system 100 includes a crane 101 with a tower 102 and one or more jibs 104. In one example, the one or more jibs 104 extend transversely (e.g., perpendicular) relative to the tower 102. The one or more jibs 104 extend radially outward relative to the tower 102. Optionally, the jibs 104 can rotate about the tower 102. FIGS. 1-3 show the crane 101 having two jibs 104 on opposite sides of the tower 102 that counterbalance each other. In one example, the crane 101 is optionally symmetrical about an axis Z of the tower 102. Though FIGS. 1-3 show the crane 101 with two jibs 104, as discussed further below, another example energy storage systems 100 can have a plurality of pairs of jibs 104, where each pair of jibs 104 are on opposite sides of the tower 102 to counterbalance each other.

Though FIGS. 1-3 shows only a portion of a second jib 104 (shown to the left of the tower 102), one of skill in the art will recognize that, in one example, the second jib 104 is a mirror image of the first jib 104 (e.g., shown to the right of the tower 102). One or both of the tower 102 and the jib(s) 104 optionally has a truss frame. The crane 101 optionally includes a support cable 110 that connects portions 105 (e.g., distal or end portions) of the jib(s) 104 and optionally couples to the tower 102.

The crane 101 optionally includes an electric motor-generator 120. In one example, as shown in FIGS. 1-3, the motor-generator 120 is coupled to one or both of the tower 102 and the jib(s) 104. In other examples, the motor-generator 120 can be located in other suitable locations relative to the tower 102 and/or the jib(s) 104. In one example, the motor-generator 120 is a single unit that can operate as both an electric motor and a generator. In another example, the motor-generator 120 has a separate electric motor unit and electric generator unit (e.g., a separate motor unit spaced apart from or in a different location from the generator unit).

The crane 101 can have a trolley 106 movably coupled to the jib(s) 104. In one example, shown in FIGS. 1-3, the crane 101 has two trolleys 106, each movably coupled to one of the two jibs 104. A cable 108 (e.g., one or more cables) is movably coupled to each trolley 106 so that the cable 108 can be retracted or extended (e.g., payed out) relative to the trolley 106 in a generally vertical direction (e.g., generally perpendicular to the jib(s) 104). The cable 108 operatively couples to a block 150 (e.g., via the grabber 500, as further described below), allowing the block 150 to be lifted and lowered. In one example, each pair of jibs 104 lifts (e.g., vertically lifts) or lowers (e.g., vertically lowers) blocks 150 at the same time to counterbalance each other. Though the drawings show one cable 108, one of skill in the art will recognize that a pair of cables 108 can be coupled to the trolley 106 at one end and to a pulley assembly at an opposite end via which they operatively couple to the block 150 (e.g., via the grabber 500 discussed below).

With continued reference to FIGS. 1-3, the energy storage system 100 has a plurality of blocks 150. In one example, shown in FIG. 1, each of the plurality of blocks 150 has the same size and shape. In another example, shown in FIGS. 2-3, the energy storage system has a plurality of blocks 150', where one or more of the blocks 150' vary in size. The blocks 150' of varying size can be used in an example system 100 where the blocks 150' are to be moved along the jib(s) farther from the tower 102, to meet the maximum weight capacity of the crane 101 and inhibit damage to the crane 101. Further details of the blocks 150, 150' are provided below.

Tower Crane Design

Figure 5:
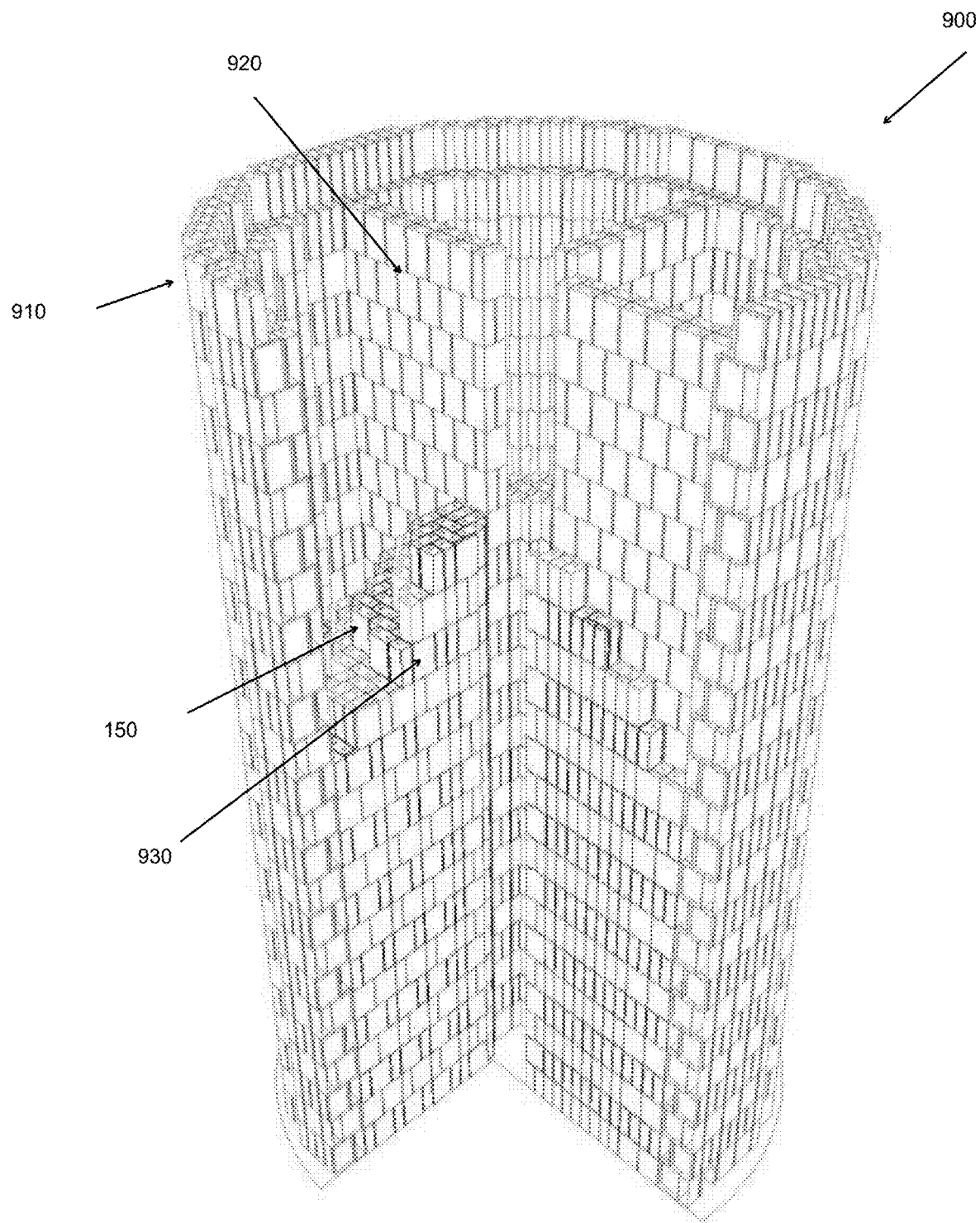
FIG. 5 is partial perspective view of an energy storage system having a circular tower form.
Figure 6A:
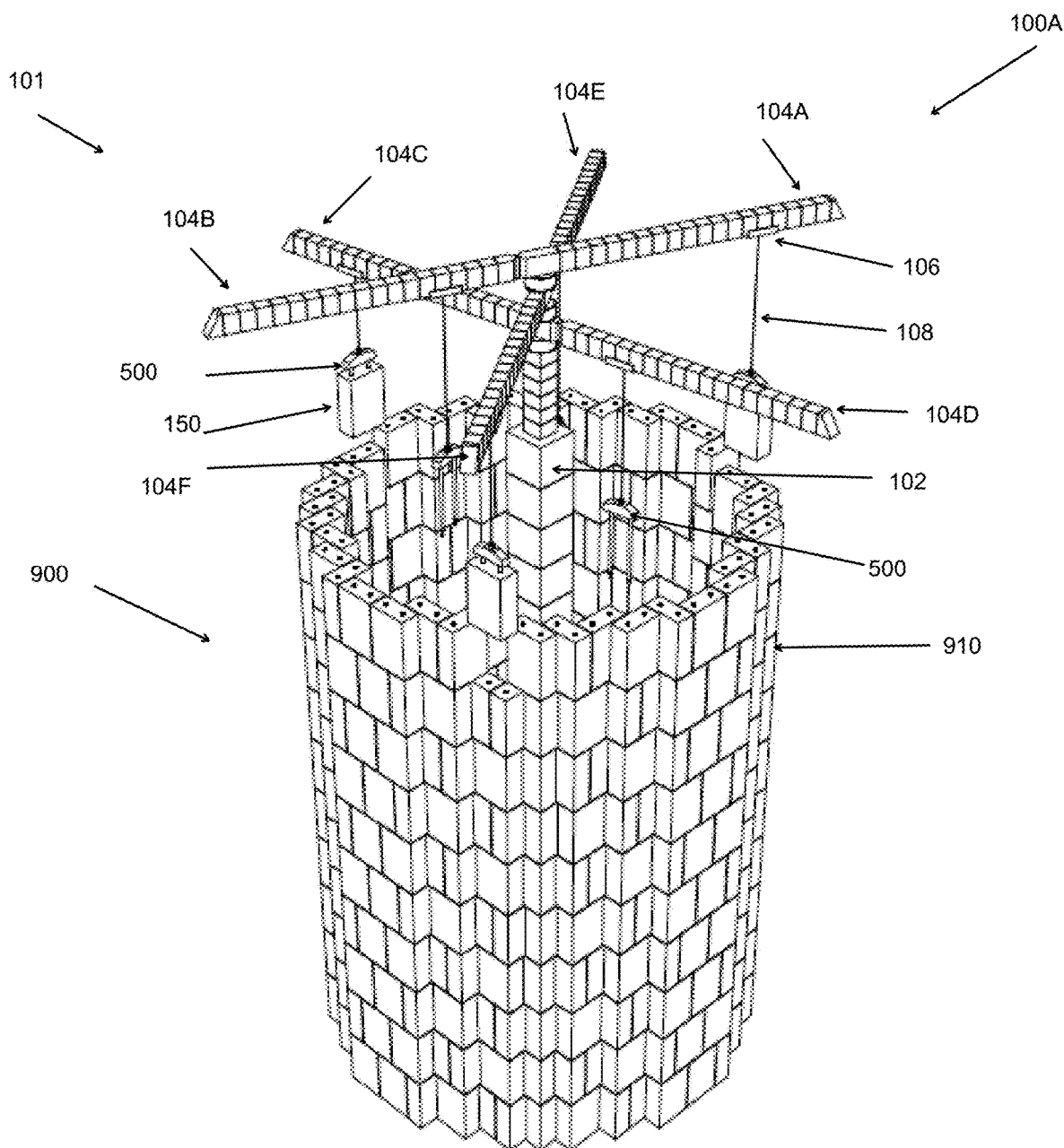
FIG. 6A is a perspective view of an energy storage system having a circular tower form with multiple jibs, in one operational configuration.
Figure 6B:
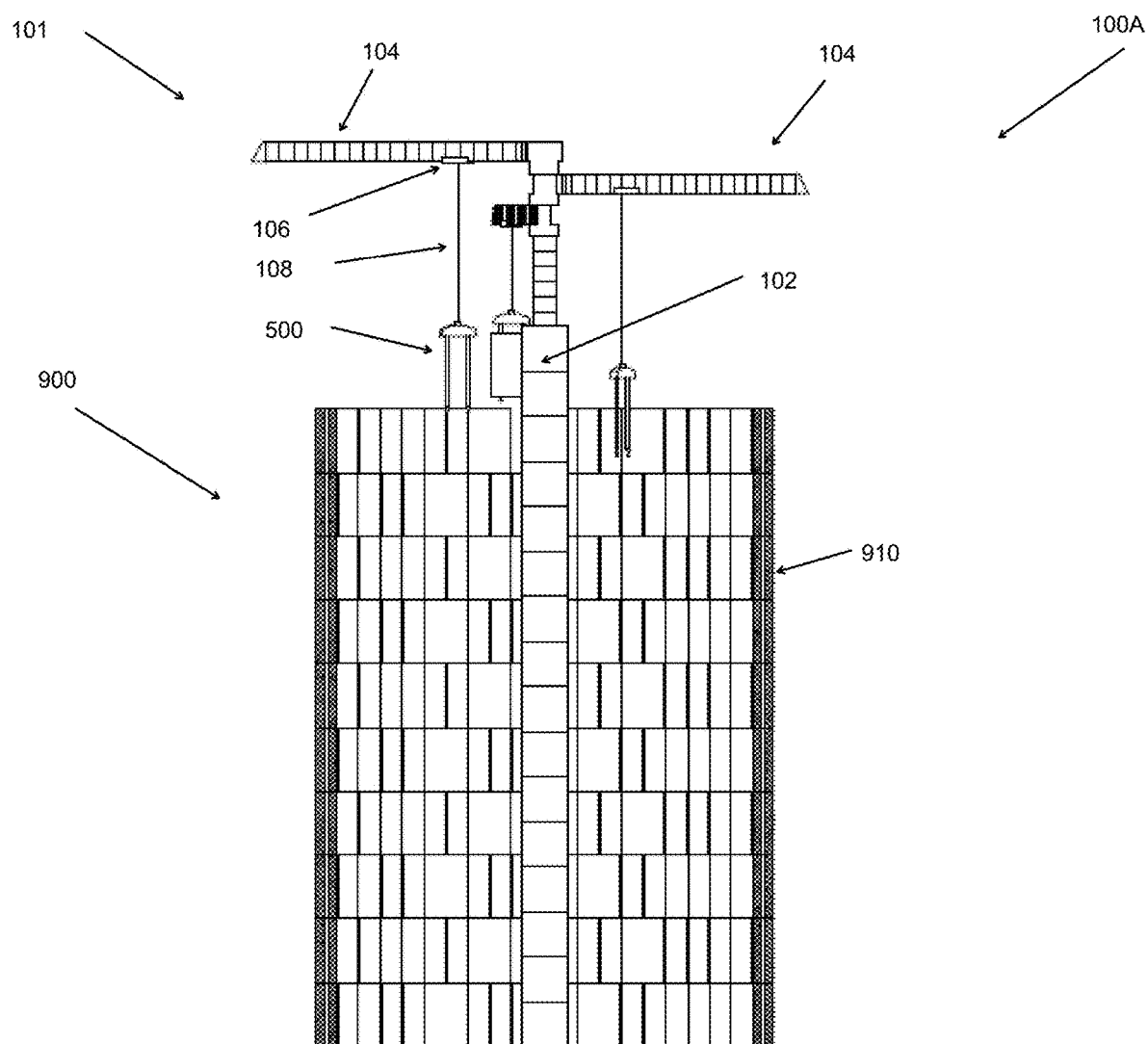
FIG. 6B is a cross-sectional view of the circular tower in FIG. 6A.
Figure 6C:
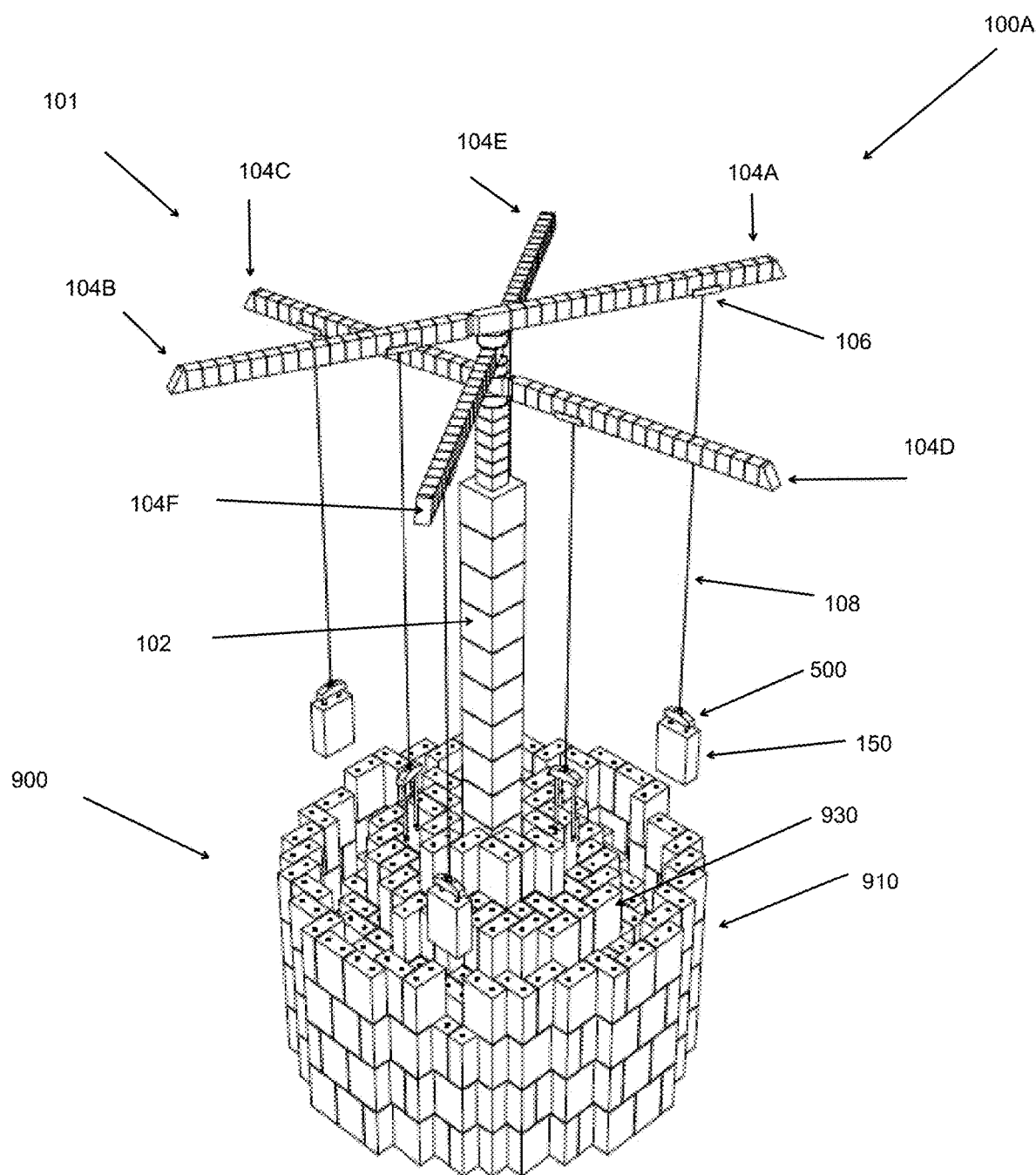
FIG. 6C is a perspective view of the energy storage system of FIG. 6A, in another operational configuration.
Figure 6D:
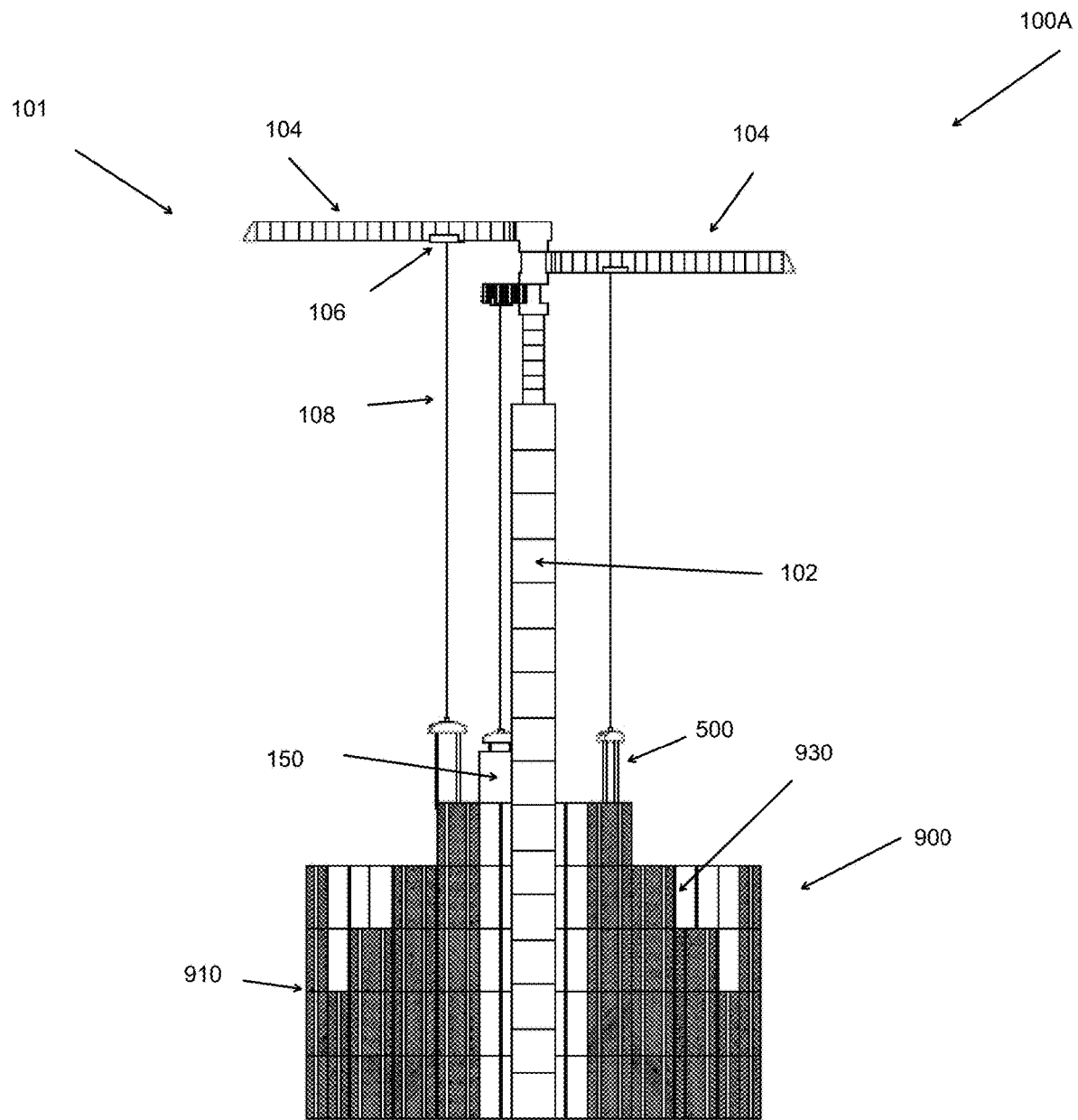
FIG. 6D is a cross-sectional view of the circular tower in FIG. 6C.
Figure 6E:
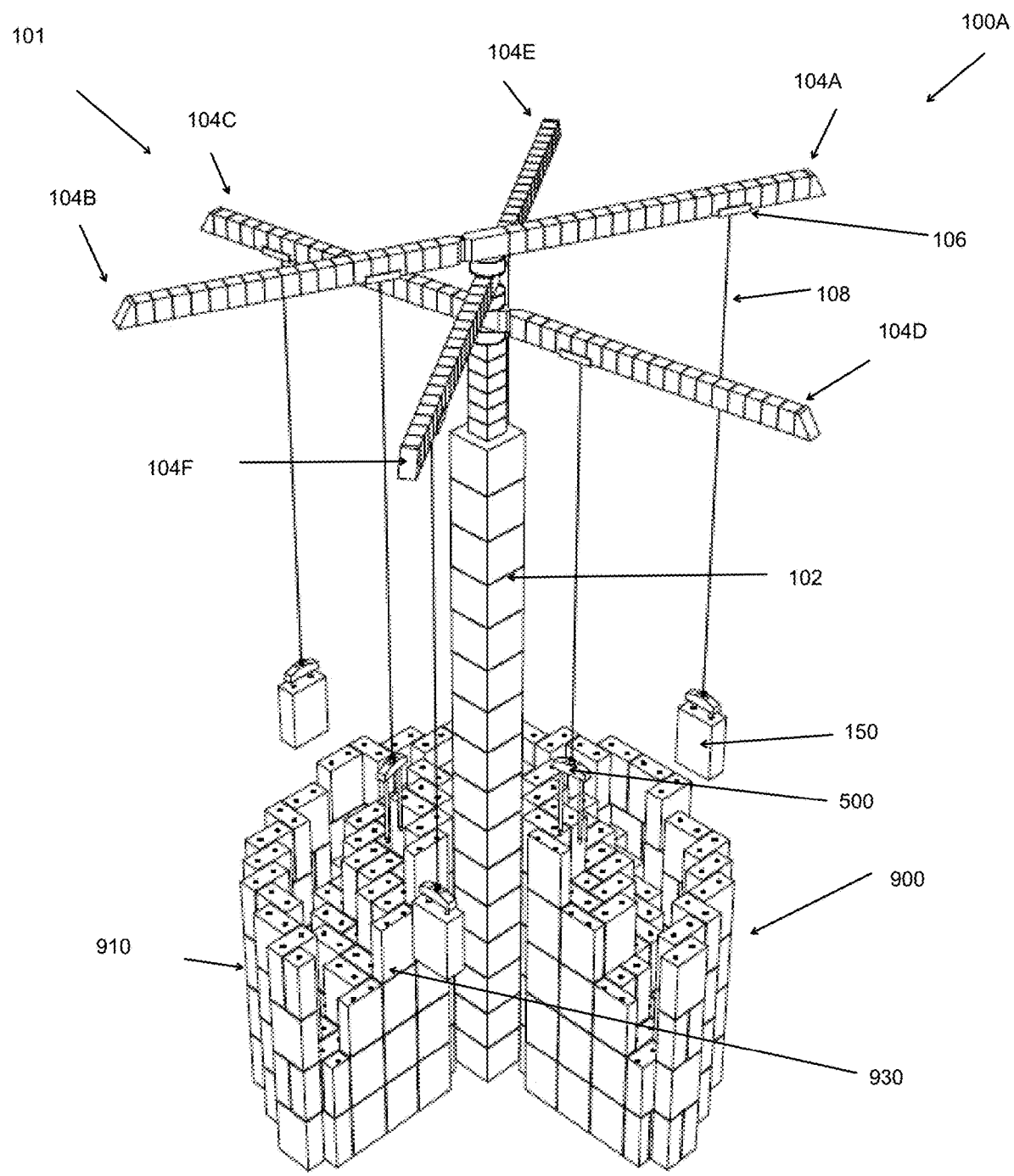
FIG. 6E is a partial perspective view of the energy storage system of FIG. 6C.

FIGS. 5-6E show an example energy storage system 100A (the "system") operable to convert electrical energy or electricity into potential energy for storage, and to convert potential energy into electrical energy or electricity, for example, for delivery to an electrical grid. Some of the features of the energy storage system 100A are similar to features of the energy storage system 100 in FIGS. 1-3. Thus, the structure and description for the various features of the energy storage system 100 in FIGS. 1-3 are understood to also apply to the corresponding features of the energy storage system 100A in FIGS. 5-6E, except as described below.

The energy storage system 100A differs from the energy storage system 100 in that the crane 101 has multiple pairs of jibs 104 coupled to the tower 102. For example, FIGS. 6A-6E show three pairs of jibs 104A-104B, 104C-104D, 104E-104F coupled to (e.g., intersecting) the tower 102 of the crane 101. Each pair of jibs 104 optionally extend on opposite sides of the tower 102 to advantageously counterbalance each other. Additionally, the multiple (e.g., three) pairs of jibs 104 are oriented at different angular orientations, and therefore define a polar coordinate system in which the blocks 150 are moved. A trolley 106 is movably coupled to each jib 104 and movably supports one or more cables 108 that couple to a grabber 500 (described further below). The grabber 500 is selectively actuatable to couple to a block 150 to lift (e.g., vertically lift) the block 150 from a first (start) position, transfer the block 150 (to a different polar coordinate location) and lower (e.g., vertically lower) the block 150 to a second (finish) position. In another example, the crane 101 can have more pairs of jibs 104 (e.g., four pairs, five pairs, etc.), or fewer pairs (e.g., two pairs) of jibs 104. Though the drawings show one cable 108 attached to each trolley 106 on each jib 104, one of skill in the art will recognize that a pair of cables 108 can be coupled to the trolley 106 at one end and to a pulley assembly at an opposite end via which they operatively couple to the block 150 (e.g., via the grabber 500 discussed below).

In one example, each pair of jibs 104 lifts or lowers blocks 150 at the same time to counterbalance each other. In one example, while one pair of jibs 104 is lowering (e.g., simultaneously lowering) blocks 150 (e.g., to generate electricity), another pair of jibs 104 is lifting (e.g., simultaneously lifting) a pair of grabbers 500 (discussed further below) without blocks 150 attached to reposition the grabbers 500 to couple to and lift another pair of blocks 150. This arrangement advantageously allows for constant power generation (e.g., without interruption) from the lowering of blocks 150 as one or more pairs of the multiple pairs of jibs 104 is always lowering blocks 150 to generate electricity.

The stack of blocks 150 define a tower 900 (e.g., having a generally cylindrical shape). In one example, the tower 900 can have between 40 and 60 levels or floors of blocks 150. The tower 900 includes a plurality of blocks 150 optionally arranged to form a windbreak structure 910. In one example, the windbreak structure 910 can have a generally cylindrical shape. A second plurality of blocks 150 are optionally stacked to define cross-members 920 that buttress (e.g., support) the windbreak structure 910. The cross-members 920 can optionally extend radially between the tower 102 (e.g., center of the tower 900) and the windbreak structure 910. FIG. 5 shows three of four cross-members 920 (the fourth removed to allow view of the internal structure of the tower 900). In one example, the cross-members are generally planar and define four quadrants.

A third plurality of blocks 150 define an energy storage assembly 930 that can be stacked an unstacked within the space defined (e.g., bounded) by the windbreak structure 910 to store electrical energy or electricity as potential energy and convert potential energy to electrical energy or electricity, as previously discussed. Advantageously, the windbreak structure 910 inhibits (e.g., prevents) exposure of the third plurality of blocks 150 to wind forces as they are lifted or lowered to store potential energy or generate electricity, thereby increasing the efficiency of power generation of the energy storage system 100A.

In one example, the third plurality of blocks 150 of the energy storage assembly 930 that are stacked and unstacked within each quadrant defined by the windbreak structure 910 and the cross-members 920. In such an example (see FIG. 5), the blocks 150 that define the windbreak structure 910 and the cross-members 920 are not moved. Optionally, rebar can be inserted through bores (e.g., bores 157, see FIG. 13A) of the blocks 150 that define the windbreak structure 910 to increase the rigidity of the windbreak structure 910; optionally, the bores (e.g., bores 157, see FIG. 13A) of the blocks 150 that define the windbreak structure 910 can additionally or alternatively be filled with concrete so the windbreak structure 910 is a monolithic structure.

In another example (see e.g., FIG. 6A-6E), the first plurality of blocks 150 that define the windbreak structure 910 and/or the second plurality of blocks 150 that define the cross-members 920 can also be lifted or lowered to store potential energy or generate electricity. FIGS. 6A-6B show the tower 900 in the fully stacked arrangement (e.g., fully charged or at approximately maximum potential energy storage level). FIGS. 6C-6E show the tower 900 in a discharged arrangement (e.g., at approximately a fully discharged arrangement with a lower, for example minimum, potential energy storage level).

As described further below, in one example each of the blocks 150 have a length L that is approximately twice the width W of the blocks 150. Therefore, the blocks 150 can be stacked with an east-west orientation, or north-south orientation, for example in alternating patterns (e.g., each level or floor of the tower 900 can have a tiling pattern different than the tiling pattern of adjacent levels or floors). Accordingly, the blocks 150 can advantageously be interleaved, as further described below, to enhance the structural integrity and stability of the stacked blocks 150 (e.g., stability of the tower 900).

Bridge Crane Design

FIGS. 7A-7D show an example energy storage system 100G (the "system") operable to convert electrical energy or electricity into potential energy for storage, and to convert potential energy into electrical energy or electricity, for example, for delivery to an electrical grid. Some of the features of the energy storage system 100G are similar to features of the energy storage system 100 in FIGS. 1-3 and system 100A in FIGS. 5-6E. Thus, the same numerical identifiers are used, except that a "G" is added to the numerical identifiers for the energy storage system 100G, and the structure and description for the various features of the energy storage system 100 in FIGS. 1-3 and system 100A in FIGS. 5-6E are understood to also apply to the corresponding features of the energy storage system 100G in FIGS. 7A-7D, except as described below.

The energy storage system 100G differs from the energy storage system 100 and energy storage system 100G in that the crane 101G rests on a pair of rails 902G. In one example, the crane 101G defines a bridge 104G with one or more sets of wheels 103G on opposite ends of the bridge 104G. In one example, the wheel(s) 103G can move along the rails 902G, thereby allowing the bridge 104G of the crane 101G to be moved, repositioned or otherwise travel along a length of the rails 902G (e.g., in a first direction). The crane 101G can also include one or more trolleys 106G coupled to the bridge 104G. In one example, the trolley(s) 106G are movably coupled to the bridge 104G, allowing the trolley(s) 106G to move or otherwise travel along a length of the bridge 104G (e.g., in a second direction perpendicular to the first direction). One or more cables 108G are movably coupled to the trolley(s) 106G. For example, the cable(s) 108G are coupled to a winch of the trolley(s) 106G that is operable to retract (e.g., wind) or extend or pay out (e.g., unwind) the cable(s) 108G relative to the trolley(s) 106G (e.g., relative to a winch on the trolley(s) 106G). The one or more cable(s) 108G can couple to a grabber 500 (described further below), which can be selectively actuatable to couple to a block 150. Though the drawings show one cable 108G attached to each trolley 106G on the bridge 104G, one of skill in the art will recognize that a pair of cables 108 can be coupled to the trolley 106G at one end and to a pulley assembly at an opposite end via which they operatively couple to the block 150 (e.g., via the grabber 500 discussed below).

The crane 101G advantageously defines a Cartesian coordinate system in which the blocks 150 are moved (e.g., the rails 902G defining a first axis or direction, and the bridge 104G defining a second axis or direction that is perpendicular to the first axis or direction). In one example, movement of one or both of the bridge 104G along the rail(s) 902G and the trolley(s) 106G along the bridge 104G allow the crane 101G to position one or more of the blocks 150 in different Cartesian coordinate positions. In one example, the grabber 500 is operable to lift (e.g., vertically lift) a block 150 from a first (start) position (e.g., first Cartesian coordinate location), transfer the block 150 (to a second Cartesian coordinate location different than the first Cartesian coordinate location) and lower (e.g., vertically lower) the block 150 to a second (finish) position.

The stack of blocks 150 define a tower 900G (e.g., having a generally square cross-sectional shape when viewed from above). In one example, the tower 900G can have between 40 and 60 levels or floors of blocks 150. The tower 900G includes a plurality of blocks 150 arranged to form a windbreak structure 910G. In one example, the rail(s) 902G can be supported on a top layer of the windbreak structure 910G (e.g., the pair of rails 902G can be coupled to, disposed on or otherwise attached to a top surface 151A of the blocks 150 that define the top layer of the windbreak structure 910G).

In one example, the windbreak structure 910G has a generally square or rectangular shape (e.g., having a periphery with a generally square cross-sectional shape when viewed from above). A second plurality of blocks 150 define an energy storage assembly 930G that can be stacked an unstacked within the space defined (e.g., bounded) by the windbreak structure 910G to store electrical energy or electricity as potential energy and convert potential energy to electrical energy or electricity, as previously discussed. Advantageously, the windbreak structure 910 inhibits wind forces on the second plurality of blocks 150 as they are lifted or lowered to store potential energy or generate electricity, thereby increasing the efficiency of power generation of the energy storage system 100G. In one example, rebar and/or concrete can optionally be inserted through bores (e.g., bores 157, see FIG. 13A) of the blocks 150 that define the windbreak structure 910G to increase the rigidity of the windbreak structure 910G (e.g., so the windbreak structure 910G is a monolithic structure).

Figure 7A:
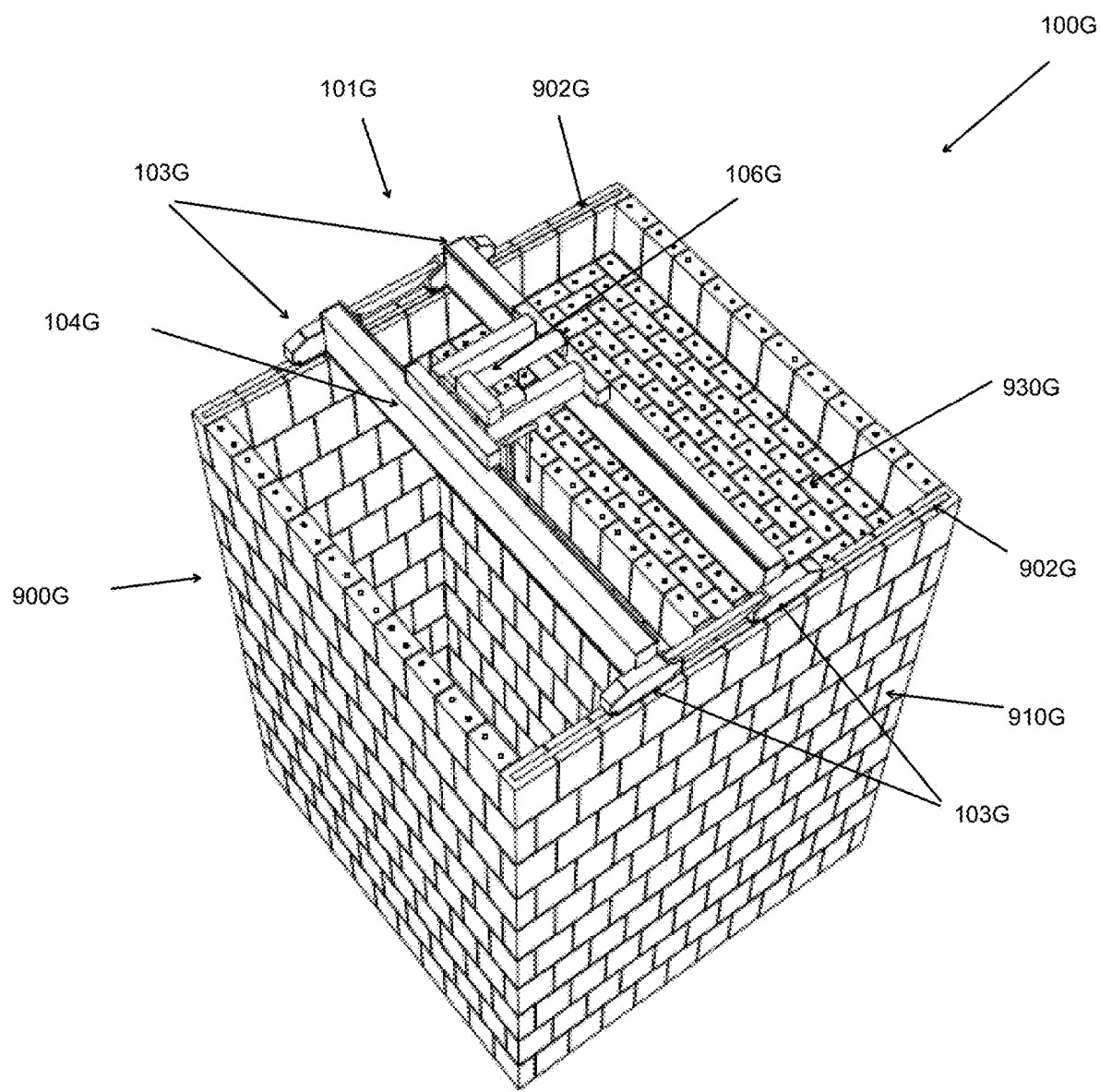
FIG. 7A is a perspective view of an energy storage system having a square tower form with an overhead bridge crane, in one operational configuration.
Figure 7B:
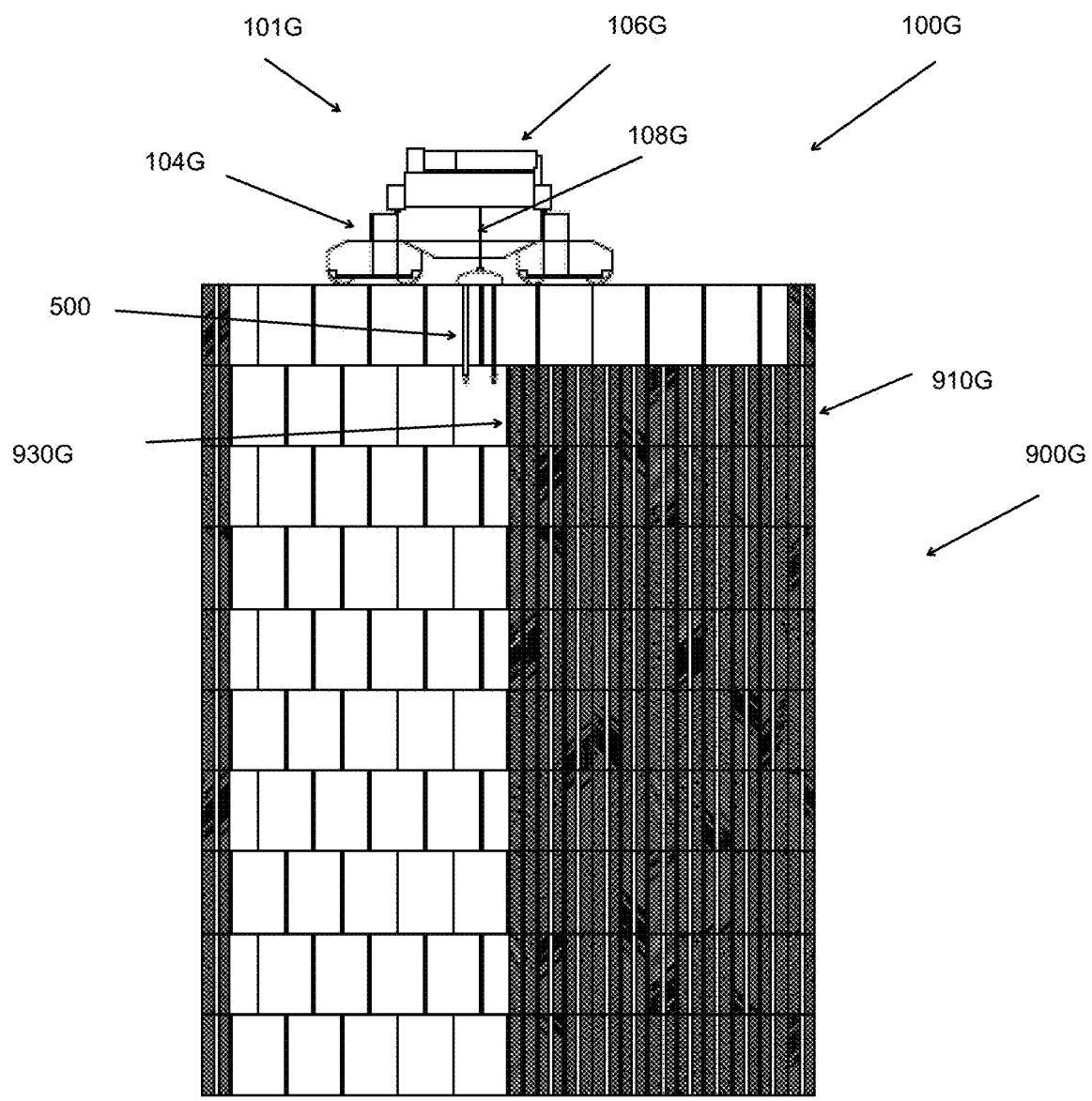
FIG. 7B is a cross-sectional view of the square tower in FIG. 7A.
Figure 7C:
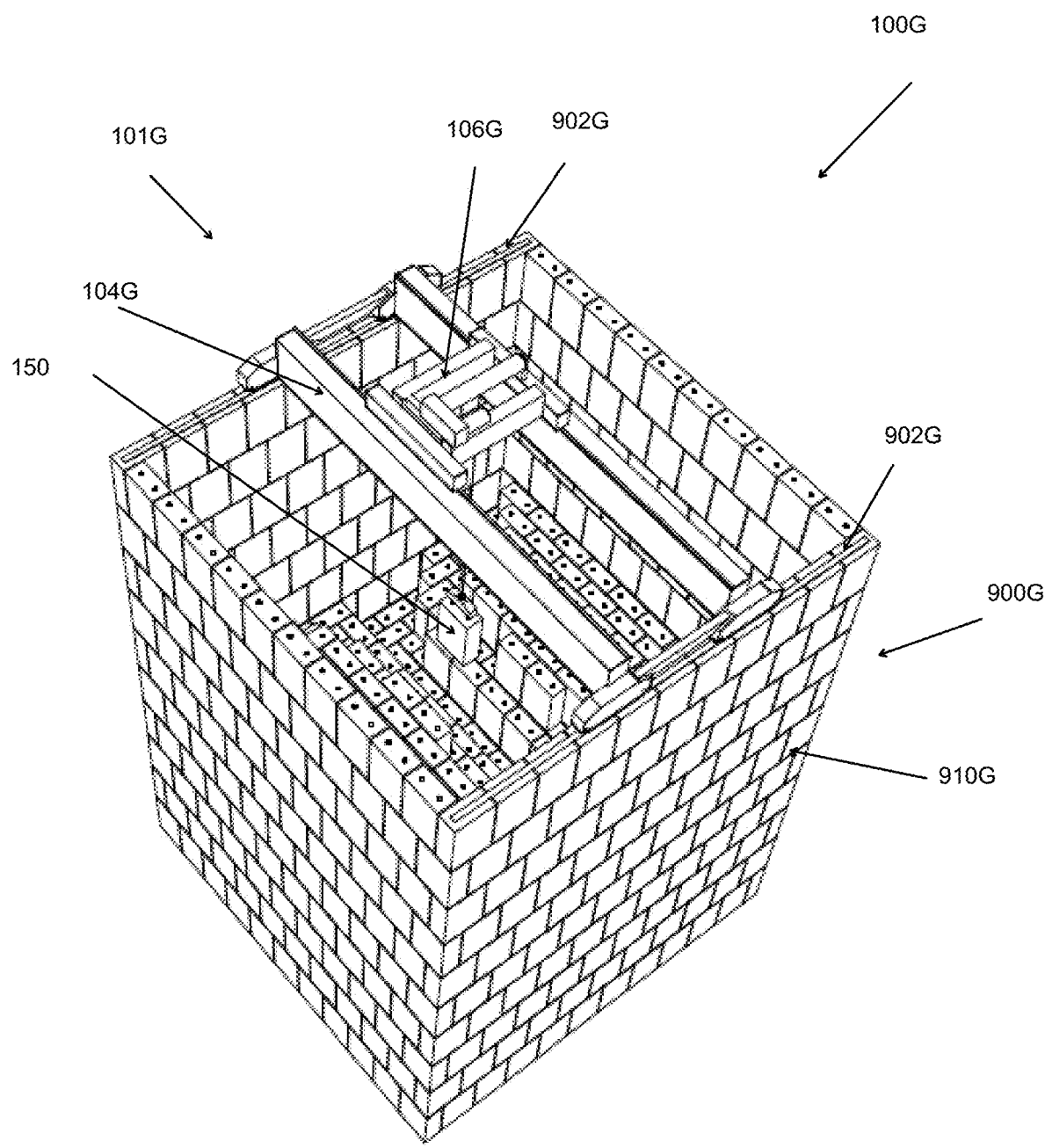
FIG. 7C is a perspective view of the energy storage system of FIG. 7A, in another operational configuration.
Figure 7D:
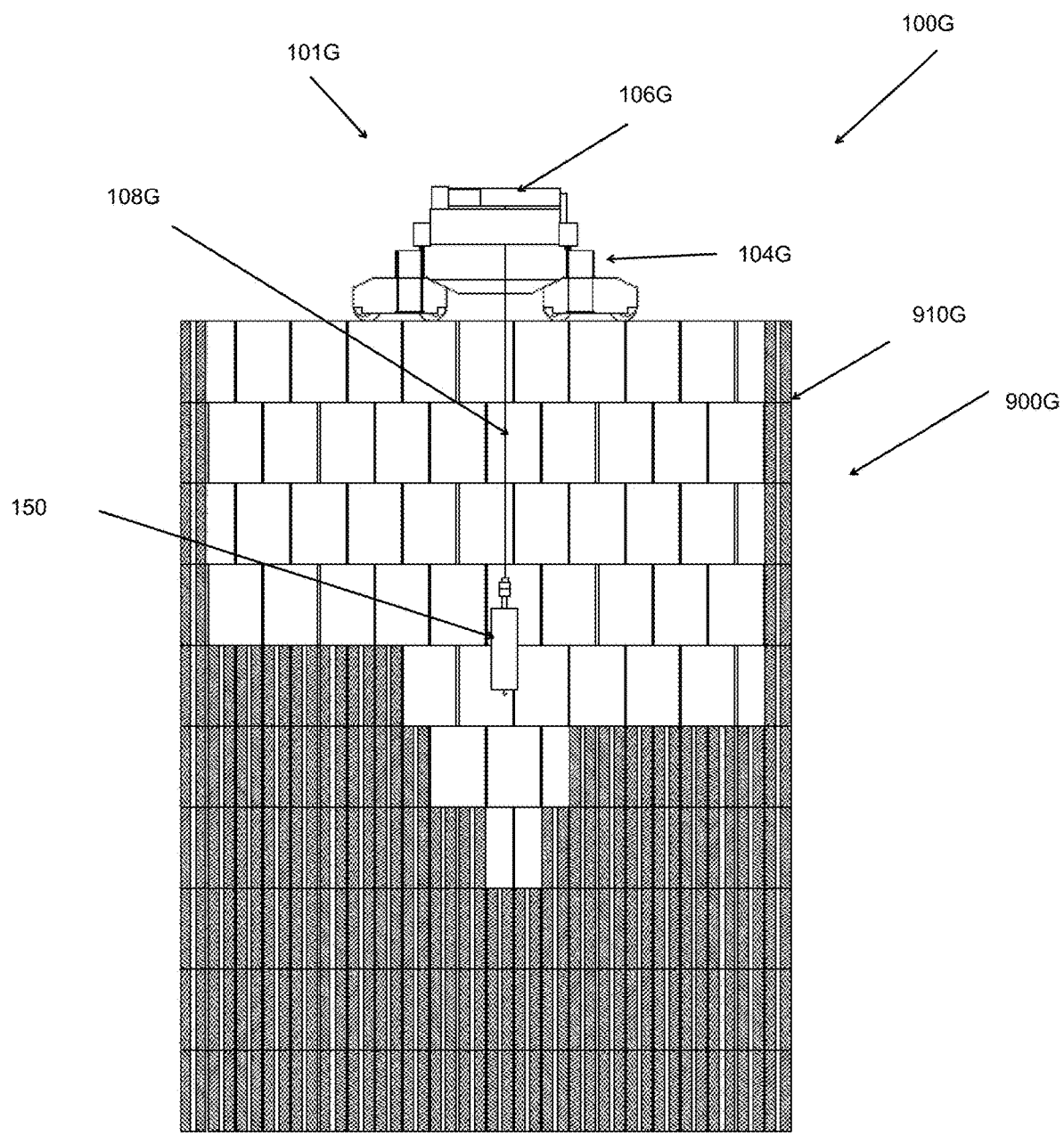
FIG. 7D is a cross-sectional view of the square tower in FIG. 7C.
Figure 8A:
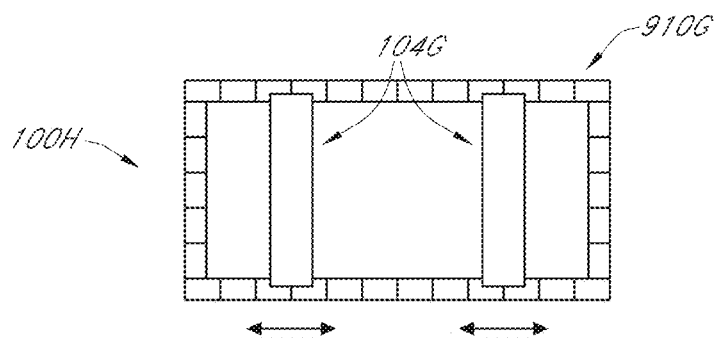
FIGS. 8A-8H are schematic top views of energy storage systems with an overhead bridge crane.
Figure 8B:
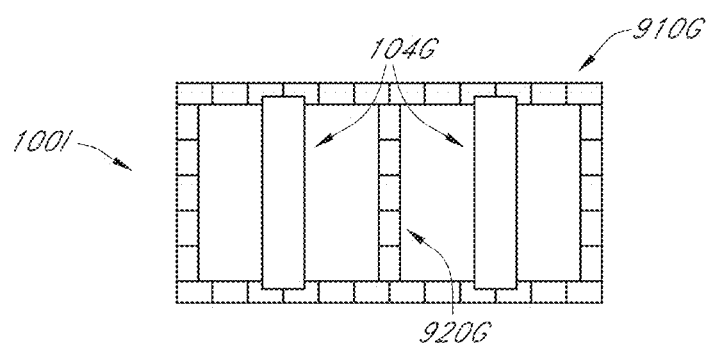
Figure 8C:
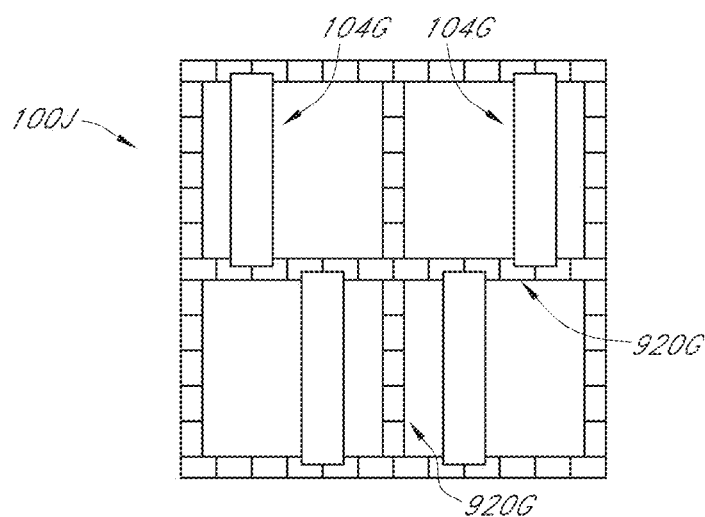
Figure 8D:
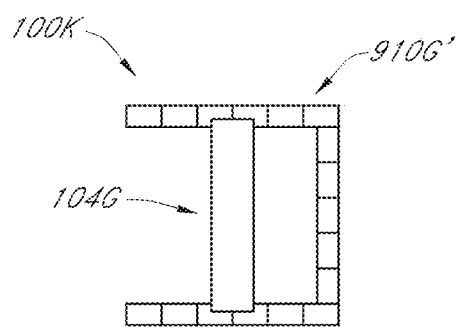
Figure 8E:
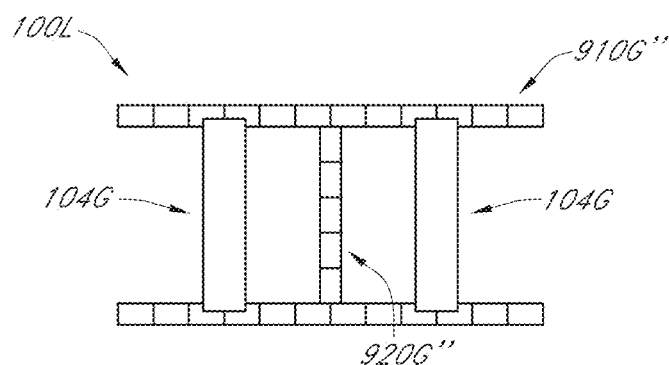
Figure 8F:
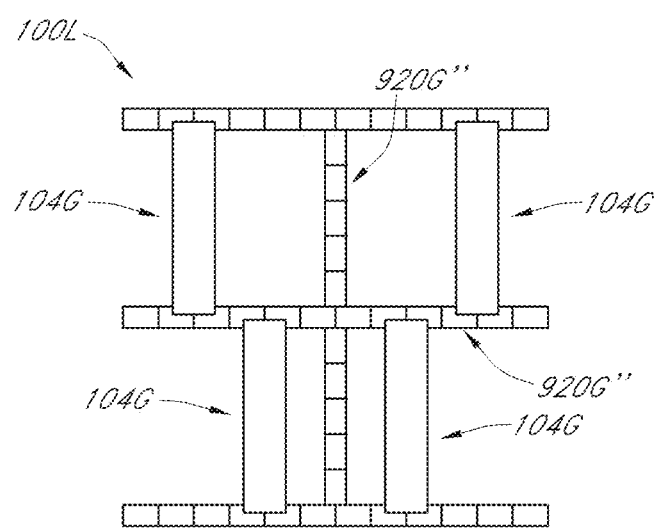
Figure 8G:
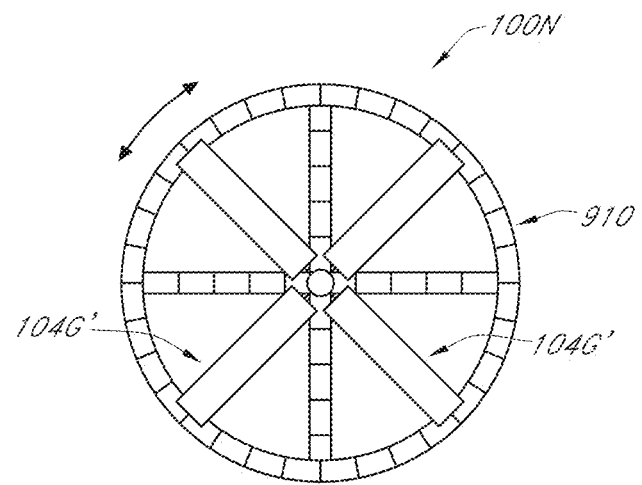
Figure 8H:
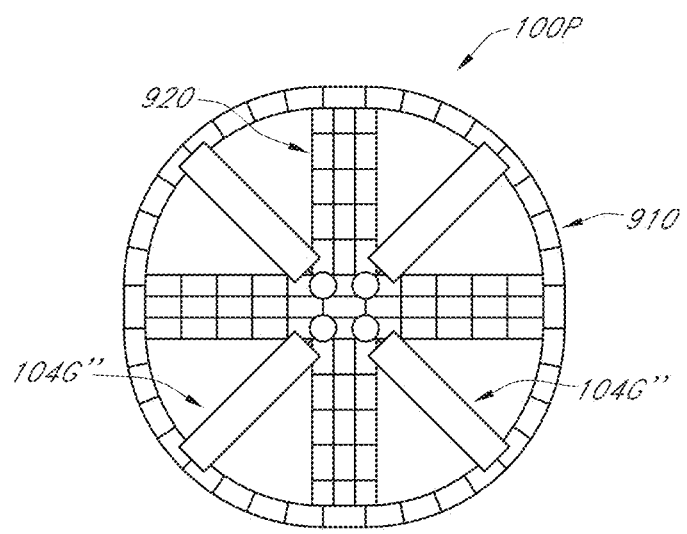

FIGS. 7A-7B show the tower 900 in the fully stacked arrangement (e.g., fully charged or at approximately maximum potential energy storage level). FIGS. 7C-7D show the tower 900 in a discharged arrangement (e.g., at approximately a fully discharged arrangement with a lower, for example minimum, potential energy storage level).

As described further below, in one example each of the blocks 150 have a length L that is approximately twice the width W of the blocks 150. Therefore, the blocks 150 can be stacked with an east-west orientation, or north-south orientation, for example in alternating patterns (e.g., each level or floor of the tower 900 can have a tiling pattern different than the tiling pattern of adjacent levels or floors). Accordingly, the blocks 150 can advantageously be interleaved, as further described below, to enhance the structural integrity and stability of the stacked blocks 150 (e.g., stability of the tower 900G).

FIGS. 8A-8H show other example energy storage systems 100H-100P. Energy storage systems 100H-100M are similar to the energy storage system 100G, except as described below. Thus, the same numerical identifiers are used, and the structure and description for the various features of the energy storage system 100G in FIGS. 7A-7D are understood to also apply to the corresponding features of the energy storage systems 100H-100M in FIGS. 8A-8F, except as described below. Energy storage systems 100N, 100P are similar to energy storage system 100A, except as described below. Thus, the same numerical identifiers are used, and the structure and description for the various features of the energy storage system 100A in FIGS. 5-6E are understood to also apply to the corresponding features of the energy storage systems 100N, 100P in FIGS. 8G-8H, except as described below.

Energy storage system 100H differs from the energy storage system 100G solely in that the windbreak structure 910G has a rectangular shape (when viewed from above) and in that the crane 101G has two bridges 104G that move (linearly) along the rails 902G, each of the bridges 104G having a corresponding trolley 106G that winds and unwinds a cable 108G coupled to it to lift and lower blocks 150 (e.g., via the grabber 500, discussed further below). In one example, the windbreak structure 910G has a width of approximately 60 m and depth of approximately 30 m, when viewed from above. Other suitable dimensions are possible.

Energy storage system 100I differs from the energy storage system 100H solely in that it adds a cross-member 920G that can optionally buttress (e.g., support) the windbreak structure 910G. In one example, the cross-member 920G is generally planar and divides the space defined (e.g., bounded) by the windbreak structure 910G into two halves. Each of the bridges 104G optionally operates (e.g., moves linearly) in each of the halves to move blocks 150 within its associated half.

Energy storage system 100J differs from the energy storage system 100G in that it adds four cross-members 920G that (e.g., extend from a center of the tower 900G and) divide the space defined (e.g., bounded) by the windbreak structure 910G into four quadrants. The energy storage system 100J optionally has four bridges 104G, one operating (e.g., moving linearly) in each of the quadrants to move blocks 150 within its associated quadrant.

Energy storage system 100K differs from the energy storage system 100G solely in that the windbreak structure 910G is C-shaped with an open end, rather than a square.

Energy storage system 100L differs from the energy storage system 100I solely in that the windbreak structure 910G has two open ends so that the windbreak structure 910G and the cross-member 920G define an I-shape (when viewed from above).

Energy storage system 100M differs from the energy storage system 100J solely in that the windbreak structure 910G has four open ends so that the windbreak structure 910G and the cross-member 920G define a double I shape (when viewed from above).

Energy storage system 100N differs from the energy storage system 100A in that instead of jibs 104 the crane 101 has bridges 104 that move or rotate about a center of the tower 900 (when viewed from above). Optionally, an end of the multiple bridges 104 moves along a rail attached to a top of the cylindrical windbreak structure 910G, allowing the bridges 104 to rotate in a polar manner and move blocks 150 between different polar coordinate positions.

Energy storage system 100P differs from the energy storage system 100A in that it has four bridges 104G, each having one end coupled proximate a center of the tower 900 and an opposite end movably coupled to a portion of the cylindrical windbreak structure 910. Each of the bridges 104G optionally operates to pivot about the center of the tower 900 to move blocks 150 within its associated quadrant of the tower 900.

Figure 9:
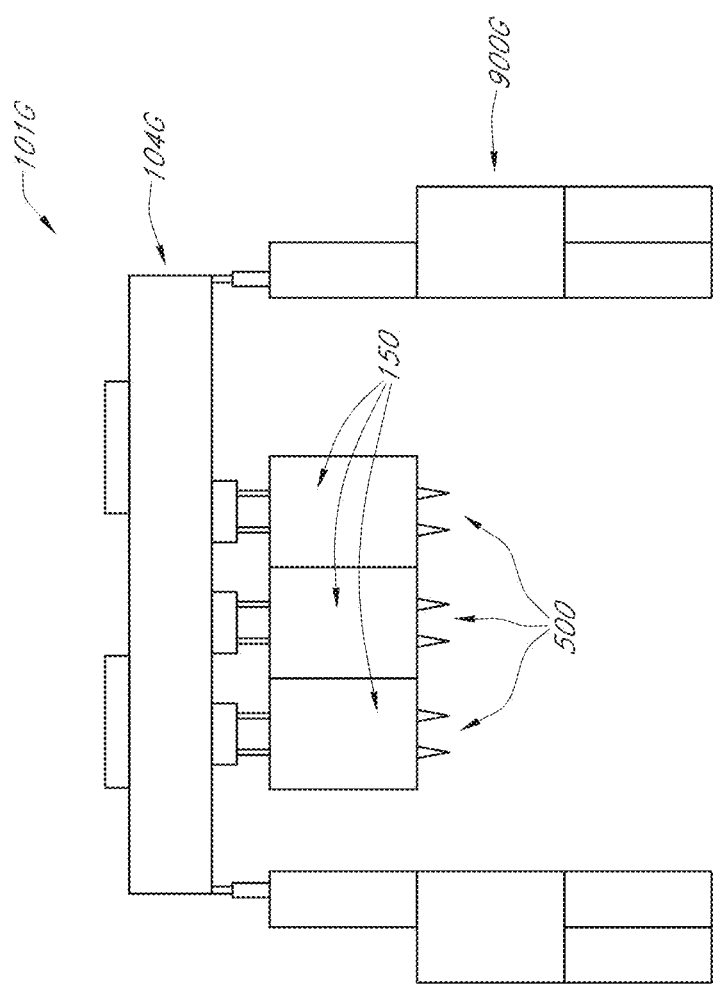
FIG. 9 is a partial schematic side view of an energy storage system with an overhead bridge crane.

FIG. 9 shows an example crane 101G with a bridge 104G that can optionally be used with the energy storage systems 100G in FIGS. 7A-7D and 100H-100M in FIGS. 8A-8F. The bridge 104G can optionally move multiple blocks 150 at the same time. In one example, the bridge 104G can have one or more trolleys 106G that winds and unwinds multiple cables 108G operatively coupled to multiple (e.g., 3) grabbers 500 (described below). Therefore, the multiple cables 108 and grabbers 500 can selectively couple to multiple (e.g., 3) blocks 150 at the same time (e.g., can lift, transfer and lower the multiple blocks 150 at the same time).

Block Layout

Figure 10A:
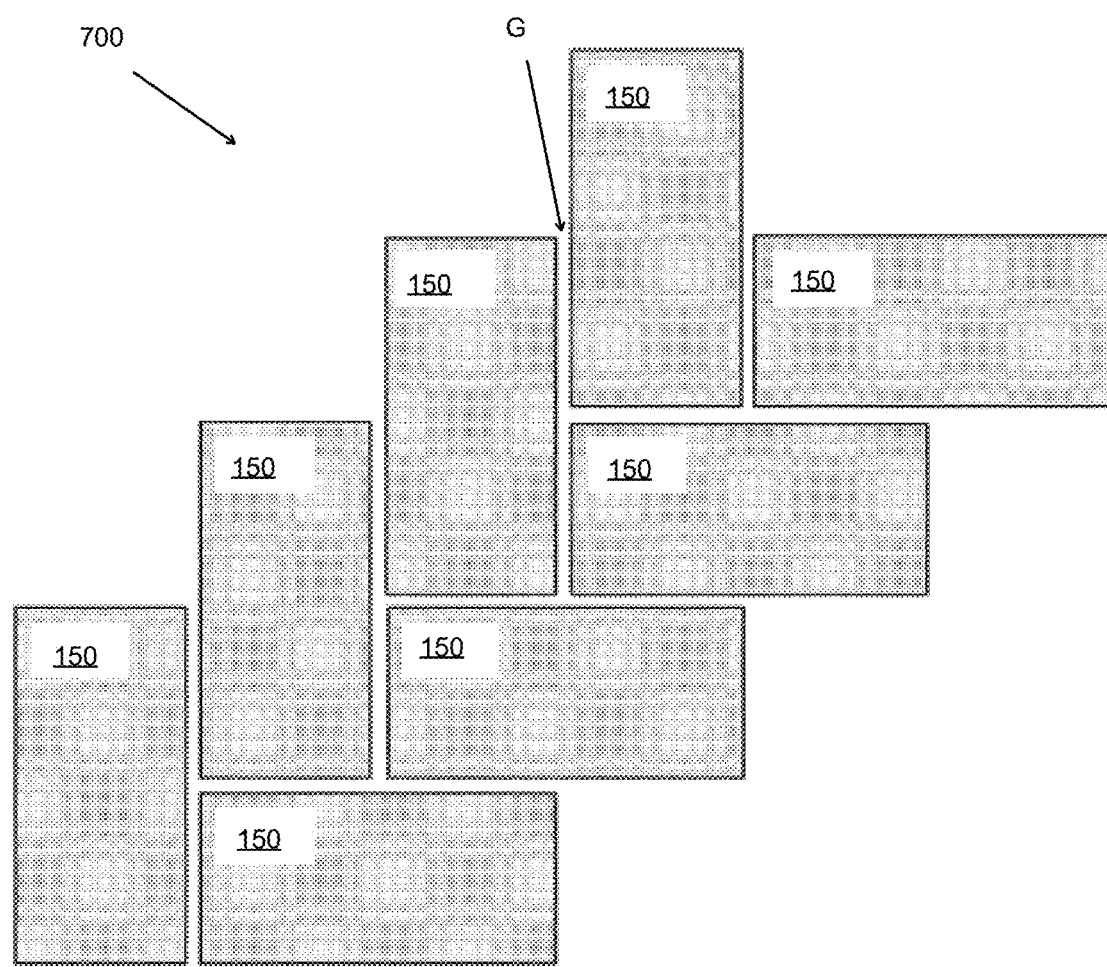
FIG. 10A is a schematic view of a first layer of blocks in an energy storage system.
Figure 10B:
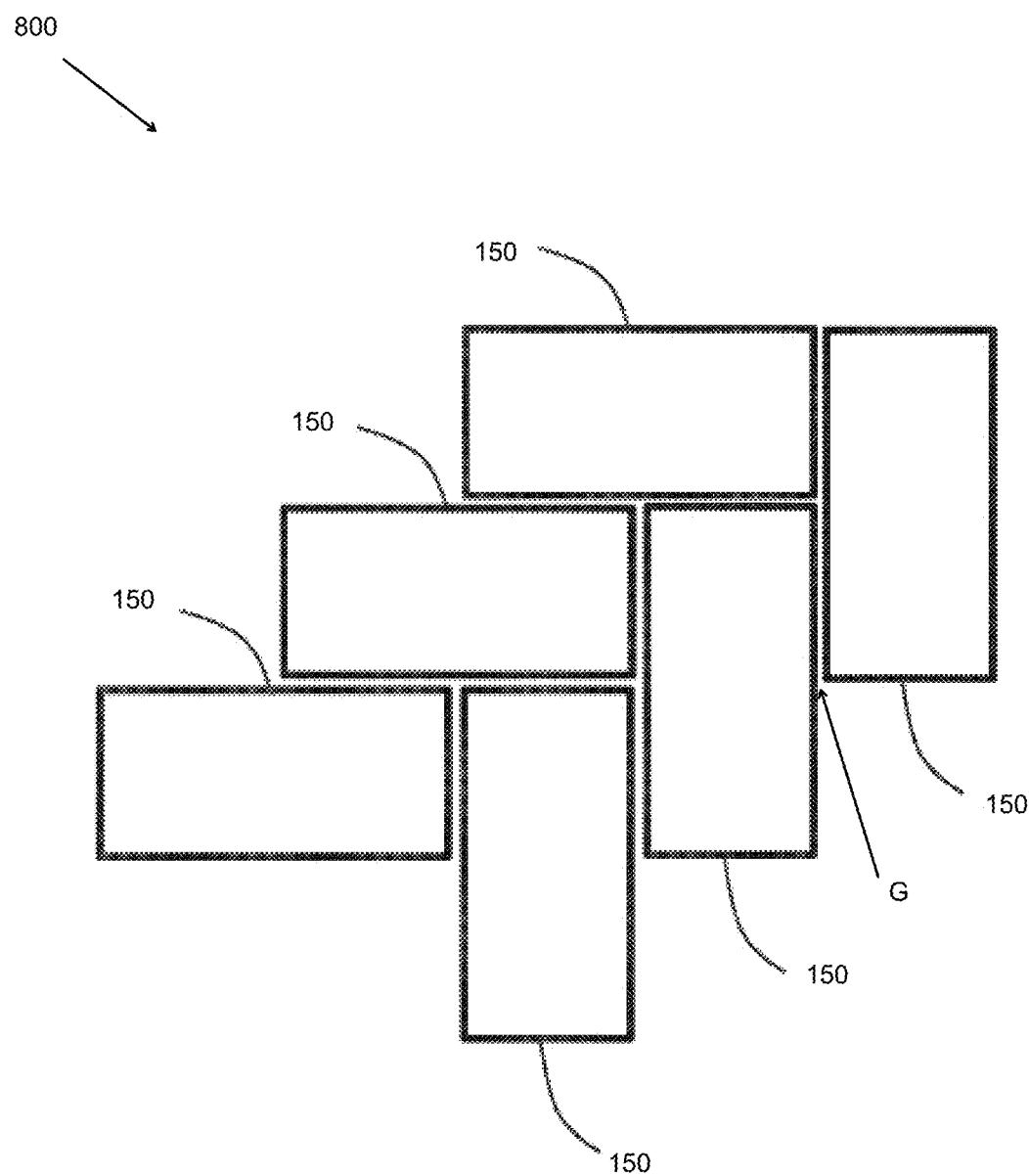
FIG. 10B is a schematic view of a second layer of blocks disposed above the first layer of blocks in an energy storage system.

FIGS. 10A-10B show two different layers of blocks 150 (e.g., of the energy storage system 100, 100A, 100G-100P). In one example, the two different layers of blocks 150 can be used in defining at least a portion of different levels in the tower or stack 900, 900G, such as different portions of the windbreak structure 910 and/or energy storage assembly 930 (e.g., the plurality of blocks 150 that are moved to store and generate electrical energy or electricity). In one example, one or more of the blocks 150 are stacked on top of two other blocks 150 (e.g., to interleave the blocks 150), which advantageously inhibits (e.g., prevents) lateral movement of the blocks 150 in the tower or stack 900, 900G (e.g. provides a more stable tower or stack) and/or inhibits (e.g., prevents) tipping of the tower or stack 900, 900G.

Figure 10C:
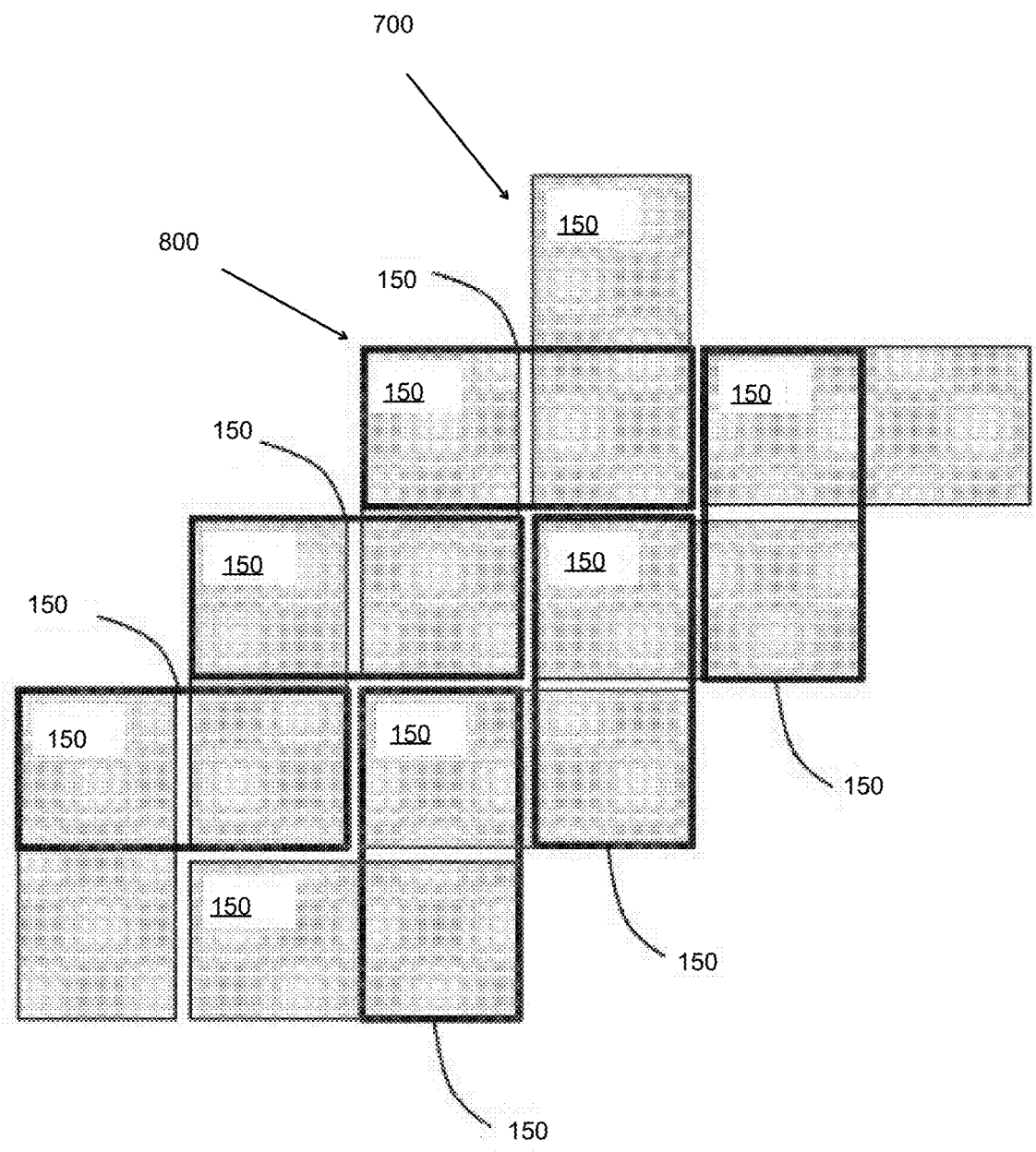
FIG. 10C is a schematic view of the first and second layer of blocks in FIGS. 10A-10B superimposed on each other.

FIG. 10A shows blocks 150 of a first layer 700 that are stacked tightly with minimal space between the blocks 150. FIG. 10B shows blocks 150 of a second layer 800 that are stacked on top the first layer 700 of blocks 150. FIG. 10C illustrates the second layer 800 laid atop the first layer 700 so as to make each block 150 of the second layer 800 rest on two blocks 150 of the first layer 700. In one example, this pattern is repeated in other layers (e.g., in all layers) of the tower or stack 900, 900G. In one example, two or more patterns (e.g., 3 or 4 tiling patterns) for the blocks 150 can be used in the layers, levels or floors that form the tower or stack 900, 900G. In one example, four different tiling patterns of blocks 150 can be used to construct or form the tower or stack 900, 900G.

The blocks 150 in the layers (e.g., first layer 700 and second layer 800, all layers, levels or floors) of the tower or stack 900, 900G are arranged (e.g., lowered or positioned by the grabber 500, described below) so that the sides of the blocks 150 do not contact each other and define a gap G between opposite surfaces of laterally adjacent blocks 150, which advantageously inhibits (e.g., prevents) friction and wear between blocks 150 as they are lifted from a first (starting) position and lowered into a second (finish) position. In one example, the gap G is between about 50 mm and about 200 mm (e.g., 50 mm, 70 mm 100 mm, 150 mm, 200 mm, etc.).

Block Design

FIGS. 11A-13C show an example pair of blocks 150. Optionally, the pair of blocks 150 are identical. The block 150 optionally has a rectangular shape with a length L, width W and depth D (e.g., any two of the length L, width W and depth D defines a rectangular surface). In one example, the length L is approximately twice the width W of the block 150. In one example, the width W is approximately twice the depth D of the block 150. In one example, the block 150 has an aspect ratio for the length L to width W to depth D of 4:2:1. In another example, the block 150 has an aspect ratio for the length L to width W to depth D of 3:2:1. In one example, the block 150 has a length of approximately 4 meters (m). Advantageously, the aspect ratio of the block 150 allows for the stability of the blocks 150 when stacked, and therefore the stability of the stack structure, while reducing the number of layers or floors of blocks 150 to define the desired height of the stack structure, such as the tower 900, 900G described above. The block 150 can optionally weigh between approximately 20 tons and 60 tons, such as approximately 55 tons. However, in other examples, the block 150 can weigh other suitable amounts. In one example, blocks 150 that define the upper (e.g., top layer, top two) layers of the stack structure, such as the tower described above, can weigh more than blocks 150 that define the lower (e.g., bottom, bottom two, etc.) layers of the stack structure.

The block 150 has a top portion 151 that defines a top surface 151, a middle portion 152 that defines a peripheral surface 152A, and a bottom portion or base 153 that defines a bottom surface 153A. In one example, the peripheral surface 152 can have front and rear surfaces 152A1 and left/right side surface 152A2. In one example, each of the front/rear surfaces 151A1 is connected to the left/right side surfaces 152A2 via a facet surface (e.g., chambered or beveled surface) 152A3. The facet surface 152A3 optionally extends at 45 degrees to the front rear surface 151A1 and left/right side surfaces 152A2.

The top portion 151, middle portion 152 and bottom portion 153 optionally define an outer layer or shell S of the block 150. In one example, the top portion 151 can have a thickness t1 of approximately 10-25 cm, such as 10 cm. In one example, the bottom portion 153 can have a thickness t2 of approximately 10-25 cm, such as 15 cm. In one example, top portion 151 can have a peripheral chamfered surface 151C (e.g., that extends at approximately 45 degrees between the top surface 151A and the peripheral surface 152A).

The block 150 includes a ballast mass 154 (e.g., load-bearing filler material) enclosed in the shell S. In one example, the ballast mass 154 is of a different material than the material of the shell S. For example, the ballast mass or load-bearing filler material 154 can be soil, coal, fly ash, debris, demolition material, gravel, building waste and/or recycled material mixed with and/or pressed with low-grade or inexpensive concrete, as discussed below. This advantageously reduces the cost of manufacturing the block 150 and provides a mechanism for dispensing of material (e.g., demolition material, building waste, debris, etc.) that would otherwise be sent to a landfill. In another example, the ballast mass 154 and shell S are of the same material (e.g., define a monolithic or single mass without any boundaries or seams). Optionally, the block 150 can be reinforced (e.g., with steel), such as with one or more reinforcement layers 155 of mesh steel or rebar (e.g., structural steel) located in one or more of the top portion 151, middle portion 152 and bottom portion 153.

The block 150 can optionally be made at least in part of concrete (e.g., the shell S of the block 150 can be made of concrete). Advantageously, because concrete has a higher density than water, the volume of the block 150 can store more potential energy than a corresponding volume of water. In one implementation, at least a portion of the block 150 can be made of high performance concrete (e.g., having a compression strength of 10-60 megapascal (MPa), such as 25-40 MPa), which enables the block 150 to withstand the weight of multiple blocks 150 stacked thereon. In one example, at least a portion of the block 150 can be made of low grade concrete (e.g., having a compression strength lower than 10 MPa, such as 3-8 MPa). In one example, one or both of the top and bottom portions 151, 153 can be made of high performance concrete (e.g., having a compression strength of 10-60 MPa, such as 25-40 MPa) and the middle portion 152 can be made of low grade concrete (e.g., having a compression strength lower than 10 MPa, such as 3-8 MPa), having a strength sufficient to bear the load of the blocks placed on top of it. In examples where the entire block 150 is load-bearing, the compressive strength required of the block walls is reduced. In one example, blocks 150 that are used in lower layers of the stack, as described above, can have a higher compressive strength (e.g., more of the block 150 can be made of high performance concrete) to allow the blocks 150 in said lower layers to withstand the load of the rest of the layers of the stack placed upon it. In one example, the blocks 150 that are used in an upper (e.g., top) layer of the stack, as described above, can have a lower compressive strength (e.g., more of the block 150 can be made of low grade concrete) since said blocks 150 in the upper (e.g., top) layer of the stack support a lower load amount (e.g., blocks 150 in the top layer of the stack support no load).

The top surface 151A and bottom surface 153A can be substantially flat (e.g., manufactured so no portion of the surface varies more than 1 mm from a plane extending along the surface). The top and bottom surfaces 151A, 153A can extend generally parallel each other, and the middle portion 152 can extend vertically between the top and bottom portions 151, 153 (e.g., perpendicular to the top and bottom surfaces 151A, 153A). The flatness of the top and bottom surfaces 151A, 153A advantageously allows for substantially the entire bottom surface 153A of one block 150 to contact substantially the entire top surface 151A of a block immediately below it, enhancing the stability of stacked blocks 150.

The block 150 can have one or more bores 157 that extend between a proximal opening 156 in the top portion 151 and a distal opening 158 in the bottom portion 153. In one example, the block 150 has two bores 157A, 157B that extends between proximal openings 156A, 156B in the top portion and distal openings 158A, 158B in the bottom portion 153. In one example, the bores 157A, 157B optionally have a circular cross-section with a diameter of approximately 30 cm.

Figure 13A:
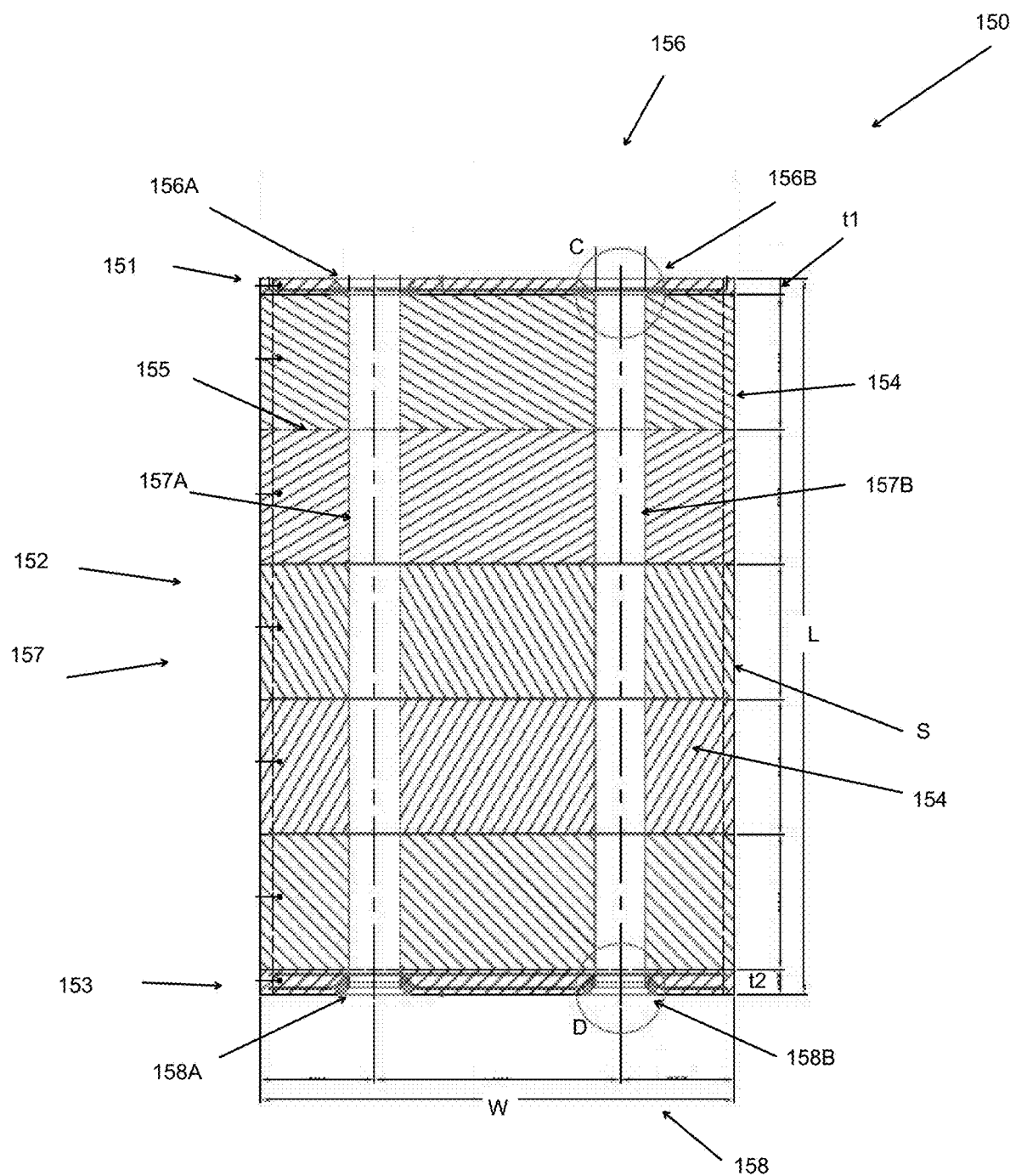
FIG. 13A is a cross-sectional view of a block in FIG. 12A.
Figure 13B:
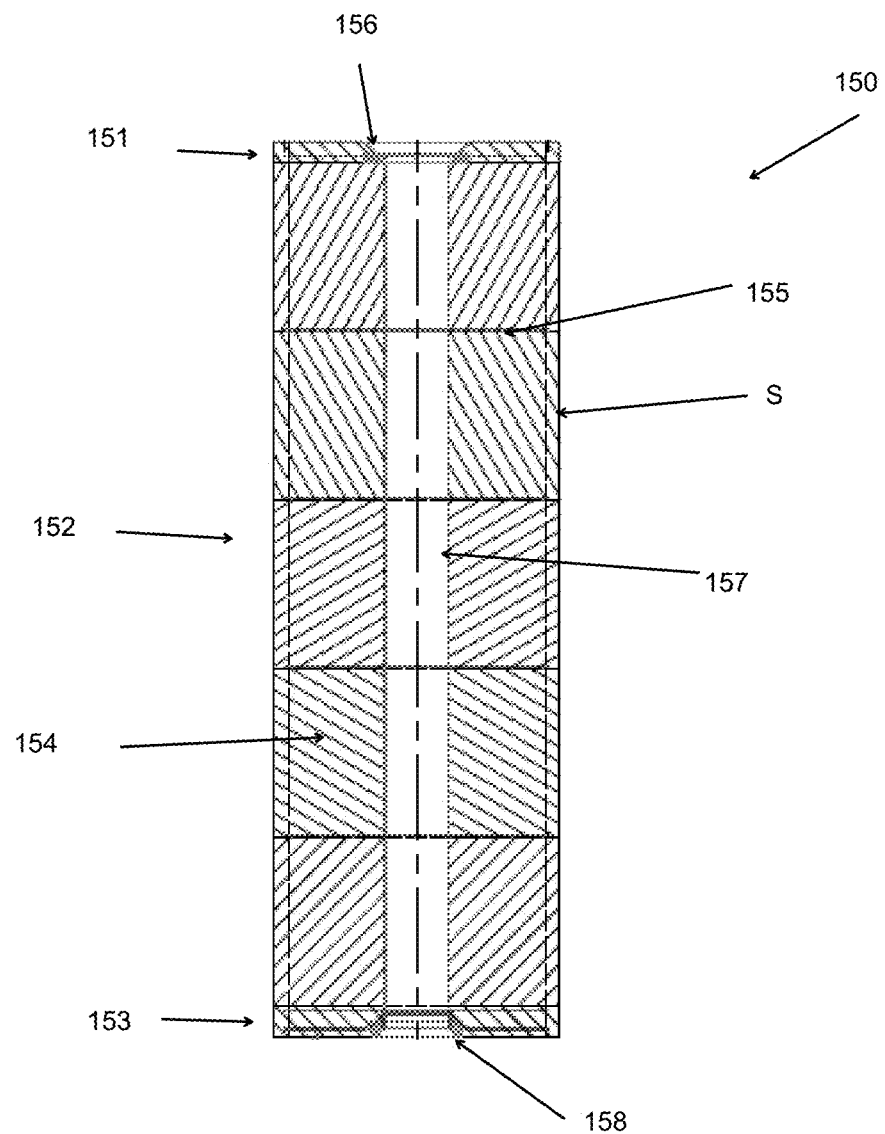
FIG. 13B is another cross-sectional view of the block in FIG. 12A.

The one or more proximal openings 156 (e.g., two openings 156A, 156B) and the one or more distal openings 158 (e.g., two distal openings 158A, 158B) are advantageously centered on the top surface 151A and bottom surface 153A, respectively, so that the block is symmetrical about a central axis along the width W of the block 150 as well as about a central axis along the depth D of the block 150. In FIG. 13A, the proximal openings 156A, 156B are centered on the top surface 151A so that the openings 156A, 156B are spaced the same distance from side ends of the blocks along the width W of the block 150, and the distal openings 158A, 158B are centered on the bottom surface 153A so that the openings 158A, 158B are spaced the same distance from side ends of the blocks along the width W of the block 150. This allows the block 150 to be rotated 180 degrees without altering the location of the bores 157A, 157B of the block 150, thereby allowing the bores 157A, 157B to remain aligned when one block 150 is placed directly on top of another block 150, even if rotated 180 degrees (e.g., all bores 157A, 157B in all blocks 150 in a stack, such as the tower or stack 900, 900G are aligned from the top floor or level of the stack to the bottom floor or level of the stack). Such centering of the bores 157A, 157B advantageously facilitates alignment of stacked blocks, as further discussed below.

Figure 12A:
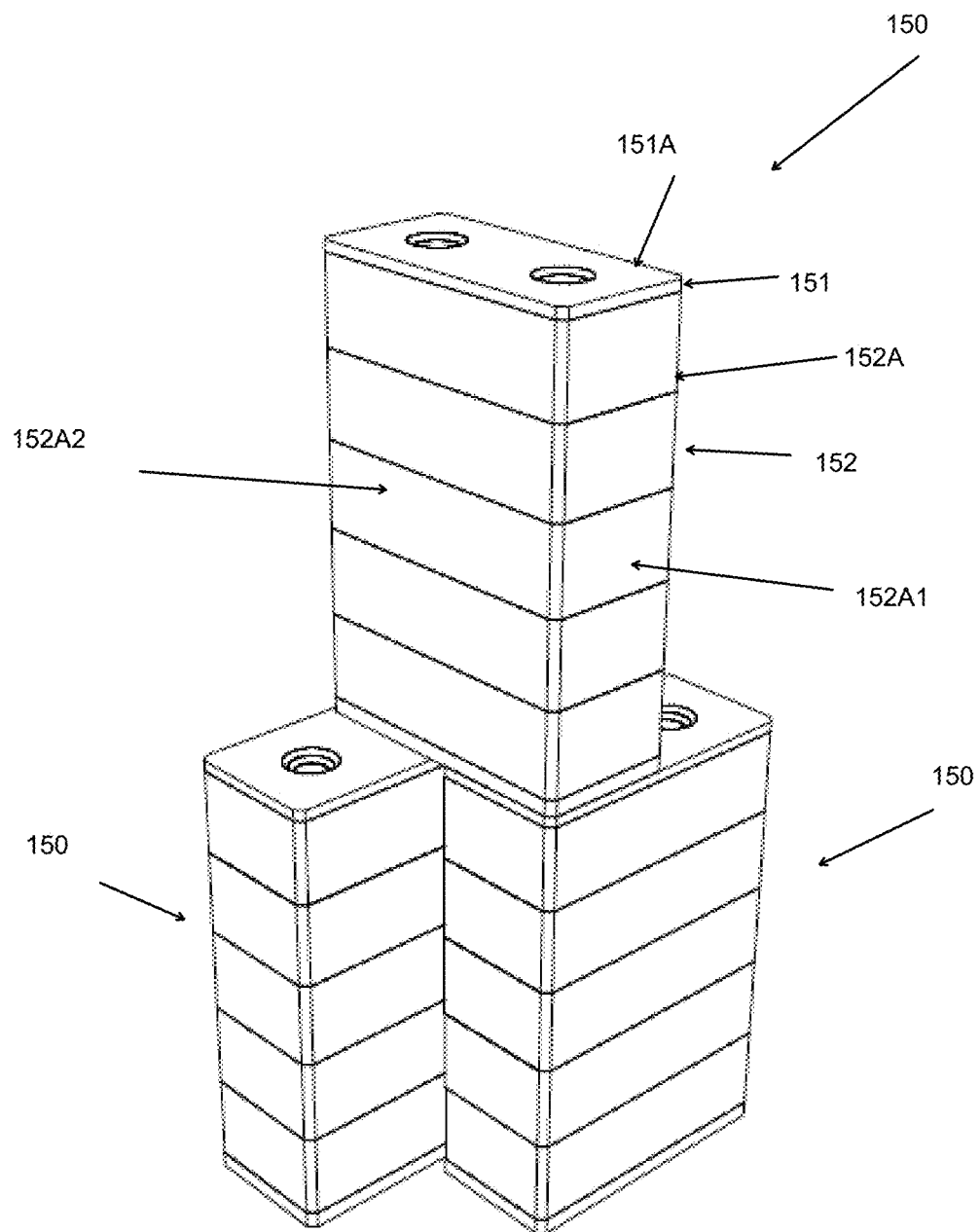
FIG. 12A is a perspective schematic top view of three blocks, one stacked over the other two.
Figure 12B:
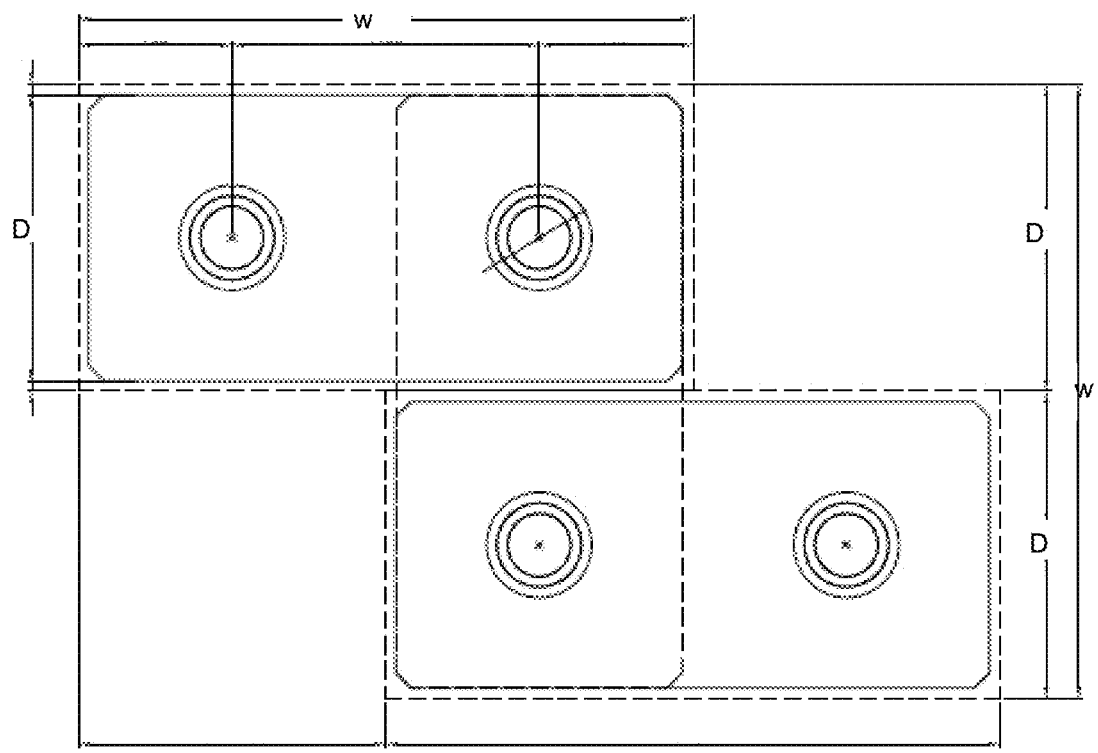
FIG. 12B is a schematic top view of the blocks in FIG. 12A.

Additionally, in examples where the length L of the blocks 150 is approximately twice the width W of the blocks 150, blocks 150 can be interleaved as shown in FIG. 12A, where two blocks are arranged on the same level and the same orientation, but offset by half their width W, as shown in FIG. 12B, and a third block 150 can be placed on top of them and oriented at 90 degrees, as shown in FIGS. 12A-12B. Because the bores 157A, 157B are centered, each of the bores in the top block 150 will align with one of the bores 157A, 157B in the bottom two blocks 150.

Figure 13C:
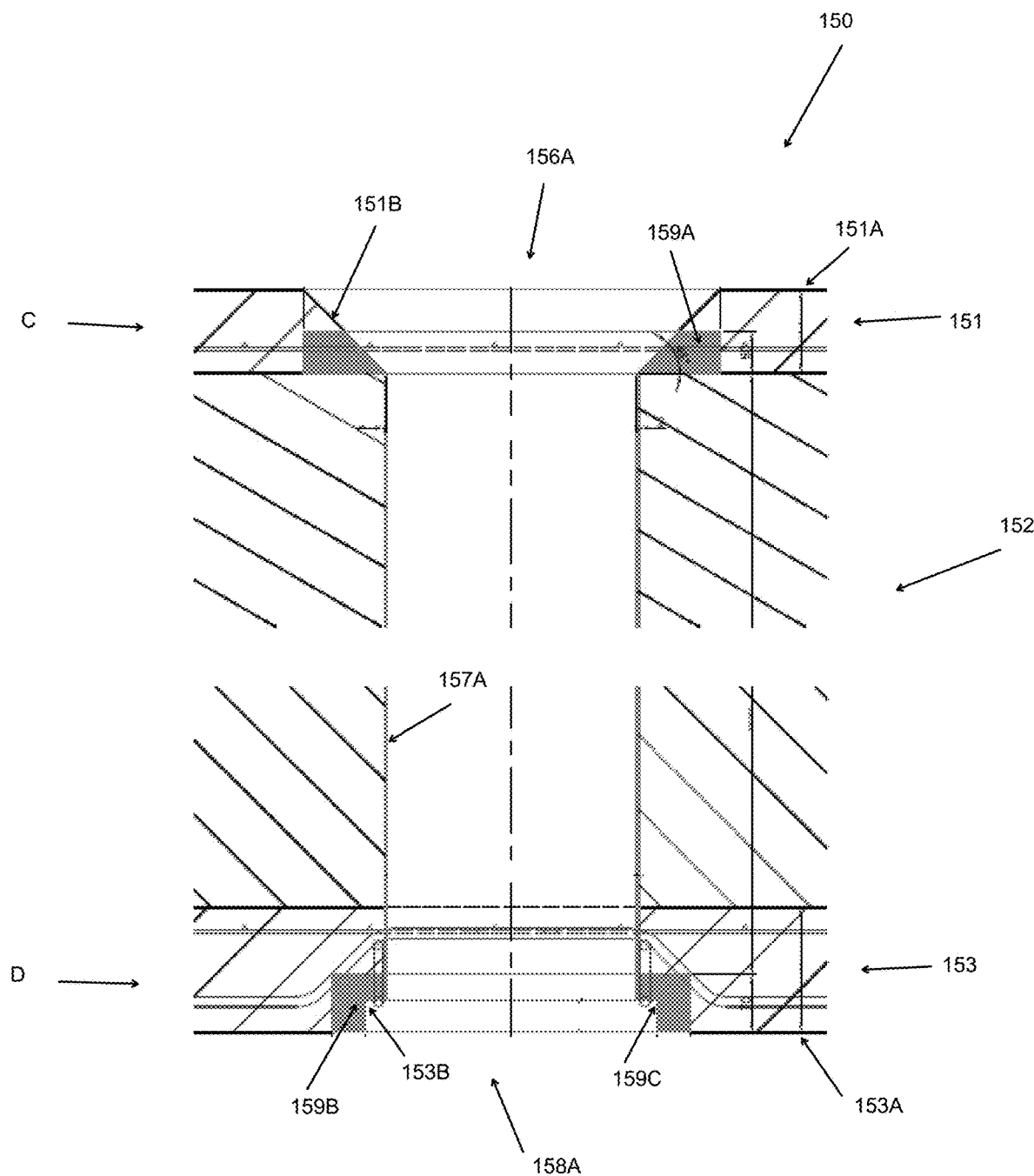
FIG. 13C is an enlarged cross-sectional view of a portion of the block shown in FIG. 13A.

With reference to FIG. 13C, the proximal openings 156A, 156B are optionally defined at least in part by a tapered (e.g., beveled, chamfered, conical) surface 151B that extends between the top surface 151A and the surface of the bore 157A, 157B. In on example, the top portion 151 can include a metal support or reinforcement (e.g., annular support) 159A. Optionally, the metal support or reinforcement 159A is embedded in the top portion 151. Optionally, the metal support or reinforcement 159A defines at least a portion of the openings 156A, 156B (e.g., defines at least a portion of the tapered or conical surface 151B).

In one example, the distal openings 158A, 158B are optionally defined at least in part by a stepped (e.g., recessed) surface 153B. In one example, the bottom portion 153 can include a metal support or reinforcement (e.g., annular support) 159B. Optionally, the metal support or reinforcement 159B defines at least a portion of the openings 158A, 158B (e.g., defines at least a portion of the stepped surface 153B). Optionally, the metal support or reinforcement 159B is embedded in the bottom portion 153. The metal support or reinforcement 159B defines an inner surface 159C (e.g., a shoulder surface) that allows the block 150 to be lifted and positioned as discussed further below. In another example, one or more protrusions (e.g., cylindrical protrusion) about the distal openings 158A, 158B can protrude from the bottom surface 153A of the block 150 and be shaped (e.g., be tapered) to fit into the proximal opening 156A, 156B of a block 150 on which it is placed, allowing for the interlocking of the blocks 150 when stacked.

Grabber Mechanism

Figure 14A:
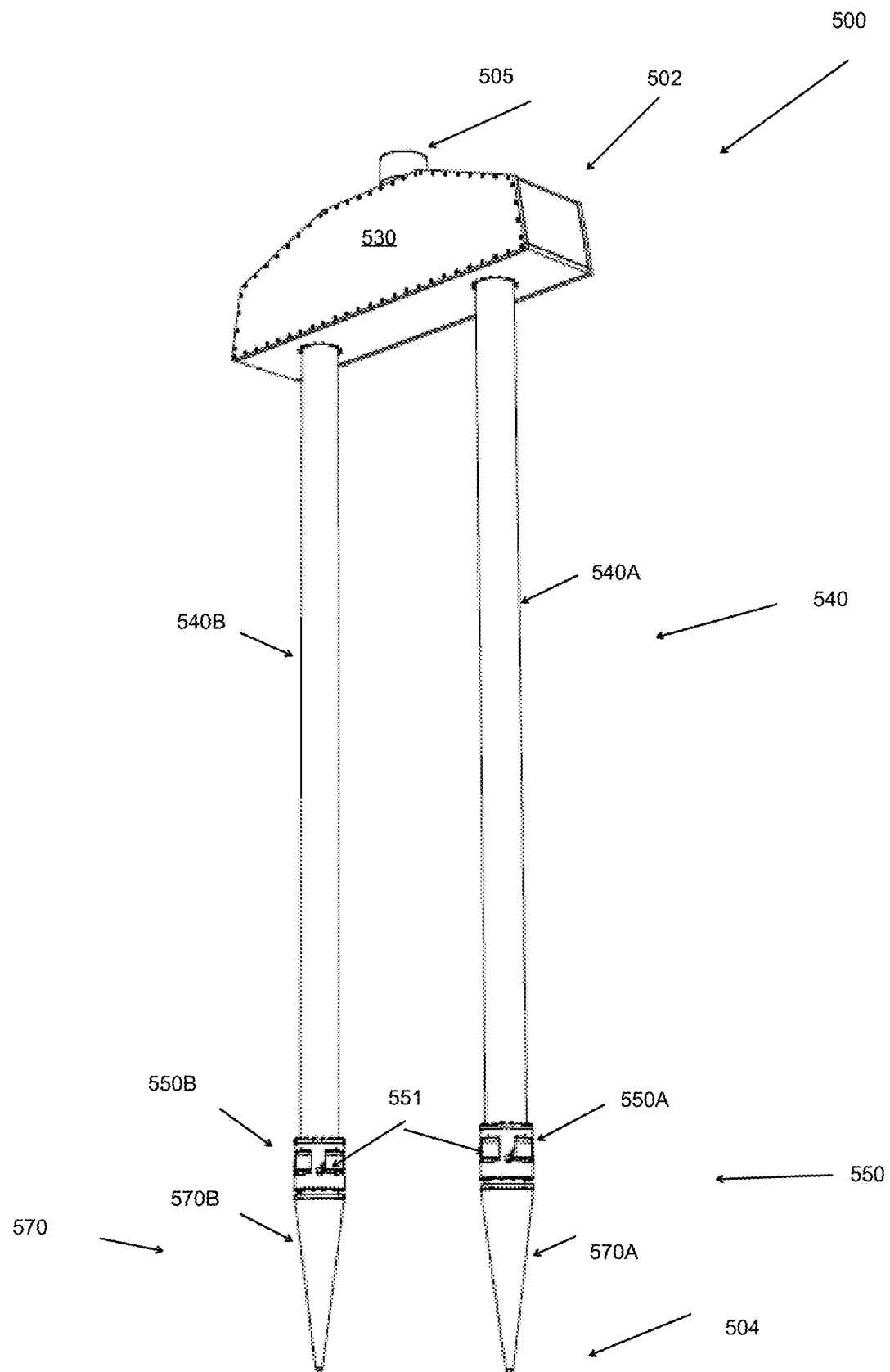
FIG. 14A is a perspective bottom view of a grabber.
Figure 14B:
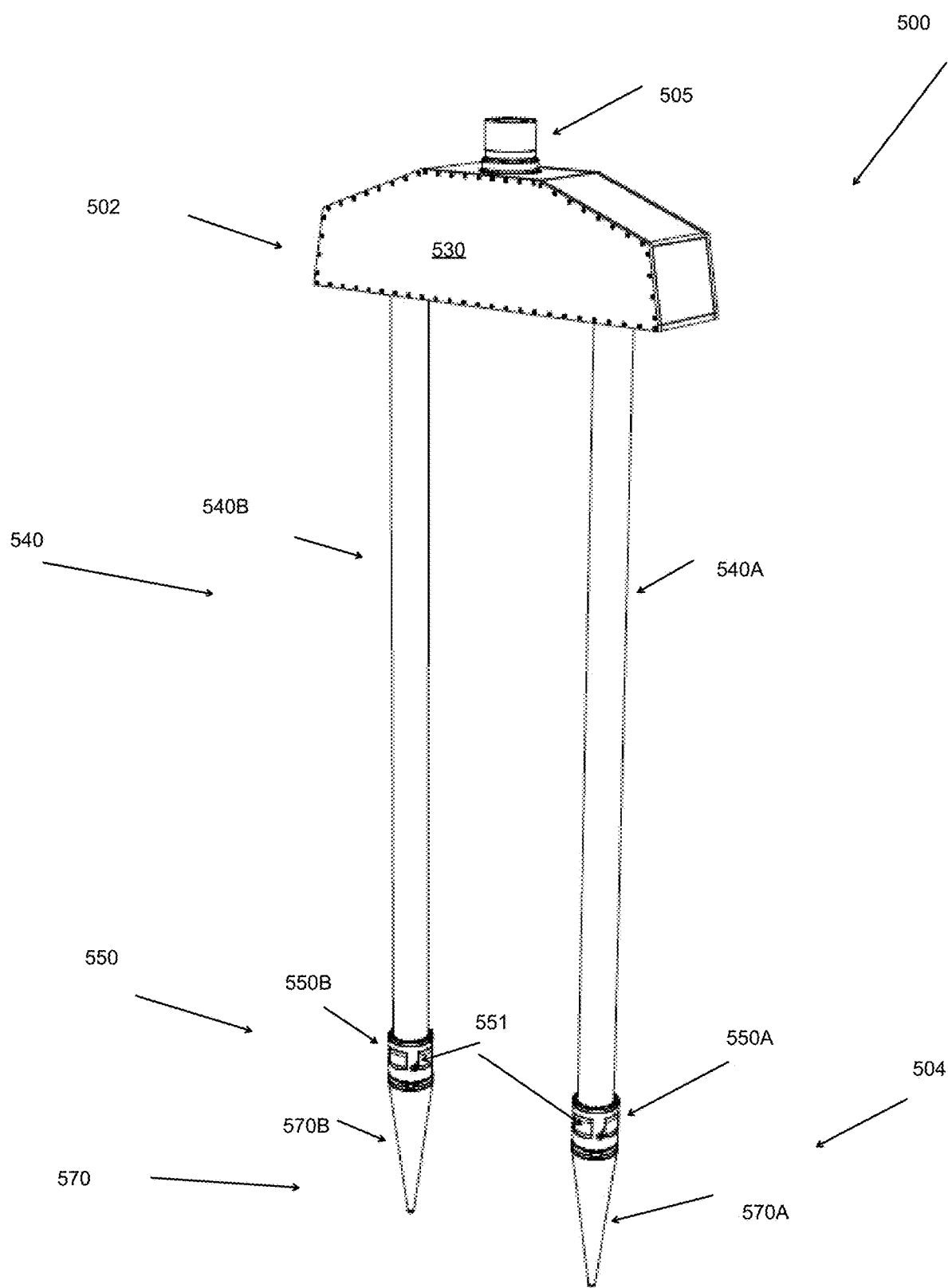
FIG. 14B is a perspective top view of the grabber in FIG. 14A.
Figure 14C:
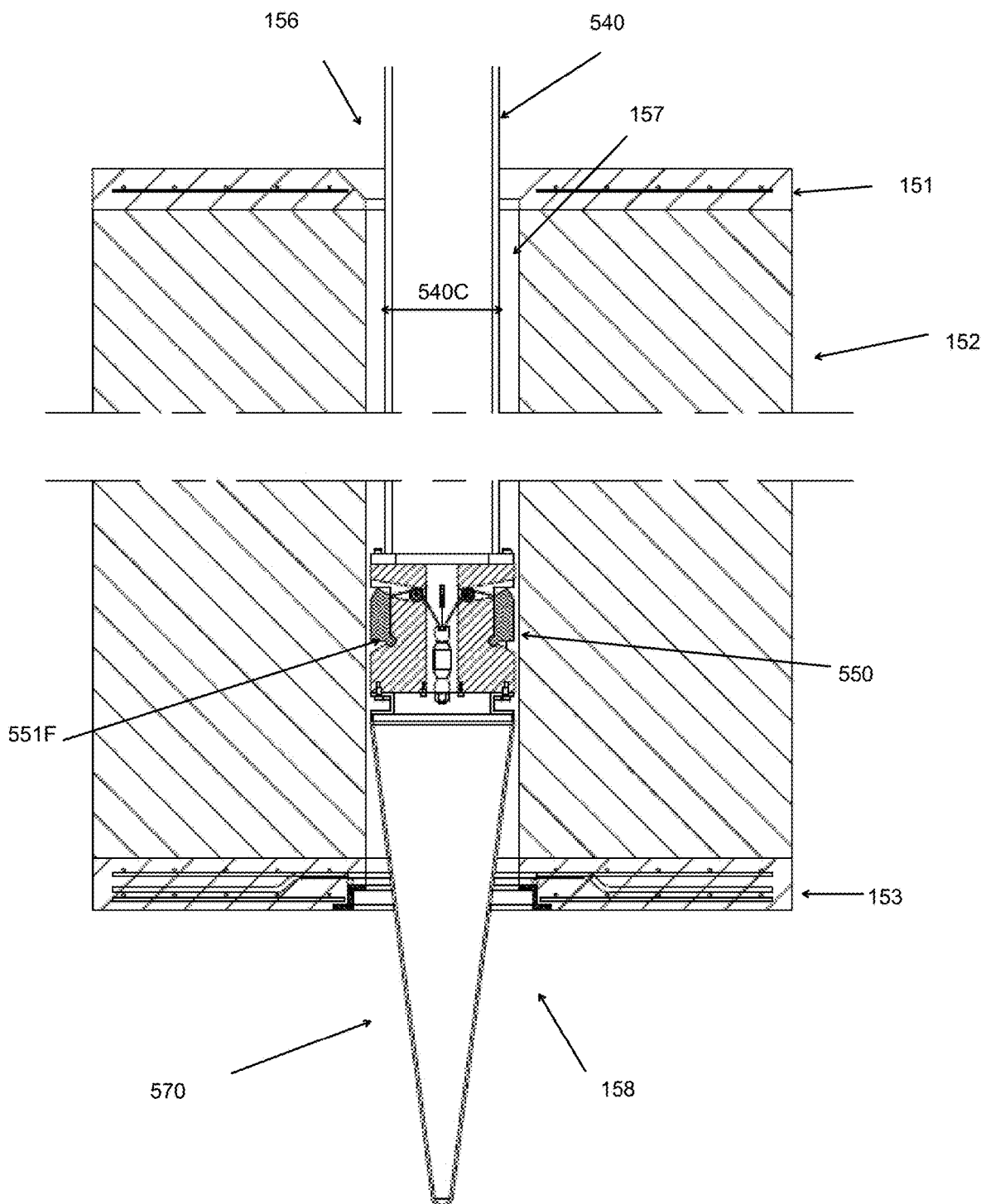
FIG. 14C is a partial cross-sectional view of the grabber passing through a block with lever(s) in a retracted position.
Figure 14E:
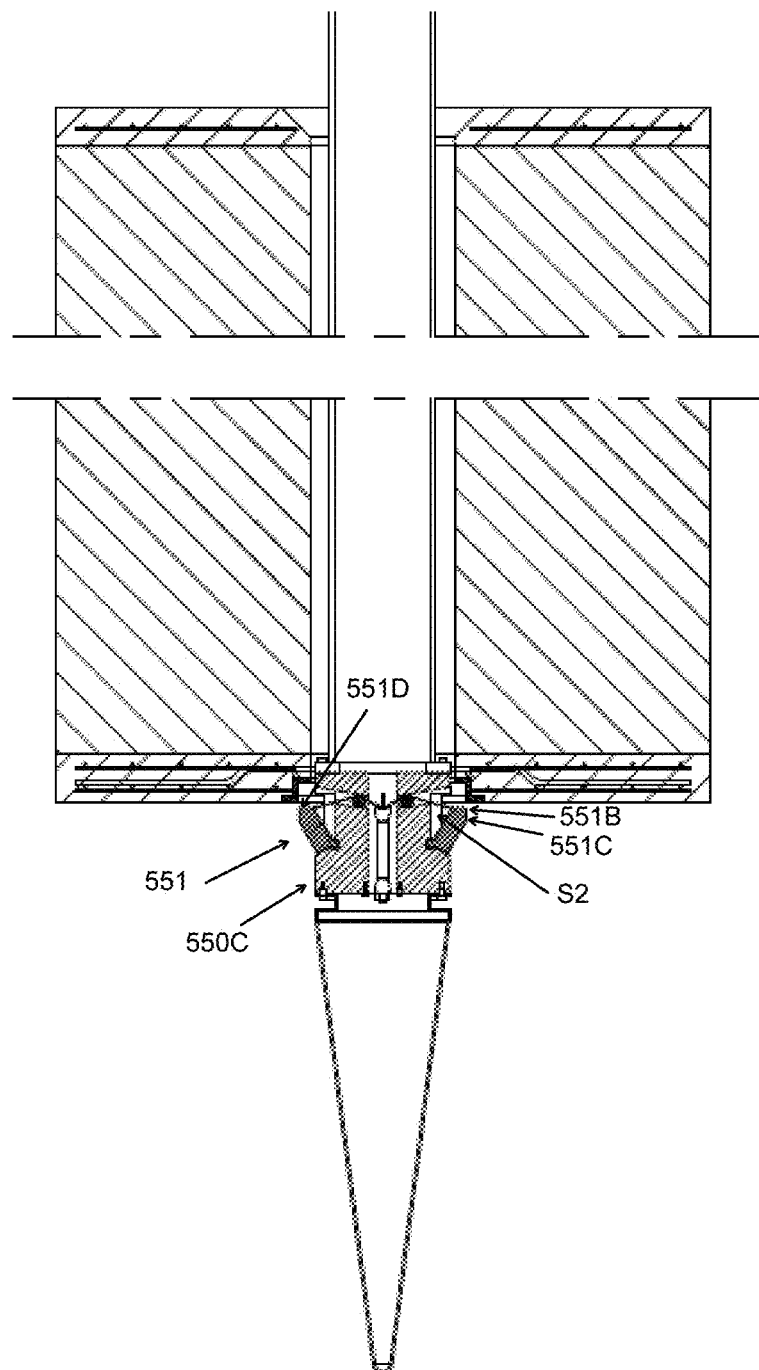
FIG. 14E is a partial cross-sectional view of the grabber with the lever(s) in an extended position.
Figure 14F:
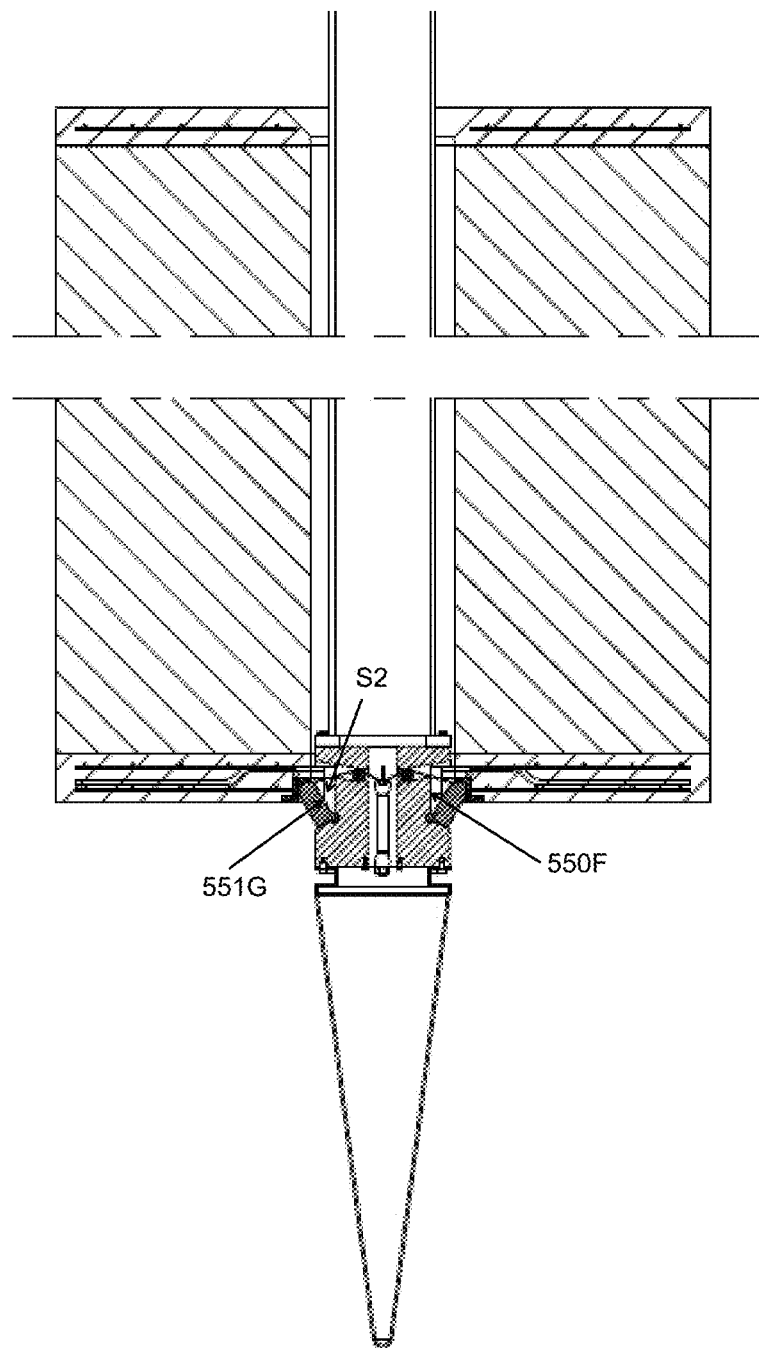
FIG. 14F is a partial cross-sectional view of the grabber with the lever(s) in the extended position and engaging the block.
Figure 14G:
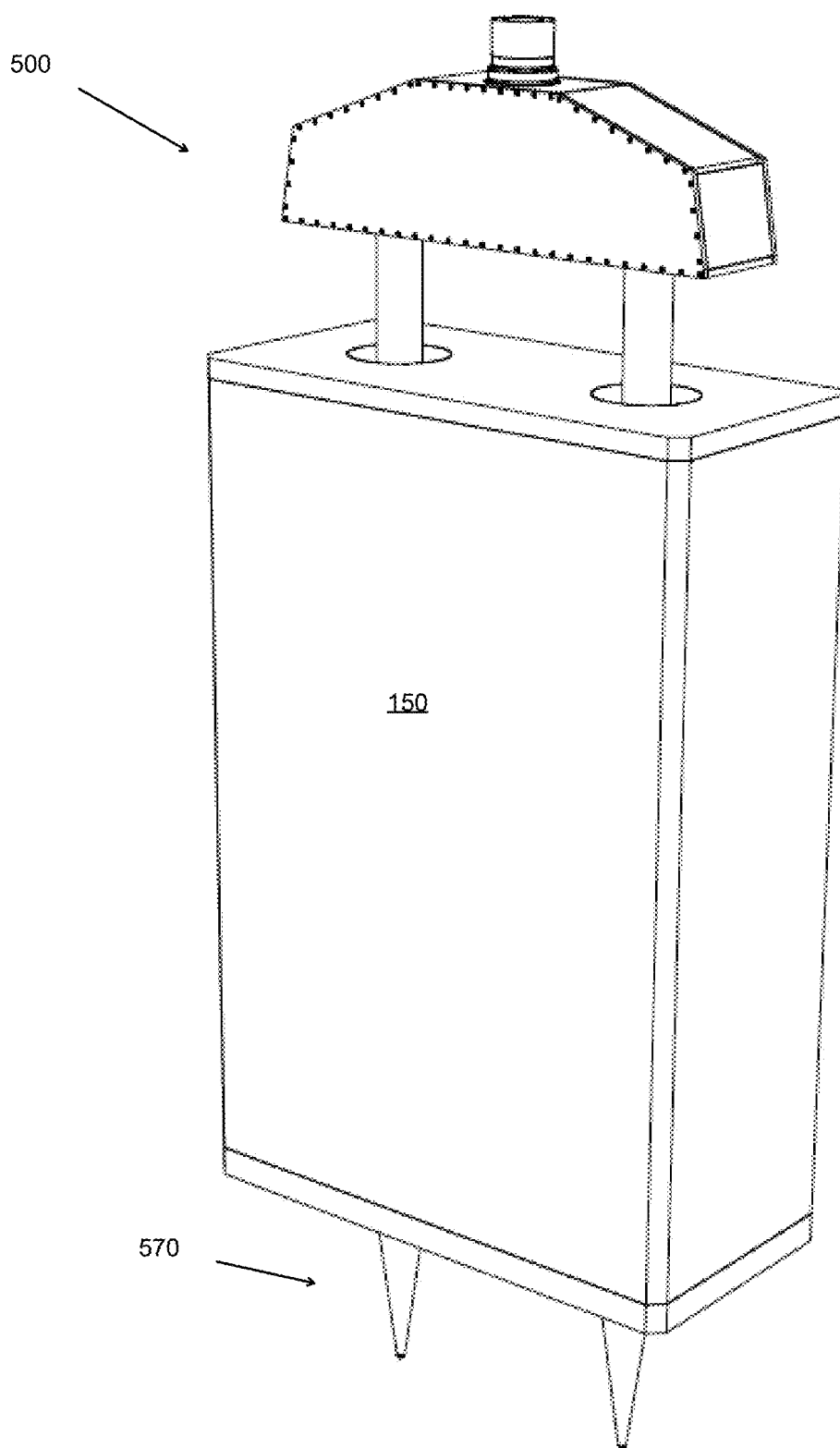
FIG. 14G is a top perspective view of the grabber extending through the block.
Figure 14H:
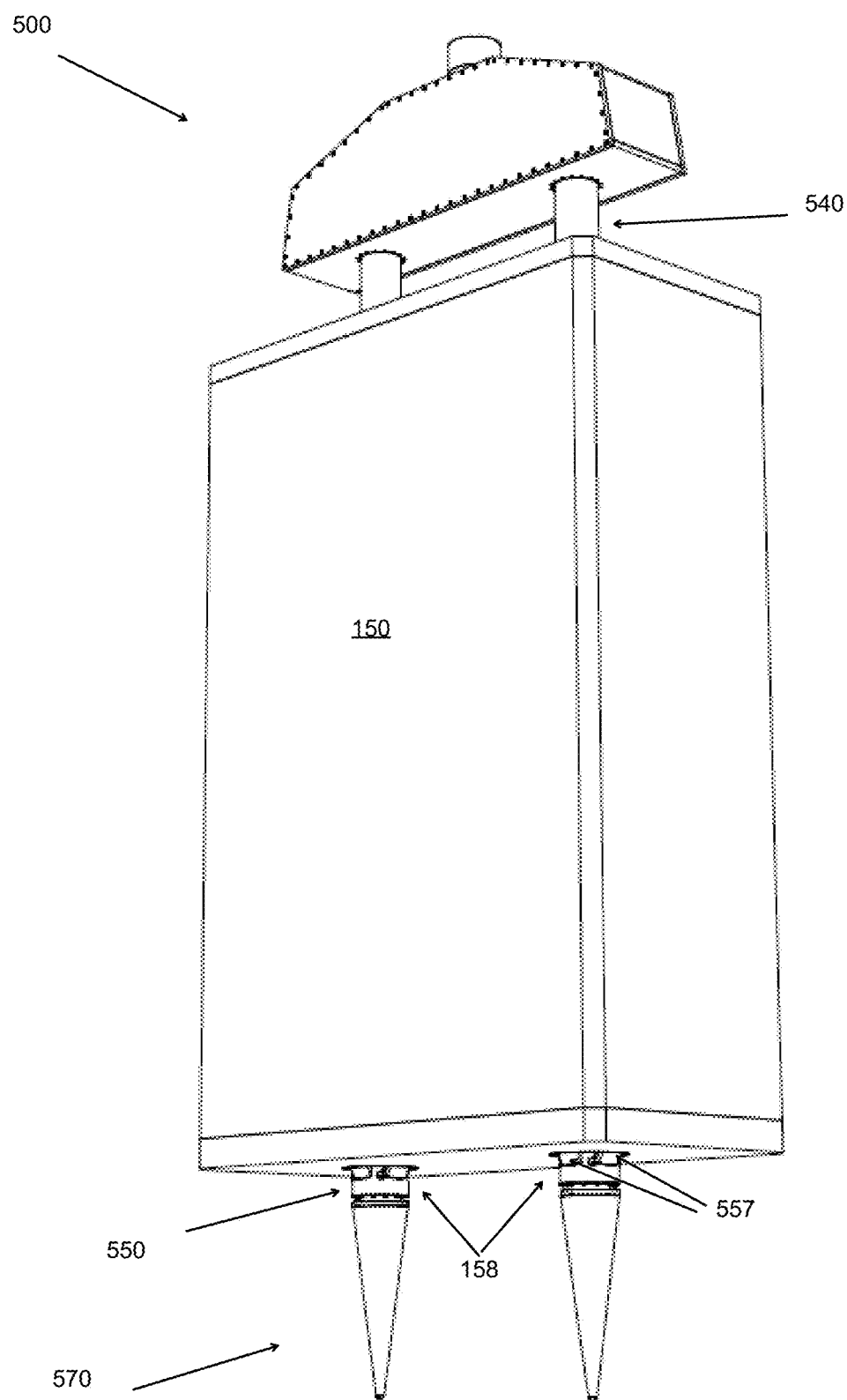
FIG. 14H is a bottom perspective view of the grabber extending through the block, with the lever(s) in the extended position and engaging the block.

FIGS. 14A-14L show an example gripper or grabber mechanism 500 (the "gripper" or "grabber") operable to releasably grip or grab the blocks 150 (e.g., one at a time), with FIGS. 14F-14H showing the grabber 500 coupled to a block 150. The grabber 500 extends from a proximal end 502 to a distal end 504. The grabber 500 optionally includes a proximal connector 505 that operatively connects to the cable 108. The grabber 500 also includes a cross-member 530 attached (e.g., rotatably coupled) to the connector 505, for example via a bearing 512 (e.g., a turntable bearing) disposed between a flange of the proximal connector 505 and a surface of the cross-member 530. The grabber 500 also includes one or more arms 540, one or more locking mechanisms 550, and optionally one or more self-centering ends 570. Accordingly, the grabber 500 operatively couples the cable 108 to the block 150 (e.g., to allow the trolley 106 and cable 108 to lift and reposition the block 150, as described above). At least a portion of the grabber 500 (e.g., the proximal connector 505, cross-member 530, arms 540) can be made of a rigid material (e.g. metal). Optionally, the self-centering ends 570 can be made of metal. The arms 540 and self-centering ends 570 can together have a spear-like shape.

In one example, shown in FIG. 14A, the grabber 500 has two arms 540A, 540B, two locking mechanisms 550A, 550B (one in each of the arms), and two self-centering ends 570A, 570B (one in each of the arms). In one example, the arms 540A, 540B can have a tubular (e.g., cylindrical) shape, and the self-centering ends 570A, 570B can be conical in shape. As shown in FIG. 14C, the arms 540A, 540B can each have an outer diameter that is smaller than the diameter of the bore 157 by between about 5 millimeters (mm) and about 10 mm (e.g., 5 mm, 7 mm, 9 mm, 10 mm), allowing the arms 540A, 540B to pass through the bore(s) 157, as shown in FIGS. 14C-14F.

FIGS. 14C-14F show the actuation of the locking mechanism 550 to allow the grabber 500 to engage the block 150. In one example, the locking mechanism 550 has a body 550C with an outer surface 550D and includes one or more (e.g., a plurality of) fingers or levers (or hooks) 551 that can be actuated between a retracted position (see e.g., FIGS. 14C-14D) and an extended or deployed position (see e.g., FIG. 14E) relative to the body 550C. In one example, the lever(s) 551 can be located on opposite sides of the body 550C to define one or more working pair(s) of lever(s) 551 that are actuated substantially at the same time (e.g., between the retracted and deployed positions). In one example, the lever(s) 551 can optionally be located about the circumference of the body 550C. In one example, the locking mechanism 550 can have four levers 551 arranged about the circumference of the body 550C.

The lever(s) 551 optionally pivot about a pivot joint 551A between the lever(s) 551 and the body 550C. The body 550C has an angled surface 550E below a bottom surface 551F of the lever(s) 551 that defines a gap S1 therebetween, allowing the lever(s) 551 to pivot outward relative to the body 550C until the bottom surface 551F contacts the angled surface 550E of the body 550C (e.g., as shown in FIG. 14E). In one example, the lever(s) 551 have an outer surface 551E that generally aligns with the outer surface 550D of the body 550C when the lever(s) 551 are in the retracted position, allowing the arms 540A, 540B to pass through the bore(s) 157 of the block 150 without the lever(s) 551 engaging the surface of the bore(s) 157 (see e.g., FIG. 14C).

In one example, the lever(s) 551 optionally have angled proximal surfaces 551C, 551D that extend at an angle (e.g., 90 degrees) relative to each other. Optionally, the angled proximal surfaces 551C, 551D join at a tip 551B. In one example, when the lever(s) 551 are in the extended or deployed position (see e.g., FIG. 14E, the surface 551D extends substantially horizontally and the surface 551C extends substantially vertically. Optionally, in the extended position the proximal end of the lever(s) 551 are spaced apart from each other by a distance substantially corresponding to the dimension of the inner surface (e.g., shoulder surface 159C) of the distal openings 158A, 158B (e.g., of the metal support or reinforcement 159B of the distal openings 158A, 158B). Once in the extended or deployed position, the grabber 500 can be lifted (e.g., by the cable 108), allowing the lever(s) 551 to engage (e.g., lock onto) the shoulder surface 159C, thereby allowing the grabber 500 to lift the block 150.

With continued reference to FIGS. 14C-14F, the locking mechanism 550 can have cables 553 that optionally wrap around pulleys 552 and connect (e.g., fasten) to the lever(s) 551 (e.g., proximate the angled surfaces 551C, 551D). The cables 553 optionally couple to a proximal connector 557, which is coupled to a spring 556 (e.g., a coil spring). In one example, the spring 556 extends between and is fixed to the proximal connector 557 and a distal connector 555. In one example, the spring 556 is biased toward pulling the proximal connector 557 (and therefore the cables 553) toward the distal connector 555, which moves the lever(s) 551 into the retracted position. An actuation cable 558 can couple to the proximal connector 557. In one example, the actuation cable 558 is actuated (e.g., pulled, subjected to a tension force) toward the proximal end 502 of the grabber 500 with a force (e.g., tension force) that overcomes the spring compression force of the spring 556 and pulls the proximal connector 557 toward the proximal end 502. This optionally causes the cables 553 to move (outward) over the pulleys 552, allowing the lever(s) 551 to pivot outward relative to the body 550C into the extended or deployed position. Once the tension force is removed from the actuation cable 558, the spring compression force of the spring 556 can optionally overcome the actuation force of the cable 558, allowing the spring 556 to pull the proximal connector 557 back toward the distal connector 555, causing the lever(s) 551 to be pulled back into the retracted position (e.g., by the cables 553 moving over the pulleys 552).

In one example, shown in FIG. 14I, an electric system 531 can operate the grabber 500 (e.g., the locking mechanism 550). The electric system 531 can have one or more electric motors 532, for example optionally disposed in the cross-member 530. The electric motor(s) 532 are operable to actuate the actuation cable 558 to effect movement of the lever(s) 551. For example, the electric motor(s) 532 can be operated to apply a tension force on the cable 558 to cause the lever(s) 551 to move into the extended or deployed position, and can be operated to relax a tension force on the cable 558 to cause the lever(s) 551 to move into the retracted position. In one example, a proximal end of the cable 558 can be operatively coupled to an output shaft of the electric motor 532 (e.g., via a wheel, sprocket or gear attached to the output shaft of the electric motor 532). When the motor 532 rotates its output shaft in one direction, it pulls on the cable 558 to cause the lever(s) 551 to move into the extended position, and when the motor 532 rotates its output shaft in an opposite direction, it relaxes or reduces a tension on the cable 558 to cause the lever(s) 551 to move into the retracted position. In one example, the locking mechanism 550 in each of the arms 540A, 540B is optionally operated by a different electric motor 532. In another example, the locking mechanism 550 in each of the arms 540A, 540B is operated by the same electric motor 532. The electric motor 532 can optionally be powered via the crane 101, for example, via a power cable that comes from a power source of or on the crane 101 and then travels along the cable 108 (within or about the cable 108) to the grabber 500 (e.g., into the grabber 500 via a channel 511 in the proximal connector 505). In another implementation, a power source (e.g., battery) that powers the electric motor(s) 532 can be disposed in the grabber 500 (e.g., in the cross-member 530).

In another example, shown in FIG. 14J, a pneumatic system 531A can be used instead of electric motor(s) 532 to actuate the locking mechanism 550. For example, the pneumatic system 531A can include a compressor 532A (e.g., disposed in the cross-member 530), which can be operated to actuate a piston 534A. The piston 534A can be operatively coupled to the cable 558 and operable to either apply a tension force to the cable 558 to cause the lever(s) 551 to move into the extended position, or remove or reduce a tension force on the cable 558 to cause the lever(s) 551 to move into the retracted position as discussed above.

In another example, shown in FIG. 14K, an electromagnetic system 531B can be used instead of electric motor(s) 532 to actuate the locking mechanism 550. For example, the electromagnetic system 531B can have an electromagnet 532B that can be selectively actuated to attract or repel a metal portion (e.g., a permanent magnet) 534B. The cable 558 can be operatively coupled to the permanent magnet 534B. When a current is applied to the electromagnet to attract the permanent magnet 534B, the movement of the permanent magnet 534B toward the electromagnet 532B causes a tension force to be applied to the cable 558, which causes the lever(s) 551 to move to the extended position. When the electromagnet 532B is actuated to repel the permanent magnet 534B, the tension force can be reduced or removed from the cable 558, which causes the lever(s) 551 to move to the retracted position.

Figure 14L:
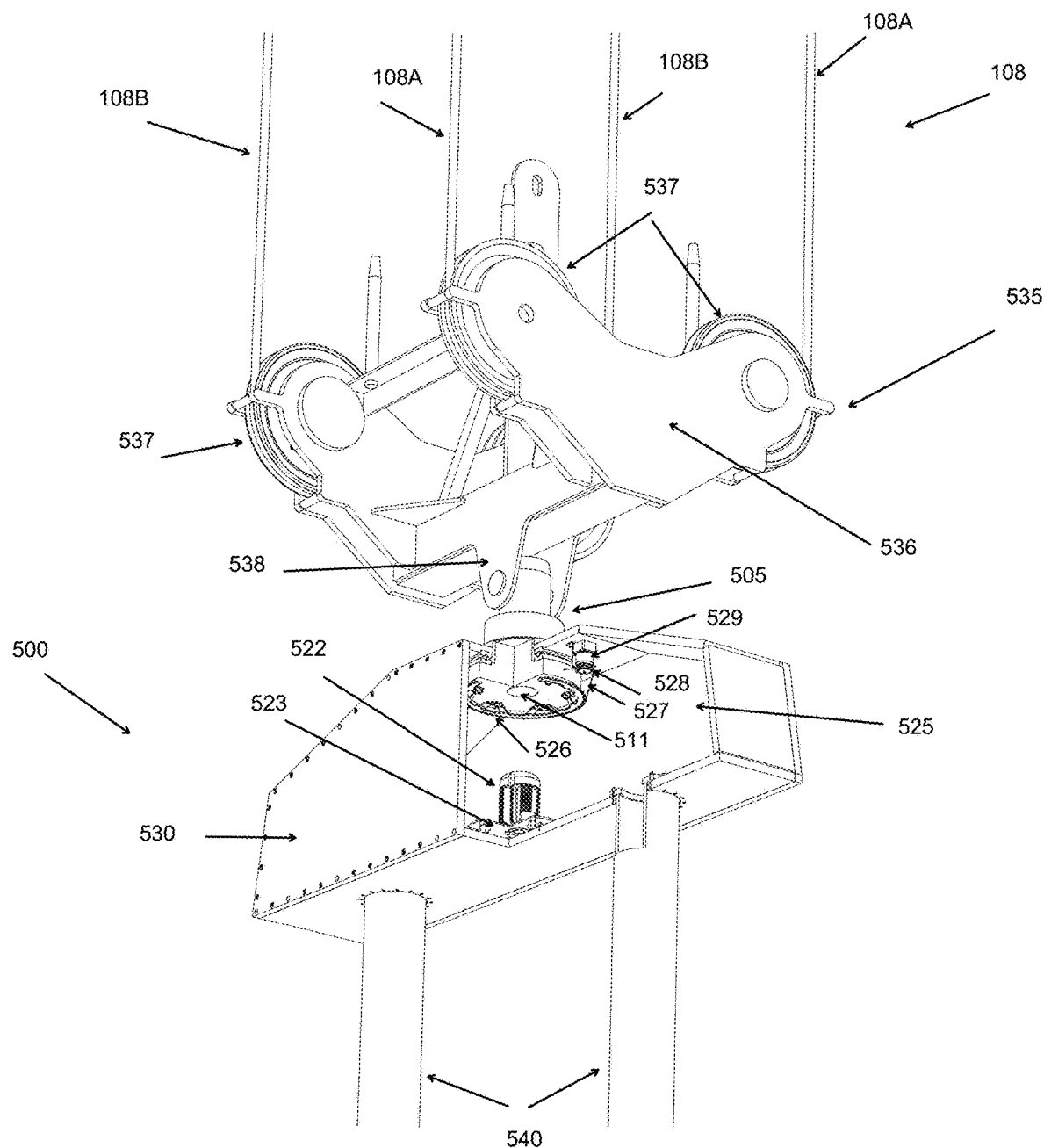
FIG. 14L is a partial sectional view of the grabber attached to a pulley assembly.

With reference to FIG. 14L, the grabber 500 can optionally include a transmission assembly 525 that effects a rotation of the grabber 550 (e.g., relative to the proximal connector 505, relative to its associated jib 104, etc.). The transmission assembly 525 can optionally include a first disk or gear 526 fixed relative to the proximal connector 505, a second disk gear 528 coupled to a motor 529 attached to an inner surface of the cross-member 530, and a chain, cable or belt 527 that wraps around and interconnects the disks or gears 526, 528. As shown in FIG. 14L, the grabber 500 can couple to a pulley assembly 535 having a frame 536 on which one or more pulleys (e.g., four pulleys) 537 are rotatably coupled. The frame 536 can couple to the proximal connector 505 via a bracket 538. The one or more cables 108 (e.g., cables 108A, 108B) can at least partially wrap around the one or more pulleys 537, the proximal ends of the cable(s) 108 movably coupled to the trolley 106.

In one example, the transmission assembly 525 operates to effect relative rotation of the grabber 500 counter to the proximal connector 505 when its associated jib 104 is rotated relative to the tower 102 of the crane 101, 101A (thereby also rotating the trolley 106, cable(s) 108 and the pulley assembly 535 above the grabber 500 about the tower 102). When the jib 104 rotates in a first direction relative to the tower 102 of the crane 101, 101A (and the trolley 106, cable(s) 108 and the pulley assembly 535 above the grabber 500 rotate in the first direction and at the same rate about the tower 102), the transmission assembly 525 rotates the grabber 500 relative to the proximal connector 505 in a second direction opposite the first direction and at the same rate of rotation as the rotation of the jib 104 about the tower 102. This advantageously causes the block 150 to not experience any rotation (i.e., the block 150 maintains the same orientation) and experiences zero moment (i.e., the block 150 only translates and does not rotate). The motor 529 can rotate the second disk or gear 528 relative to the first disk or gear 526 via the chain, cable or belt 527. As the first disk or gear 526 is fixed to the proximal connector 505, rotation of the second disk or gear 528 by the motor 529 causes the second disc or gear 528 to move circumferentially about the first disk or gear 526, allowing the orientation of the cross-member 530 and therefore the grabber 500 to remain the same and advantageously inhibit (e.g., prevent) twisting of (or application of torsion to) the cable(s) 108 and to inhibit a torsion pendulum oscillation of the block 150. Accordingly, the transmission assembly 525 advantageously maintains absolute orientation of the grabber 500 and block 150 constant (e.g., with respect to world coordinates) when the grabber 500 is coupled to the block 150 and the jib 104 rotates relative to the tower 102 of the crane 101, 101A.

In another example, the transmission assembly 525 operates to rotate the grabber 500 when the grabber 500 is not coupled to a block 150 (e.g., to orient the grabber 500 at 90 degrees to its prior orientation prior to coupling to a block 150 that is oriented 90 degrees relative to the previous block 150 the grabber 500 moved). The motor 529 can operate to rotate the second disk or gear 528 relative to the first disk or gear 526 via the chain, cable or belt 527. However, as the first disk or gear 526 is fixed to the proximal connector 505, rotation of the second disk or gear 528 by the motor 529 would tend to cause the first disk or gear 526 to rotate (and thereby rotate the pulley assembly 535 and twist the cables 108 above the grabber 500) due to the relatively lower inertia of the pulley assembly 535 above the grabber 500 as compared to the grabber 500.

In order to avoid such a rotation of the first disk or gear 526 and twisting of the cables 108 above the grabber 500, a motor 522 fixed to the cross-member 530 (e.g., fixed in a center of the cross-member 530, along the central axis of the grabber 500) is operated to rotate a flywheel or reaction wheel 523 connected to the motor 522. The torque applied by the motor 522 to the flywheel 523 is also applied to the cross-member 530 in the opposite direction and at a different speed (due to the difference in inertia between the cross-member 530 and the reaction wheel 523), so that operation of the motor 522 to rotate the reaction wheel 523 in one direction causes a rotation of the cross-member 530 in an opposite direction. When the rotation of the reaction wheel 523 is accelerated (by the operation of the motor 522) in one direction, the rotation of the cross-member 530 also accelerates in the opposite direction (in an amount that is the ratio of the two moment of inertias of the cross-member 530 and reaction wheel 523). When the rotation of the reaction wheel 523 is decelerated (by the operation of the motor 522) in one direction, the rotation of the cross-member 530 also decelerates in the opposite direction (in an amount that is the ratio of the two moment of inertias of the cross-member 530 and reaction wheel 523), and eventually stops. When the rotation of the reaction wheel 523 is kept constant (by the operation of the motor 522) in one direction, the rotation of the cross-member 530 also remains constant in the opposite direction as the rotation of the reaction wheel 523.

As the cross-member 530 rotates in said opposite direction to the reaction wheel 523, the motor 529 effects rotation of the cross-member 530 relative to the proximal connector 505 in an opposite direction as the direction of rotation of the cross-member 530 to thereby inhibit (e.g., prevent) twisting of (or torsion applied to) the cable(s) 108 and/or pulley assembly 535 above the grabber 500. The motor 529 rotates the second disk or gear 528 in the same direction as the rotation of the reaction wheel 523, and the grabber 500 rotates in the opposite direction to both the reaction wheel 523 and the second disk or gear 528 so the cable(s) 108 does not twist.

As discussed above, the self-centering end(s) 570 can be conical in shape. Advantageously, this allows them to self-center the grabber 500 relative to the block 150 as the arm(s) 540 are extended through the opening(s) 156 in the block 150 and into the bore(s) 157. For example, even if there is a minor misalignment between the arm(s) 540 and the proximal opening(s) 156, the conical shape of the end(s) 570 will cause the arm(s) 540 to self-center themselves in the bore(s) 157 as they are advanced through the block 150. The tapered surface 151B of the proximal opening(s) 156 also optionally facilitates the self-centering of the arm(s) 540 of the grabber 500 relative to the bore(s) 157 of the block 150. As shown in FIG. 14F, the self-centering end(s) 570 extend past the bottom surface 153A of the block 150 once the grabber 500 is engaged (e.g., locked) to the block 150. This advantageously allows, the grabber 500 to align (e.g., center) the engaged block 150 with the block(s) 150 onto which it is to be lowered, the self-centering end(s) 570 extending into the proximal opening(s) 156 of the lower block(s) 150 as the engaged block 150 is lowered upon them (and prior to the bottom surface 153A of the engaged block 150 contacting the top surface 151A of the bottom block(s) 150). Accordingly, the self-centering end(s) 570 advantageously facilitates centering of the grabber 500 onto a block 150 to grab the block 150 as well as facilitates centering of the grabbed block 150 onto a lower block 150 when lowering the grabbed block 150.

In one example, the grabber 500 (e.g., the locking mechanism 550 of the grabber 500) includes one or more sensors (e.g., pressure sensors, contact sensors, proximity sensor, capacitance sensor) that sense when the lever(s) 551 are in the retracted position or the extended/deployed position. In one example, (e.g., the locking mechanism 550 of the grabber 500) includes one or more sensors (e.g., pressure sensors, contact sensors) that sense when the lever(s) 551 in the extended/deployed position are no longer in contact or engagement with the block 150 (e.g., with the shoulder surface 159C of the block 150), so that lever(s) 551 can be moved to the retracted position (e.g., by the one or more electric motors 522).

In one example, the grabber 500 (e.g., the locking mechanism 550 of the grabber 500, the lever(s) 551 of the grabber 500) includes one or more sensors (e.g., ultrasound sensors, proximity sensors) that senses the vertical position of the grabber 500 (e.g., of the lever(s) 551 of the grabber 500), for example relative to a block 150 the grabber 500 is approaching. Advantageously, said one or more sensors can help ensure the grabber 500 can adequately couple to the block 150, in the manner described above, and account for any changes in the length of the cable 108 (e.g., due to ambient temperature or elongation of the cable 108 from repeated use) that may introduce an error in the positioning of the grabber 500 relative to the block 150 if such sensors were not present.

In one example, the grabber 500 can selectively deliver an amount of compressed air (e.g., via apertures in the self-centering end(s) 570) onto the top surface 151A of the block 150 prior to (or during) insertion of the grabber 500 (e.g., insertion of the self-centering end(s) 570, insertion of the arm(s) 540) into the bore(s) 157 of the block 150. The amount of air is delivered onto the top surface 151A of the block 150 to clean (e.g., remove debris, dust, etc.) from the top surface 151A, thereby ensuring the top surface 151A is clean when the block 150 is repositioned. In one example, once the grabber 500 is coupled to the block 150 (see e.g., FIGS. 14F-14H), has lifted the block 150 and in the process of repositioning the block 150 on top of another block 150, as the grabber 500 lowers the top block 150 an amount of compressed air can be delivered (e.g., via apertures in the self-centering end(s) 570) onto the top surface 151A of the bottom block 150 to clean it (e.g., remove dust, debris, etc.) prior to the bottom surface 153A of the top block 150 contacting the top surface 151A of the bottom block 150.

In one example, the grabber 500 can selectively deliver an amount of compressed air (e.g., via apertures in the body 550C) into the space S1 between the bottom surface 551F of the lever(s) 551 and the angled surface 550E of the body 550C to remove dust or debris from the space S1 and allow the lever(s) 551 to move to the extended or deployed position (e.g., where the bottom surface 551F contacts the angled surface 550E of the body 550C). Additionally or alternatively, the grabber 500 can deliver an amount of compressed air into a space S2 between an inner surface 550F of the body 550C and an inner surface 551G of the lever(s) 551 to remove dust or debris from the space S2 and allow the lever(s) 551 to move to the retracted position (e.g., where the inner surface 551G of the lever(s) 551 contacts the inner surface 550F of the body 550C). Said compressed air can optionally be delivered to the space S1 prior to the lever(s) 551 being moved to the extended or deployed position (e.g., when the position of the lever(s) 551 is as shown in FIGS. 14C-14D). Said compression air can optionally be delivered to the space S2 prior to the lever(s) 551 being moved to the retracted position (e.g., when the position of the lever(s) 551 is as shown in FIGS. 14E-14F). Such delivery of compressed air advantageously ensures that the locking mechanism 550 properly operates to allow the engagement and lifting of the block(s) 150 as well as the disengagement of the block(s) 150.

In one example, the grabber 500 can be rotated (e.g., the proximal connector 505 can be rotated relative to the cross-member 530) when the grabber 500 is not coupled to a block 150, such as using the transmission assembly 525 and reaction wheel 523, as described above. For example, the grabber can be rotated between at least two orientations (e.g., two orientations at 90 degrees to each other) before the grabber 500 is lowered from a position proximate the jib(s) 104 and/or while the grabber 500 is being raised after lowering a block 150 and decoupling from the block 150.

The rotation of the grabber 500 advantageously allows it to grab blocks 150 that are arranged in different orientations (e.g., arranged at 90 degrees relative to teach other), such as blocks 150 that define a layer or level where some of the blocks 150 have a different orientation (e.g., are oriented at 90 degrees) relative to other blocks 150 in the layer or level, as discussed above, to define a tiling pattern for the blocks 150.

In operation, the grabber 500 is lowered onto a block 150 and engages the block 150, in the manner described above. Optionally, the grabber 500 delivers compressed air onto the top surface 151A of the block 150 to remove dust or debris, as described above. Once the arm(s) 540 extend through the aperture(s) 157 of the block 150, the locking mechanism 550 is actuated to move the lever(s) 551 to the extended position. Optionally, prior to actuating the locking mechanism 550, the position sensor (e.g., ultrasound sensor) senses that the lever(s) 551 are in the proper (vertical) position prior to moving them to the extended or deployed position. The grabber 500 is then raised (e.g., by the cable 108, which is optionally retracted by a winch located, for example, on the trolley 106). As the grabber 500 is raised, the lever(s) 551 in the extended position engage the shoulder surface 159C on the bottom of the block 150, allowing the grabber 500 to lift the block 150. When coupled to the block 150 (e.g., due to the weight of the block 150), the grabber 500 does not rotate (e.g., as it would require a large amount of torque to rotate the block 150). Accordingly, blocks 150 are lifted, transferred and lowered by the grabber 500 in the same orientation. Therefore, blocks 150 that are oriented in a north-south direction will be lifted, transferred and lowered by the grabber 500 in the same north-south orientation. Similarly, blocks 150 that are oriented in an east-west direction will be lifted, transferred and lowered by the grabber 500 in the same east-west orientation. Therefore, the block 150 will have the same orientation in its start position (e.g., before it is lifted by the grabber 500) and its end position (e.g., after it has been lowered by the grabber 500).

FIG. 15 shows one method 600 of operating the grabber 500. The method 600 includes lowering 610 the grabber 500 relative to a block 150. The method 600 also includes inserting 620 the pair of arms 540 of the grabber 500 through a pair of bores 157 in the block 150 until a distal end of the pair of arms 540 protrude from the pair of bores 157. The method also includes actuating 630 one or more levers 551 movably coupled to the pair of arms 540 from a retracted position to an extended position, and engaging 640 a recessed distal surface 153B of the pair of bores 157 with the one or more levers 551 in the extended position to allow lifting (e.g., vertical lifting) of the block 150 with the grabber 500.

Crane Operation

The energy storage system 100, 100A, 100G-100P is operable to convert electrical energy or electricity into potential energy for storage by lifting (e.g., vertically lifting) the blocks 150, 150' from a lower elevation to a higher elevation, and to convert potential energy into electrical energy or electricity by moving (e.g., vertically moving, vertically lowering) one or more of the blocks 150, 150' from a higher elevation to a lower elevation via gravity.

FIG. 16 shows one method 650 of operating the energy storage system 100, 100A, 100G-100P. The method 650 includes operating 660 a crane 101 to stack a plurality of blocks 150 by moving the one or more blocks 150 from a lower elevation to a higher elevation to store energy in the blocks 150, each of the blocks storing an amount of energy corresponding to a potential energy amount of the block 150. The method also includes translating 670 the one or more blocks to a different location. The method also includes operating 680 the crane 101 to unstack one or more of the blocks 150 by moving the one or more blocks 150 from a higher elevation to a lower elevation under a force of gravity, thereby generating an amount of electricity corresponding to a kinetic energy amount of said one or more blocks 150 when moved from the higher elevation to the lower elevation.

The electric motor-generator 120 of the crane 101 can operate the trolley(s) 106 and cable(s) 108 to lift (e.g., vertically lift) one or more of the blocks 150, 150' from a lower elevation, move said blocks 150, 150' to a different location (e.g., different polar coordinate location along the jib(s) 104 relative to the tower 102, different Cartesian coordinate location along the bridge 104G), and place the blocks 150, 150' at a higher elevation at said different location (e.g., one block on top of another) to form stacks of blocks 150, 150', as shown for example in FIGS. 1, 6A-6B, and 7A-7B. Each of the stacked blocks 150, 150' stores an amount of potential energy corresponding to (e.g., proportional to) its mass and height differential between the lower elevation and the higher elevation of the block 150, 150' (e.g., potential energy=mass× gravity× height above reference surface, such as ground level). The heavier the blocks 150, 150' and the higher they are stacked, the more potential energy can be stored.

To convert the stored potential energy to electricity, the crane 101 can operate the trolley(s) 106 and cable(s) 108 to lift (e.g., vertically lift) one or more of the stacked blocks 150, 150' from a higher elevation, move the trolley(s) 106 to a different location (e.g., different polar coordinate location along the jib(s) 104 relative to the tower 102, different Cartesian coordinate location along the bridge 104G), and allow said block(s) 150, 150' to move to a lower elevation (e.g., vertically lower at least partially under the force of gravity) to drive the electric motor-generator 120 (via the cable 108) to generate electricity, which can be delivered to the power grid.

Figure 4:
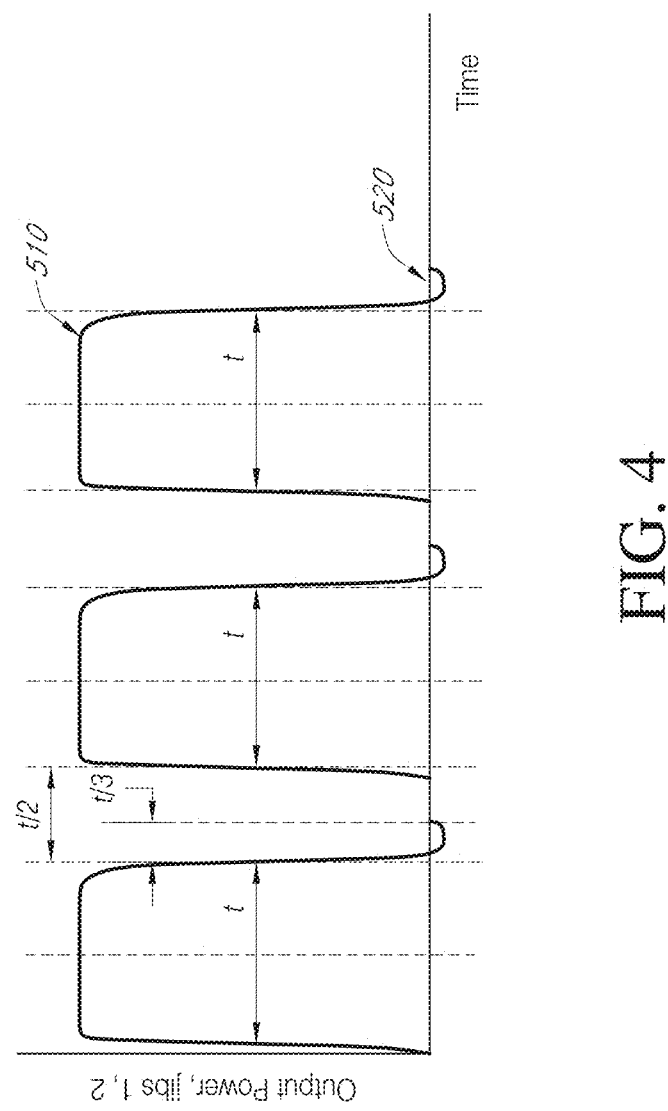
FIG. 4 is a schematic diagram of output power per time output by an energy storage system.

Power in the form of electricity is generated each time a block 150 is lowered. FIG. 4 shows a graph of output power versus time, showing the power generated by one pair of jibs 104 on opposite sides of the tower 102 of the crane 101 in FIGS. 1-3, 6A-6E. As shown in FIG. 4, three peaks 510 are generated corresponding to the lowering of three blocks 150. After each block 150 is lowered, power is consumed 520 briefly to raise the cable 108 and grabber 500 before it is engaged to a new block 150 on the stack.

Figure 17:
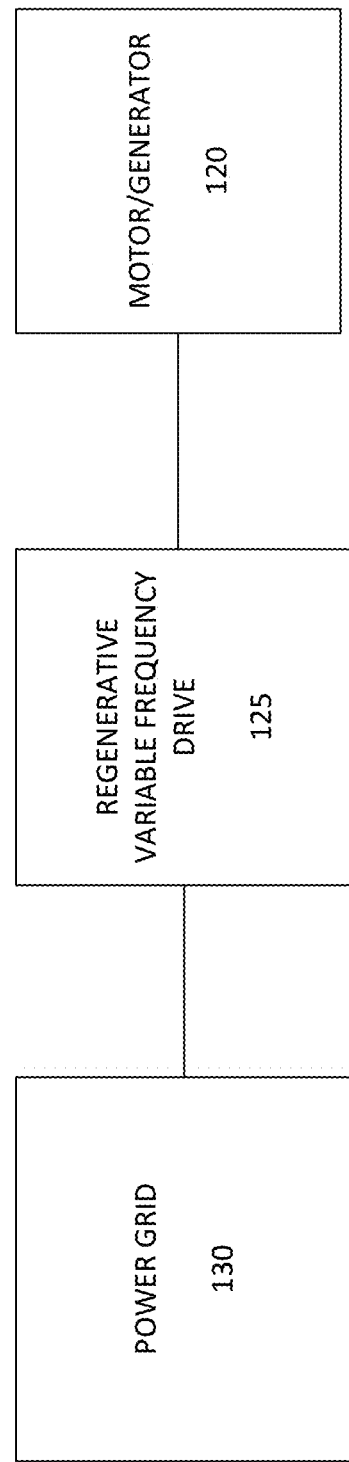
FIG. 17 is a schematic block diagram of a power interface between the energy storage system and the power grid.

FIG. 17 is a schematic block diagram showing the motor/generator 120 connected to the power grid 130 via a regenerative variable frequency drive 125. The regenerative variable frequency drive 125 is an interface between the motor/generator 120 and the power grid 130. The regenerative (dual bridge) variable frequency drive 125 can include a grid side transistor bridge, a DC bus, and a motor side transistor bridge. The grid side transistor bridge is an inverter that converts all DC electricity from the motor/generator 120 to the 50 Hz or 60 Hz of the power grid 130 (when regenerating). When not regenerating, the variable frequency drive 125 is rectifying the grid 130 to the DC electricity. On the motor side, the variable frequency drive 125 changes the frequency the motor/generator 120 is operated at (e.g., to control deceleration and/or acceleration of the motor 120, to tune the load on the motor/generator 120, to control or tune the power output from the motor/generator 120 by tuning changing the speed of the hoist motor of the crane 101, 101G).

The energy storage system 100 can be operated to maximize the storage of electrical energy or electricity. With reference to FIG. 1, the crane 101 stacks the blocks 150 (each of the same size) so that all the stacks have the same height. With reference to FIG. 2, the system 100 is shown with a zero potential energy state since the plurality of blocks 150' of different sizes are all at ground level. The height of the blocks 150' (which is proportional to their weight) vary along the length of the jib(s) 104, with the heavier weight blocks (e.g., blocks A-D) located closer to the tower 102, and the lighter weight blocks (e.g., blocks E-J) located farther from the tower 102. In one example, as shown in FIG. 3, the crane 101 stacks heaviest blocks 150' (e.g., blocks A-D) first and closest to the tower 102, after which the crane 101 stacks the lighter blocks 150' (e.g., blocks E-J), one by one, from heaviest to lightest until all the blocks 150' (e.g., blocks A-J) are stacked in one or more stacks or columns of blocks 150' to maximize the potential energy storage of the system 100. With continued reference to FIG. 3, to generate electricity by moving the blocks 150' from a higher elevation to a lower elevation, in the manner described above, the blocks 150' are lifted from the stack in the order of lightest to heaviest and placed back on the ground in the order illustrated in FIG. 2.

Advantageously, the energy storage system 100, 100A, 100G-100P can, for example, store electricity generated from solar power as potential energy in the stacked blocks 150, 150' during daytime hours when solar power is available, and can convert the potential energy in the stacked blocks 150, 150' into electricity during nighttime hours when solar energy is not available and deliver the converted electricity to the power grid.

Out-to-In Stacking

With reference to FIGS. 1-3, the blocks 150, 150' are moved from a lower elevation at a radial location along the jib(s) 104 that is farther from the tower 102, to a higher elevation at a radial location along the jib(s) 104 that is closer to the tower 102 to store electricity as potential energy in the blocks 150, 150'. To generate electricity, the blocks 150, 150' are then moved from the higher elevation at the radial location along the jib(s) 104 that is closer to the tower 102 to a lower elevation at a radial location along the jib(s) 104 that is farther from the tower 102.

In-to-Out Stacking

With reference to FIGS. 6A-6E, the blocks 150 are moved from a lower elevation at a radial location along the jib(s) 104 that is closer to the tower 102 (see FIGS. 6C-6E), to a higher elevation at a radial location along the jib(s) 104 that is farther from the tower 102 (see FIGS. 6A-6B) to store electricity as potential energy in the blocks 150 that define the tower 900. To generate electricity, the blocks 150 are then moved from the higher elevation at the radial location along the jib(s) 104 that is farther from the tower 102 to a lower elevation at a radial location along the jib(s) 104 that is closer to the tower 102.

Application

Described herein are examples of an energy storage system (e.g., the energy storage system 100, 100A, 100G-100P) operable to convert electrical energy or electricity into potential energy for storage, and to convert potential energy into electrical energy or electricity, for example, for delivery to an electrical grid. Advantageously, the energy storage system requires little to no maintenance, and can operate decades (e.g., 30-50 years) with substantially no reduction in energy storage capacity.

In some implementations, the energy storage system described herein can store approximately 10 megawatts-hour (MWh) or more of energy (e.g., between 10 MWh and 100 MWh, such as 15 MWh, 20 MWh, 30 MWh, 50 MWh, 80 MWh, 90 MWh) and deliver approximately 10 MWh or more of energy (e.g., between 10 MWh and 100 MWh, such as 15 MWh, 20 MWh, 30 MWh, 50 MWh, 80 MWh, 90 MWh) to the electrical grid. The energy storage system described herein can deliver energy each hour (e.g., 1 MW up to 6 MW or more). However, in other implementations the energy storage system described herein can have other suitable energy storage and delivery capacities (e.g., 1 MWh, 3 MWh, 5 MWh, etc.). In one implementation, the energy storage system can optionally power approximately 1000 homes for a day.

The energy storage system described herein can advantageously be connected to a renewable energy (e.g., green energy) power generation system, such as, for example, a solar power energy system, a wind energy power system (e.g., wind turbines), etc. Advantageously, during operation of the renewable energy power generation system (e.g., operation of the solar energy system during daylight hours, operation of the wind power system during windy conditions), the energy storage system captures the electricity generated by the renewable energy power generation system. The energy storage system can later deliver the stored electricity to the electrical grid when the renewable energy power generation system is not operable (e.g., at night time, during windless conditions). Accordingly, the energy storage system operates like a battery for the renewable energy power generation system and can deliver off-hours electricity from a renewable energy power generation system to the electrical grid.

In implementations described above, the energy storage system utilizes a crane 101, 101G to stack blocks 150, 150' to store electrical energy as potential energy and to unstack blocks 150, 150' to generate electricity. In one implementation, the crane 101, 101G can be operated with excess power from an electricity grid. The amount of energy recovered by the energy storage system for every unit of energy used to lift the blocks 150, 150' can optionally be 80-90%.

ADDITIONAL EMBODIMENTS

In embodiments of the present invention, an energy storage system, and method of operating the same, may be in accordance with any of the following clauses:

Clause 1. A method for storing and generating electricity, comprising:
operating a crane to stack a plurality of blocks by moving the one or more blocks from a lower elevation to a higher elevation to store energy in the blocks, each of the blocks storing an amount of energy corresponding to a potential energy amount of the block; and
operating the crane to unstack one or more of the blocks by moving the one or more blocks from a higher elevation to a lower elevation under a force of gravity, thereby generating an amount of electricity corresponding to a kinetic energy amount of said one or more blocks when moved from the higher elevation to the lower elevation.

Clause 2. The method of clause 1, wherein stacking the plurality of blocks to store energy comprises operating a motor to move the blocks from a lower elevation to a higher elevation.

Clause 3. The method of any preceding clause, wherein moving the one or more blocks from the higher elevation to the lower elevation drives an electric generator to generate electricity.

Clause 4: The method of any preceding clause, wherein moving the one or more blocks from the higher elevation to the lower elevation or from the lower elevation to the higher elevation includes moving the one more blocks without changing an orientation of the block while in transit between the lower and higher elevations.

Clause 5. The method of any preceding clause, wherein moving the one or more blocks from the higher elevation to the lower elevation or from the lower elevation to the higher elevation includes moving the one more blocks based on a change in an azimuth angle of the crane.

Clause 6. The method of clause 5, wherein moving the one or more blocks from the higher elevation to the lower elevation includes moving the one more blocks from a position farther from the tower to a position closer to the tower.

Clause 7. The method of clause 5, wherein moving the one or more blocks from the higher elevation to the lower elevation includes moving the one more blocks from a position closer to the tower to a position farther from the tower.

Clause 8. The method of any preceding clause, wherein moving the one or more blocks from the higher elevation to the lower elevation or from the lower elevation to the higher elevation includes moving the one more blocks from one position to another position based on a translational movement of the crane, wherein the crane is a bridge crane mounted on a second plurality of blocks.

Clause 9. The method of any preceding clause, wherein moving the one or more blocks from the lower elevation to the higher elevation includes moving two blocks attached to opposite jibs of a crane substantially simultaneously from the lower elevation to the higher elevation to counterbalance forces on the crane.

Clause 10. The method of any preceding clause, wherein moving the one or more blocks from the higher elevation to the lower elevation includes moving two blocks attached to opposite jibs of a crane substantially simultaneously from the higher elevation to the lower elevation to counterbalance forces on the crane.

Clause 11. The method of any preceding clause, wherein stacking the plurality of blocks includes positioning a first layer of blocks having a first tiling pattern and positioning a second layer of blocks on top of the first layer of blocks, the second layer of blocks having a second tiling pattern different than the first tiling pattern to inhibit lateral movement or tipping of the stacked blocks.

Clause 12. The method of any preceding clause, wherein stacking the plurality of blocks includes positioning each of the blocks so that it is oriented at 90 degrees to and contacts at least a portion of two blocks underneath the block to thereby interleave the blocks.

Clause 13. The method of any preceding clause, wherein moving the blocks from the lower elevation to the higher elevation to stack the blocks includes arranging the blocks in a layer such that one or more blocks in the layer are oriented at 90 degrees relative to adjacent blocks in the layer to minimize space between the blocks in the layer without the blocks contacting each other.

Clause 14. The method of any preceding clause, wherein moving the blocks from the lower elevation to the higher elevation to stack the blocks includes arranging the blocks in a layer such that one or more laterally adjacent blocks in the layer do not contact each other to inhibit friction during lifting and lowering of the blocks.

Clause 15. The method of any preceding clause, wherein moving the one or more blocks from the higher elevation to the lower elevation or from the lower elevation to the higher elevation includes supporting the block from a bottom surface of the block.

Clause 16. An energy storage system, comprising:
a plurality of blocks; and
a crane comprising
a frame,
an electric motor-generator,
one or more trolleys movably coupled to the frame,
a cable movably coupled to the one or more trolleys and operatively coupled to the electric motor-generator, the cable configured to operatively couple to one or more of the plurality of blocks,
wherein the crane is operable to stack one or more of the plurality of blocks on top of each other by moving said blocks from a lower elevation to a higher elevation to store and amount of electrical energy in said blocks corresponding to a potential energy amount of said blocks, the crane being further operable to unstack one or more of the plurality of blocks by moving said blocks from a higher elevation to a lower elevation under a force of gravity to generate an amount of electricity corresponding to a kinetic energy amount of said one or more blocks when moved from the higher elevation to the lower elevation.

Clause 17. The system of clause 16, wherein one or more trolleys retract the cable to lift one or more of the blocks from the lower elevation to the higher elevation, and wherein the motor-generator generates electricity as the cable is extended by the lowering of the one or more blocks from the higher elevation to the lower elevation under gravity.

Clause 18. The system of any of clauses 16-17, wherein the frame comprises a tower and a plurality of jibs coupled to the tower, each pair of jibs extending on opposite sides of the tower, at least one of the one or more trolleys movably coupled to each of the plurality of jibs.

Clause 19. The system of clause 18, wherein the plurality of jibs are two jibs.

Clause 20. The system of clause 18, wherein the plurality of jibs are six jibs.

Clause 21. The system of clause 20, wherein the six jibs define three pairs of jibs, each pair of jibs extending on opposite sides of the tower at a different angular orientation.

Clause 22. The system of any of clauses 16-21, wherein the plurality of blocks comprises a first plurality of blocks and a second plurality of blocks, the first plurality of blocks arranged to form a peripheral windbreak structure surrounding a space to inhibit exposure of the space to a wind force, the crane operable to move the second plurality of blocks within the space to store or generate electricity.

Clause 23. The system of clause 22, wherein the windbreak structure defines a periphery with a generally circular shape.

Clause 24. The system of clause 22, wherein the windbreak structure defines a periphery with a rectangular shape.

Clause 25. The system of clause 24, wherein the periphery has a square shape. Clause 26. The system of clause 25, wherein the frame defines a bridge that is movably supported on rails arranged on top of the windbreak structure, the bridge configured to move in a first direction and the one or more trolleys movably coupled to the bridge configured to move in a second direction perpendicular to the first direction.

Clause 27. The system of clause 22, further comprising a third plurality of blocks that define one or more cross-members within the space that buttress the windbreak structure, the space divided into one or more portions by the one or more cross-members, the second plurality of blocks being movable within said one or more portions of the space bounded by the windbreak structure.

Clause 28. The system of any of clauses 16-27, further comprising a grabber coupled to the cable and selectively actuated to couple to one or more of the plurality of blocks to lift and lower said block.

Clause 29. The system of clause 28, wherein the grabber comprises a pair of arms, each arm having one or more levers actuatable between a retracted position that allows the arms to be lowered past a bottom end of the block and an extended position that allows the one or more levers to extend into one or more recesses in the bottom end of the block to thereby couple the levers to the block.

Clause 30. The system of clause 28 wherein the pair of arms have proximal ends that are coupled to a cross-member of the grabber, the pair of arms being spaced apart from and extending parallel to each other to distal ends of the arms.

Clause 31. A block for use in an energy storage and generation system, comprising:
- a body comprising concrete having a rectangular shape with a length greater than a width, the width being greater than a depth of the body, a planar facet interconnecting adjacent sides of the body, and one or more recesses on a bottom surface of the body; and
- a metal plate attached to the one or more recesses to inhibit wear on the block during movement of the block.

Clause 32. The block of clause 31, wherein the body has an aspect ratio for the length to width to depth of 4:2:1.

Clause 33. The block of clause 31, wherein the body has an aspect ratio for the length to width to depth of 3:2:1.

Clause 34. The block of any of clauses 31-33, wherein the body has a length of approximately 4 m.

Clause 35. The block of any of clauses 31-34, wherein the planar facet extends at 45 degrees relative to the adjacent sides of the body.

Clause 36. The block of any of clauses 31-35, wherein the body weighs between 20 tons and 55 tons.

Clause 37. The block of any of clauses 31-36, wherein the body is symmetrical along a first central plane through the width of the block and a second central plane through the depth of the block.

Clause 38. The block of any of clauses 31-37, wherein the body has one or more bores that extend through the length of the block from one or more proximal openings at a top end of the block to one or more distal openings at a bottom end of the block, the distal openings aligning with the one or more recesses on the bottom surface of the body.

Clause 39. The block of any of clauses 31-38, wherein the one or more bores are a pair of spaced apart bores that extend through the length of the block and are centered along the width and depth of the block.

Clause 40. The block of clause 38, wherein the one or more proximal openings have a conical shape.

Clause 41. The block of clause 38, wherein the one or more distal openings are stepped, at least a portion of the metal plate defining at least one of the one or more distal openings.

Clause 42. The block of clause 38, further comprising a metal plate embedded in the block about the one or more proximal openings, at least a portion of the metal plate defining a tapered surface of the one or more proximal openings.

Clause 43. The block of any of clauses 31-42, wherein the body comprises an outer shell of concrete that encloses a ballast mass of a different material.

Clause 44. The block of any of clauses 31-43, wherein the block comprises rebar embedded in the concrete.

Clause 45. The block of any of clauses 31-44, wherein the block comprises a top portion that defines a top surface of the block, a middle portion that defines a peripheral surface of the block, and a bottom portion that defines a bottom surface of the block, the top and bottom portions comprising high performance concrete with a relatively higher compression strength and the middle portion comprising a low grade concrete having a relatively lower compression strength.

Clause 46. The block of clause 45, wherein the top and bottom portions comprise a high performance concrete having a compression strength of 10 to 60 MPa and the middle portion comprises a low grade concrete having a compression strength of 3 to 8 MPa.

Clause 47. The block of clause 45, further comprising one or more reinforcement layers located in one or more of the top portion, middle portion and bottom portion of the block.

Clause 48. The block of clause 47, wherein the one or more reinforcement layers structural steel.

Clause 49. A grabber for use in lifting and lowering blocks in an energy storage and generation system, comprising:
- a body comprising
  - a cross-member coupleable to a cable operable by a crane,
  - a pair of arms extending distally from the cross-member body, and
  - one or more levers located in a distal portion of each of the pair of arms,
- wherein the one or more levers are actuatable between a retracted position that allows the grabber to be lowered past a bottom end of a block and an extended position that allows the one or more levers to engage the bottom end of the block to thereby couple to the block.

Clause 50. The grabber of clause 49, further comprising a conical distal end attached to each of the pair of arms that allow self-centering of the arms relative to proximal openings of the block during insertion of the distal ends through proximal openings, the conical portions configured to extend past a bottom surface of the block when the grabber is coupled to the block.

Clause 51. The grabber of clause 50, wherein the one or more levers are a plurality of levers arranged circumferentially about a distal portion of each of the arms at a location proximal of the distal ends.

Clause 52. The grabber of any of clauses 49-51, wherein each of the pair of arms is tubular.

Clause 53. The grabber of any of clauses 49-52, wherein in the retracted position the one or more levers are oriented parallel to a central axis of the arms.

Clause 54. The grabber of any of clauses 49-53, wherein in the extended position the one or more levers pivot outward relative to the arms to thereby protrude past a side surface of the arms.

Clause 55. The grabber of clause 54, wherein in the extended position the one or more levers pivot outward and extend at an acute angle relative to a central axis of the arms.

Clause 56. The grabber of clause 55, further comprising a spring loaded cable assembly having one or more cables attached to the one or more levers and to the spring, wherein extension of the spring causes the one or more levers to pivot outward into the extended position, and wherein contraction of the spring causes the one or more levers to pivot inward into the retracted position.

Clause 57. The grabber of any of clauses 49-56, further comprising an ultrasound sensor operable to sense a position of the one- or more levers relative to a block prior to coupling of the one or more levers to the block.

Clause 58. The grabber of any of clauses 49-57, further comprising one or more apertures in the distal portion of at least one of the pair of arms in fluid communication with an air supply source, the air supply source operable to deliver air via the one or more apertures onto a top surface of the block as the arms approach the block to thereby remove dust and debris from the top surface of the block prior to engagement of the body with the block.

Clause 59. The grabber of any of clauses 49-58, further comprising one or more apertures proximate the one or more levers and in fluid communication with an air supply source, the air supply source operable to deliver air via the one or more apertures into a space between the levers and the pair of arms when the levers are in an extended position to thereby clean said space of debris and allow the one or more levers to move unimpeded between the retracted and extended positions.

Clause 60. The grabber of any of clauses 49-59, further comprising a transmission assembly comprising a first disk fixed to a proximal connector rotatably attached to the cross-member, a second disk attached to the cross-member and being rotatable by an electric motor, an a chain that wraps around and interconnects the first and second disks.

Clause 61. The grabber of clause 60, wherein the transmission assembly is configured to rotate the body when uncoupled from a block, the electric motor rotating the second disk relative to the first disk to cause a change in the orientation of the body relative to the proximal connector.

Clause 62. The grabber of clause 60, wherein the transmission assembly is configured to rotate the body when coupled to a block to counter a rotation of at least a portion of a crane operatively coupled to the proximal connector, the electric motor rotating the second disk relative to the first disk to cause a change in the orientation of the body relative to the proximal connector so that the block coupled to the body maintains its orientation and experiences zero moment.

Clause 63. A method of operating a grabber to lift and lower blocks in an energy storage and generation system, comprising:
lowering the grabber relative to a block;
inserting a pair of arms of the grabber through a pair of bores in the block until a distal end of the pair of arms protrude from the pair of bores;
actuating one or more levers movably coupled to the pair of arms from a retracted position to an extended position; and
engaging a recessed distal surface of the pair of bores with the one or more levers in the extended position to allow lifting of the block with the grabber.

Clause 64. The method of clause 63, further comprising sensing with an ultrasound sensor a position of one or more levers of the pair of arms relative to the block prior to actuating the one or more levers to the extended position.

Clause 65. The method of any of clauses 63-64, wherein inserting the pair of arms through the pair of bores includes inserting conical end portions of the pair of arms into the pair of bores, the conical end portions self-centering the pair of arms relative to the pair of bores during insertion of the pair of arms in the pair of bores.

Clause 66. The method of any of clauses 63-65, further comprising delivering an amount of air from the conical end portions onto a proximal surface of one or more blocks to clean the proximal surface of the blocks.

Clause 67. The grabber of any of clauses 63-66, further comprising delivering an amount of air to a space between the one or more levers and the pair of arms when the levers are in an extended position to thereby clean said space of debris and allow the one or more levers to move to one or both of the extended and the retracted position.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A grabber for use in lifting and lowering blocks in an energy storage and generation system, comprising:
   a body comprising
   a cross-member coupleable to a cable operable by a crane,
   a pair of arms extending distally from the cross-member body,
   one or more levers located in a distal portion of each of the pair of arms, and
   a conical distal end attached to each of the pair of arms that allow self-centering of the arms relative to proximal openings of the block during insertion of the distal ends through proximal openings, the conical portions configured to extend past a bottom surface of the block when the grabber is coupled to the block,
   wherein the one or more levers are actuatable between a retracted position that allows the grabber to be lowered past a bottom end of a block and an extended position that allows the one or more levers to engage the bottom end of the block to thereby couple to the block.

2. The grabber of claim 1, wherein the one or more levers are a plurality of levers arranged circumferentially about a distal portion of each of the arms at a location proximal of the distal ends.

3. The grabber of claim 1, wherein each of the pair of arms is tubular.

4. The grabber of claim 1, wherein in the retracted position the one or more levers are oriented parallel to a central axis of the arms.

5. The grabber of claim 1, further comprising an ultrasound sensor operable to sense a position of the one-or more levers relative to a block prior to coupling of the one or more levers to the block.

6. The grabber of claim 1, further comprising one or more apertures proximate the one or more levers and in fluid communication with an air supply source, the air supply source operable to deliver air via the one or more apertures into a space between the levers and the pair of arms when the levers are in an extended position to thereby clean said space of debris and allow the one or more levers to move unimpeded between the retracted and extended positions.

7. The grabber of claim 1, further comprising a transmission assembly comprising a first disk fixed to a proximal connector rotatably attached to the cross-member, a second disk attached to the cross-member and being rotatable by an electric motor, an a chain that wraps around and interconnects the first and second disks.

8. The grabber of claim 7, wherein the transmission assembly is configured to rotate the body when uncoupled from a block, the electric motor rotating the second disk relative to the first disk to cause a change in the orientation of the body relative to the proximal connector.

9. The grabber of claim 7, wherein the transmission assembly is configured to rotate the body when coupled to a block to counter a rotation of at least a portion of a crane operatively coupled to the proximal connector, the electric motor rotating the second disk relative to the first disk to cause a change in the orientation of the body relative to the proximal connector so that the block coupled to the body maintains its orientation and experiences zero moment.

10. A grabber for use in lifting and lowering blocks in an energy storage and generation system, comprising:
    a body comprising
    a cross-member coupleable to a cable operable by a crane,
    a pair of arms extending distally from the cross-member body, one or more levers located in a distal portion of each of the pair of arms, and a spring loaded cable assembly having one or more cables attached to the one or more levers and to the spring, wherein the one or more levers are actuatable between a retracted position that allows the grabber to be lowered past a bottom end of a block and an extended position that allows the one or more levers to engage the bottom end of the block to thereby couple to the block, wherein in the extended position the one or more levers pivot outward relative to the arms to thereby protrude past a side surface of the arms, wherein in the extended position the one or more levers pivot outward and extend at an acute angle relative to a central axis of the arms, and wherein extension of the spring causes the one or more levers to pivot outward into the extended position, and wherein contraction of the spring causes the one or more levers to pivot inward into the retracted position.

11. A grabber for use in lifting and lowering blocks in an energy storage and generation system, comprising:

a body comprising a cross-member coupleable to a cable operable by a crane, a pair of arms extending distally from the cross-member body, and one or more levers located in a distal portion of each of the pair of arms, and one or more apertures in the distal portion of at least one of the pair of arms in fluid communication with an air supply source, the air supply source operable to deliver air via the one or more apertures onto a top surface of the block as the arms approach the block to thereby remove dust and debris from the top surface of the block prior to engagement of the body with the block, wherein the one or more levers are actuatable between a retracted position that allows the grabber to be lowered past a bottom end of a block and an extended position that allows the one or more levers to engage the bottom end of the block to thereby couple to the block.

12. A method of operating a grabber to lift and lower blocks in an energy storage and generation system, comprising:

lowering with a crane the grabber relative to a block;

inserting a pair of arms of the grabber through a pair of bores in the block until a distal end of the pair of arms protrude from the pair of bores;

actuating one or more levers movably coupled to the pair of arms from a retracted position to an extended position; and engaging a recessed distal surface of the pair of bores with the one or more levers in the extended position to allow lifting of the block with the grabber.

13. The method of claim 12, further comprising sensing with an ultrasound sensor a position of one or more levers of the pair of arms relative to the block prior to actuating the one or more levers to the extended position.

14. The method of claim 12, wherein inserting the pair of arms through the pair of bores includes inserting conical end portions of the pair of arms into the pair of bores, the conical end portions self-centering the pair of arms relative to the pair of bores during insertion of the pair of arms in the pair of bores.

15. The method of claim 12, further comprising delivering an amount of air from the conical end portions onto a proximal surface of one or more blocks to clean the proximal surface of the blocks.

16. The method of claim 15, further comprising delivering an amount of air to a space between the one or more levers and the pair of arms when the levers are in an extended position to thereby clean said space of debris and allow the one or more levers to move to one or both of the extended and the retracted position.

17. The method of claim 12, further comprising operating a transmission assembly to rotate the body when coupled to the block to counter a rotation of at least a portion of the crane operatively coupled to the grabber so that the block coupled to the grabber maintains its orientation and experiences zero moment.

\* \* \* \* \*

UNITED STATES PATENT AND TRADEMARK OFFICE
CERTIFICATE OF CORRECTION

PATENT NO. : 10,683,851 B2  
APPLICATION NO. : 16/514568  
DATED : June 16, 2020  
INVENTOR(S) : Andrea Pedretti et al.

Page 1 of 1

It is certified that error appears in the above-identified patent and that said Letters Patent is hereby corrected as shown below:

On the Title Page

In Column 2, item (57), Abstract, Line 1, delete "A an" and insert -- An --.

In the Specification

In Column 6, Line 46, delete "FIG." and insert -- FIGS. --.

In Column 14, Line 22, delete "14E," and insert -- 14E), --.

In Column 24, Line 64, delete "Clause 26. The system of clause 25," and replace that entire paragraph starting at Line 65.

In Column 27, Line 8 approx., delete "one- or more" and insert -- one or more --.

In Column 27, Line 32, delete "an a" and insert -- and a --.

In the Claims

In Column 30, Line 31, Claim 5, delete "one-or more" and insert -- one or more --.

In Column 30, Line 46, Claim 12, delete "an a" and insert -- and a --.

Signed and Sealed this  
Fifteenth Day of September, 2020

Andrei Iancu  
*Director of the United States Patent and Trademark Office*